(12) United States Patent
Ohsaki

(10) Patent No.: US 9,677,529 B2
(45) Date of Patent: Jun. 13, 2017

(54) VEHICLE DIAGNOSIS SYSTEM AND METHOD

(71) Applicant: DENSO CORPORATION, Kariya, Aichi-pref. (JP)

(72) Inventor: Satoru Ohsaki, Chiryu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/581,648

(22) Filed: Dec. 23, 2014

(65) Prior Publication Data
US 2015/0178997 A1  Jun. 25, 2015

(30) Foreign Application Priority Data

Dec. 25, 2013  (JP) .................................. 2013-267394
Dec. 26, 2013  (JP) .................................. 2013-269255
(Continued)

(51) Int. Cl.
*F02N 11/08* (2006.01)
*G07C 5/08* (2006.01)
(Continued)

(52) U.S. Cl.
CPC ......... *F02N 11/0825* (2013.01); *B60W 20/50* (2013.01); *F02N 11/0818* (2013.01);
(Continued)

(58) Field of Classification Search
CPC .. Y02T 10/48; F02N 11/0818; F02N 11/0825; B60W 20/50; G07C 5/0808; G07C 5/0816

See application file for complete search history.

(56) References Cited

U.S. PATENT DOCUMENTS 4,364,343 A * 12/1982 Malik .................... F02D 41/042
                                                         123/179.16
6,371,889 B1 * 4/2002 Kuroda .................. B60K 6/485
                                                         477/167
(Continued)

FOREIGN PATENT DOCUMENTS

EP         2497915 A1 *  9/2012
JP    2000120463 A  *  4/2000
(Continued)

OTHER PUBLICATIONS

JPO machine translation of JP 2012-246867 (original JP document published Dec. 13, 2012).*
(Continued)

*Primary Examiner* — Behrang Badii
*Assistant Examiner* — David Testardi
(74) *Attorney, Agent, or Firm* — Nixon & Vanderhye P.C.

(57) ABSTRACT

A vehicle diagnosis system includes an abnormality determiner for determining whether a vehicle having an abnormality regarding a temporal engine stop function or a power regeneration function is caused in a mode that cancels a greenhouse gas reduction effect of the engine. When an abnormality that cancels, due to disablement of the temporal engine stop function or the power regeneration function, such an abnormality is quickly notified to a driver of the vehicle by the vehicle diagnosis system so that the abnormality is quickly fixed.

6 Claims, 44 Drawing Sheets

(30) Foreign Application Priority Data

| Dec. 26, 2013 | (JP) | 2013-269256 |
| --- | --- | --- |
| Dec. 26, 2013 | (JP) | 2013-269257 |
| Oct. 23, 2014 | (JP) | 2014-216571 |
| Oct. 23, 2014 | (JP) | 2014-216572 |
| Oct. 23, 2014 | (JP) | 2014-216573 |
| Oct. 23, 2014 | (JP) | 2014-216574 |

(51) Int. Cl.

G07C 5/00 (2006.01)
B60W 20/50 (2016.01)

(52) U.S. Cl.

CPC ............ G07C 5/00 (2013.01); G07C 5/0816 (2013.01); G07C 5/0825 (2013.01); *Y02T 10/48* (2013.01)

(56) References Cited

U.S. PATENT DOCUMENTS

| 6,504,259 | B1 * | 1/2003 | Kuroda | B60K 6/46 180/65.25 |
| --- | --- | --- | --- | --- |
| 6,605,946 | B1 * | 8/2003 | Yokoyama | F02N 11/0825 320/136 |
| 6,898,494 | B2 * | 5/2005 | Nada | B60K 6/445 701/33.4 |
| 6,913,558 | B2 * | 7/2005 | Mori | B60K 6/485 180/65.26 |
| 8,151,916 | B2 * | 4/2012 | Gearhart | B60W 10/06 180/65.21 |
| 8,251,870 | B2 * | 8/2012 | Nihei | B60W 30/18018 477/107 |
| 8,380,405 | B2 * | 2/2013 | Matsuda | F02D 17/00 180/65.28 |
| 8,511,270 | B2 * | 8/2013 | Hamane | F02N 11/0825 123/179.4 |
| 2002/0046732 | A1 * | 4/2002 | Katou | B60W 10/06 123/339.24 |
| 2006/0116797 | A1 * | 6/2006 | Moran | B60K 6/12 701/22 |
| 2006/0273591 | A1 | 12/2006 | Yamashita et al. | |
| 2008/0147260 | A1 * | 6/2008 | Moran | B60K 6/12 701/22 |
| 2009/0241884 | A1 * | 10/2009 | Saitoh | F02N 11/0825 123/179.4 |
| 2009/0298644 | A1 * | 12/2009 | Nihei | B60W 30/18018 477/107 |
| 2011/0180031 | A1 * | 7/2011 | Hamane | F02N 11/0825 123/179.4 |
| 2013/0046435 | A1 * | 2/2013 | Shin | F02N 11/08 701/32.8 |
| 2013/0085657 | A1 * | 4/2013 | Bito | F02N 11/0825 701/112 |
| 2013/0152887 | A1 * | 6/2013 | Miyazato | F01L 1/3442 123/90.15 |
| 2014/0210262 | A1 * | 7/2014 | Yaegaki | B60K 6/48 307/10.1 |
| 2014/0350775 | A1 * | 11/2014 | Yagi | G07C 5/008 701/31.4 |
| 2014/0358359 | A1 * | 12/2014 | Yagi | F02N 11/0814 701/31.4 |
| 2014/0379200 | A1 * | 12/2014 | Yagi | G07C 5/0808 701/29.4 |
| 2015/0088405 | A1 * | 3/2015 | Iijima | B60K 6/48 701/112 |

FOREIGN PATENT DOCUMENTS

| JP | 2000170568 A | * | 6/2000 | |
| --- | --- | --- | --- | --- |
| JP | 2000175304 A | * | 6/2000 | |
| JP | 2000257498 A | * | 9/2000 | |
| JP | 2001-169402 | | 6/2001 | |
| JP | 2004162617 A | * | 6/2004 | |
| JP | 2005-045851 | | 2/2005 | |
| JP | 2005-248796 | | 9/2005 | |
| JP | 2008143482 A | * | 6/2008 | |
| JP | 2009-138647 | | 6/2009 | |
| JP | 2009127512 A | * | 6/2009 | |
| JP | 2010-101249 | | 5/2010 | |
| JP | 2010101249 A | * | 5/2010 | |
| JP | 2010275890 A | * | 12/2010 | |
| JP | 2011-179406 | | 9/2011 | |
| JP | 2012246867 A | * | 12/2012 | |
| WO | WO 2008072395 A1 | * | 6/2008 | ............ B60K 6/445 |

OTHER PUBLICATIONS

JPO machine translation of JP 2009-127512 (original JP document published Jun. 11, 2009).*

JPO machine translation of JP 2000-170568 (original JP document published Jun. 20, 2000).*

* cited by examiner

VEHICLE DIAGNOSIS SYSTEM AND METHOD

CROSS REFERENCE TO RELATED APPLICATION

The present application is based on and claims the benefit of priority of Japanese Patent Applications No. 2013-267394, filed on Dec. 25, 2013, No. 2013-269255, filed on Dec. 26, 2013, No. 2013-269256, filed on Dec. 26, 2013, No. 2013-269257, filed on Dec. 26, 2013, No. 2014-216571, filed on Oct. 23, 2014, No. 2014-216572, filed on Oct. 23, 2014, No. 2014-216573, filed on Oct. 23, 2014, and No. 2014-216574, filed on Oct. 23, 2014, the disclosure of which is incorporated herein by reference.

TECHNICAL FIELD

The present disclosure generally relates to a vehicle diagnosis system and method for performing a diagnosis-related process for vehicles provided with a temporal engine stop function or a generator for generating regenerative power.

BACKGROUND INFORMATION

In vehicles having an engine idle temporal stop function, the engine of such a vehicle stops when a prescribed condition is satisfied. The above-mentioned prescribed condition may be, for example, a greater-than prescribed temperature of an engine cooling water, a braking of the vehicle, or the like.

Conventionally, when an abnormality or failure occurs in various in-vehicle components that are used for realizing the above-mentioned temporal stop function or in sensors and other devices for detecting the satisfaction of the above-mentioned prescribed condition, a technology to forbid a temporal stop of the engine is proposed, in a following patent document 1 (i.e., JP-A-2005-248796 and JP-A-2009-138647).

As mentioned above, when an abnormality or failure regarding a temporal stop function is caused in a mode that cancels a greenhouse gas reduction effect of the temporal stop function, the effect of such function to reduce the amount of emission of a greenhouse gas is reduced or cancelled (i.e., the reduction effect will not fully/preferably be achieved). Therefore, damage to the environment may result when a vehicle with such kind of abnormality is driven or operated for a long time. Thus, when an abnormality or failure regarding a temporal stop function is caused in a vehicle in a mode that cancels a greenhouse gas reduction effect, the driver of such a vehicle should be prompted to fix the vehicle as soon as possible.

Further, when a certain condition is satisfied, a vehicle having a generator performs a regenerative power generation, or a power regeneration, which is disclosed, for example, in a following patent document 2 (i.e., Japanese Patent JP-A-2001-169402). When such a power regeneration is performed for collecting an electric power and the collected power is used in the vehicle, the environmental load of such vehicle is reduced (i.e., reduces greenhouse gas emissions).

However, in some instances the regenerative power generation may be not performed even though the above-described certain condition is satisfied because of an abnormality or a device failure of some kind. In such a case, the expected effect of a power regeneration function, which is a reduction effect for reducing the emission of the greenhouse gas, may be reduced or not fully realized. Therefore, damage to the environment may result when a vehicle with such kind of abnormality is driven or operated for a long time. Thus, when such kind of abnormality is observed, a driver of the vehicle or other people involved should be quickly notified for a quick fix of the vehicle.

SUMMARY

It is an object of the present disclosure to provide a vehicle diagnosis system that detects an abnormality that reduces an effect of the regenerative power generation function. It is also an object of the present disclosure to provide a vehicle diagnosis system that quickly prompts a driver/user of a vehicle to fix the vehicle when abnormalities (i.e., failure) that reduce/cancel a greenhouse gas reduction effect by the disablement of the temp-stop function are caused.

In an aspect of the present disclosure, a vehicle diagnosis system performs a diagnosis-related process for a vehicle having a temporal engine stop function that temporarily stops an engine of the vehicle when a certain condition is satisfied. The vehicle diagnosis system includes a prerequisite determiner that determines whether a prerequisite condition for performing a temporal stop of the engine is satisfied, a requisite determiner that determines whether a requisite condition for performing the temporal stop of the engine is satisfied, the requisite condition being different from the prerequisite condition, an event counter that counts, as an events count, (i) a number of requisite-satisfied events in which the requisite determiner determines that the requisite condition is satisfied or (ii) an accumulated time of the requisite-satisfied events, respectively in a prerequisite satisfied expected state in which satisfaction of the prerequisite is expected, an episode counter that counts, as an episodes count, (i) a number of episodes or (ii) an accumulated time of the episodes, and an output section that outputs the events count and the episodes count to an external device.

In another aspect of the present disclosure, a vehicle diagnosis system is disposed in a vehicle and the vehicle diagnosis system includes an accelerator-off counter that counts accelerator-offs each of which representing an occurrence of an accelerator-off state, a temporal-stop counter that counts temporal-stops of an engine during an accelerator-off period, and one of an output section that outputs an accelerator-offs count and a temporal-stops count to an external device that is different from the vehicle, or an abnormality determiner that determines whether a vehicle abnormality regarding a temporal-stop of the engine is caused, which cancels a greenhouse gas reduction effect by the temporal stop of the engine, based on the accelerator-offs count and the temporal-stops count.

In yet another aspect of the present disclosure, a vehicle diagnosis system is disposed in a vehicle and the vehicle diagnosis system includes an accelerator-off counter that counts accelerator-offs that represent a number of occurrences of an accelerator-off state, a temporal-stop counter that counts temporal-stops of the engine during an accelerator-off period, and one of an output section that outputs an accelerator-offs count and a temporal-stops count to an external device that is different from the vehicle, or an abnormality determiner that determines whether a vehicle abnormality regarding a temporal-stop of the engine is caused, which cancels a greenhouse gas reduction effect by the temporal-stop of the engine, based on the accelerator-offs count or the temporal-stops count.

In a further aspect of the present disclosure, a vehicle diagnosis system is disposed in a vehicle and the vehicle diagnosis system includes a temporal-stop counter that counts temporal-stops of an engine of the vehicle during an accelerator-off period, a temporal-stop counter that counts temporal-stops of the engine during the accelerator-off period, and one of an output section that outputs a temporal-stops count and a temporal-stop voidings count to an external device that is different from the vehicle, or a abnormality determiner that determines whether a vehicle abnormality regarding a temporal-stop of the engine is caused, which cancels a greenhouse gas reduction effect by the temporal-stop of the engine, based on the temporal-stops count or the temporal-stops count.

In yet another aspect of the present disclosure, a vehicle diagnosis system is disposed in a vehicle and the vehicle diagnosis system includes an accelerator-off counter that counts accelerator-offs that represent a number of occurrences of an accelerator-off state, a temporal-stop counter that counts temporal-stops of the engine during an accelerator-off period, and one of an output section that outputs an accelerator-offs count and a temporal-stops count to an external device that is different from the vehicle, or an abnormality determiner that determines whether a vehicle abnormality regarding a temporal-stop of the engine is caused, which cancels a greenhouse gas reduction effect by the temporal-stop of the engine, based on the accelerator-offs count or the temporal-stops count.

In a further aspect of the present disclosure, a vehicle diagnosis system is disposed in a vehicle and the vehicle diagnosis system includes a temporal-stop counter that counts temporal-stops of an engine of the vehicle during an accelerator-off period, a temporal-stop counter that counts temporal-stops of the engine during the accelerator-off period, and one of an output section that outputs a temporal-stops count and a temporal-stop voidings count to an external device that is different from the vehicle, or an abnormality determiner that determines whether a vehicle abnormality regarding a temporal-stop of the engine is caused, which cancels a greenhouse gas reduction effect by the temporal-stop of the engine, based on the temporal-stops count or the temporal-stops count.

In an even further aspect of the present disclosure, a vehicle diagnosis method performs a diagnosis of a vehicle having a temporal engine stop function that temporarily stops an engine of the vehicle when a certain condition is satisfied. The vehicle diagnosis method includes determining whether a prerequisite is satisfied for performing a temporal stop of the engine, and determining whether a vehicle abnormality regarding the temporal engine stop function is caused, which cancels a greenhouse gas reduction effect by the temporal stop of the engine, based on (i) a state of determination of the prerequisite determination step or (ii) a state of operation for performing the temporal stop of the engine.

In the above configuration, a vehicle diagnosis system includes a prerequisite determiner and an abnormality determiner, for determining a prerequisite met satisfied state for a temporal stop of an engine and for determining whether a vehicle abnormality regarding a temporal engine stop function is caused in a mode that cancels a greenhouse gas reduction effect of the temporal stop of the engine, based on (i) a state of determination of the prerequisite determiner or (ii) a state of operation for performing a temporal stop of an engine, thereby quickly letting a driver of a vehicle know that the vehicle should be fixed.

In an aspect of the present disclosure, a vehicle diagnosis system performs a diagnosis for a vehicle having a temporal engine stop function that temporarily stops an engine of the vehicle in a certain condition satisfied state. The vehicle diagnosis system includes an abnormality determiner determining an occurrence of a specific abnormality of the vehicle, the specific abnormality being an abnormality in a mode that cancels a greenhouse gas reduction effect by the temporal engine stop function.

In another aspect of the present disclosure, a vehicle diagnosis method performs a diagnosis for a vehicle having a temporal engine stop function that temporarily stops an engine of the vehicle in a certain condition satisfied state. The vehicle diagnosis method includes determining an occurrence of abnormality of the vehicle, which includes determining whether a specific abnormality is occurring, and whether the specific abnormality is an abnormality in a mode that cancels a greenhouse gas reduction effect by the temporal engine stop function.

In the above configuration, the abnormality determiner determines the occurrence of the abnormality of the vehicle. Specifically, in the present disclosure, the abnormality determiner determines the specific abnormality. The specific abnormality is an abnormality of the vehicle in a mode that cancels the greenhouse gas reduction effect of the temporal stop function of the engine. When an occurrence of such an abnormality of the vehicle is determined, the abnormality is quickly notified to a driver or the like, thereby enabling a quick fix thereof. Thus, the present disclosure enables an environmental impact of the vehicle that has the above-described engine installed therein as much as possible.

In an aspect of the present disclosure, a vehicle diagnosis system performs a diagnosis-related process for a vehicle that has an electric power regeneration function that is performed by using a generator in a certain condition satisfied state. The vehicle diagnosis system includes a prerequisite determiner determining whether a prerequisite condition for performing an electric power regeneration is satisfied, a requisite determiner determining whether a requisite condition for performing the electric power regeneration is satisfied, the requisite condition being different from the prerequisite condition, and an event counter counting events and obtaining an events count, the events counted being either (i) satisfaction events respectively determined by the requisite determiner as satisfaction of the requisite condition in a prerequisite satisfaction expected state or (ii) an accumulated time of counted events. The vehicle diagnosis system also includes an operation counter counting operations or obtaining an operation count, the operations counted being either (i) electric power regeneration operations actually performed or (ii) an accumulated time of electric power regeneration operations performed, and an output section outputting the event count and the operation count to an external device.

In another aspect of the present disclosure, a vehicle diagnosis system performs a diagnosis for a vehicle that has an electric power regeneration function that is performed by using a generator in a certain condition satisfied state. The vehicle diagnosis system includes a prerequisite determiner determining whether a prerequisite condition for performing an electric power regeneration is satisfied, a requisite determiner determining whether a requisite condition for performing the electric power regeneration is satisfied, the requisite condition being different from the prerequisite condition, an event counter counting events and obtaining an events count, the events counted being either (i) satisfaction events respectively determined by the requisite determiner as satisfaction of the requisite condition in a prerequisite satisfaction expected state or (ii) an accumulated time of counted events, an operation counter counting operations or obtaining an operations count, the operations counted being either (i) electric power regeneration operations actually performed or (ii) an accumulated time of electric power regeneration operations performed, and an abnormality determiner determining, based on the event count and the operation count, whether an abnormality of the vehicle regarding the electric power regeneration function is caused in a mode within which a greenhouse gas reduction effect of the electric power regeneration function is cancelled.

In yet another aspect of the present disclosure, a vehicle diagnosis system performs a diagnosis-related process for a vehicle that has an electric power regeneration function that is performed by using a generator in a certain condition satisfied state. The vehicle diagnosis system includes a prerequisite determiner determining whether a prerequisite condition for performing an electric power regeneration is satisfied, a requisite determiner determining whether a requisite condition for performing the electric power regeneration is satisfied, the requisite condition being different from the prerequisite condition, an event counter counting events and obtaining an events count, the events counted being either (i) satisfaction events respectively determined by the requisite determiner as satisfaction of the requisite condition in a prerequisite satisfaction expected state or (ii) an accumulated time of counted events, a missing operation counter counting missing operations in spite of having the counted events or obtaining a missing operation count, the missing operations counted being either (i) a number of electric power regeneration operations not performed in event counted occasions or (ii) an accumulated time of the missing operations, and one of an output section outputting the event count and the missing operation count to an external device, or an abnormality determiner determining whether an abnormality of the vehicle is caused based on the event count and the missing operation count.

In still yet another aspect of the present disclosure, a diagnosis-related process for a vehicle that has an electric power regeneration function that is performed by using a generator in a certain condition satisfied state. The vehicle diagnosis system includes a prerequisite determiner determining whether a prerequisite condition for performing an electric power regeneration is satisfied, a requisite determiner determining whether a requisite condition for performing the electric power regeneration is satisfied, the requisite condition being different from the prerequisite condition, an event counter counting events and obtaining an events count, the events counted being satisfaction events respectively determined by the requisite determiner as satisfaction of the requisite condition in a prerequisite satisfaction expected state, a missing operation counter counting missing operations in spite of having the counted events or obtaining a missing operation count, the missing operations counted being either (i) a number of electric power regeneration operations not performed in event counted occasions or (ii) an accumulated time of the missing operations, and one of an output section outputting the event count and the missing operation count to an external device, or an abnormality determiner determining whether an abnormality of the vehicle is caused based on the event count and the missing operation count.

In a further aspect of the present disclosure, a vehicle diagnosis system performs a diagnosis-related process for a vehicle that has an electric power regeneration function that is performed by using a generator in a certain condition satisfied state. The vehicle diagnosis system includes at least two of a first accumulator, a second accumulator, and a third accumulator. The first accumulator determines a number of brake pedal depressions or a total time of brake pedal depression, each of the brake pedal depressions exceeding a preset amount of brake pedal depression. The second accumulator determines a total number or a total time of missing electric power regenerations by the generator during brake pedal depression periods exceeding the preset amount of brake pedal depression. The third accumulator determines a total number or a total time of electric power regenerations by the generator during the brake pedal depression periods exceeding the preset amount of brake pedal depression. The vehicle diagnosis system also includes at least one of an output section outputting to an external device that is external to the vehicle at least two pieces of information derived from the at least two of the first accumulator, the second accumulator, and the third accumulator, or an abnormality determiner determining an abnormality of the vehicle based on the at least two pieces of information.

In an even further aspect of the present disclosure, a method of performs a diagnosis for a vehicle that has an electric power regeneration function that is performed by using a generator in a certain condition satisfied state. The method includes determining whether a prerequisite condition for performing an electric power regeneration is satisfied, determining whether a requisite condition for performing the electric power regeneration is satisfied, the requisite condition being different from the prerequisite condition, counting events and obtaining an events count, the events counted being either (i) satisfaction events respectively determined by the requisite determiner as satisfaction of the requisite condition in a prerequisite satisfaction expected state or (ii) an accumulated time of counted events, counting operations or obtaining an operations count, the operations counted being either (i) electric power regeneration operations actually performed or (ii) an accumulated time of electric power regeneration operations performed, and determining, based on the event count and the operation count, whether an abnormality of the vehicle regarding the electric power regeneration function is caused in a mode within which a greenhouse gas reduction effect is cancelled.

In the above-mentioned configuration, the vehicle diagnosis system includes a prerequisite determiner, a requisite determiner, an event counter, an episode counter, and an abnormality determiner. The event counter counts a number of events (i.e., events of requisite being met in an anticipation of a prerequisite-met state). The event counter counts a number of number of episodes (i.e., episodes of regeneration operation). The abnormality determiner determines an occurrence of an abnormality of regeneration, which is caused in a manner that cancels a greenhouse gas reduction effect, based on (i) the events count and (ii) the episodes count. When an abnormality (i.e., fault/failure) that cancels, due to hindrance/disablement of a power regeneration function, a greenhouse gas reduction effect is caused and such an abnormality is quickly notified to a driver of a vehicle by the vehicle diagnosis system so that the abnormality is quickly fixed.

In an aspect of the present disclosure, a vehicle diagnosis system is configured to perform a diagnosis of a vehicle that is equipped with a generator having a regeneration function. The vehicle diagnosis system includes a detector detecting electric power regeneration being performed in a manner that reduces a greenhouse gas reduction effect.

In the above-mentioned configuration, when the power regeneration is performed in an effect-cancelling manner, i.e., when a greenhouse gas reduction effect originally expected by the regeneration function is not being currently achieved, the detector detects such an effect-cancelling state of the regeneration function. The detection result may then be quickly notified to a driver of the vehicle or the like. Thus, such an abnormality is quickly fixed, i.e., as soon as possible. Therefore, when the present disclosure is implemented in the vehicle, the original effect of the regeneration function is quickly recovered and the environmental load of the vehicle is quickly reduced.

BRIEF DESCRIPTION OF THE DRAWINGS

Objects, features, and advantages of the present disclosure will become more apparent from the following detailed description made with reference to the accompanying figures, in which.

DETAILED DESCRIPTION

Figure 1:
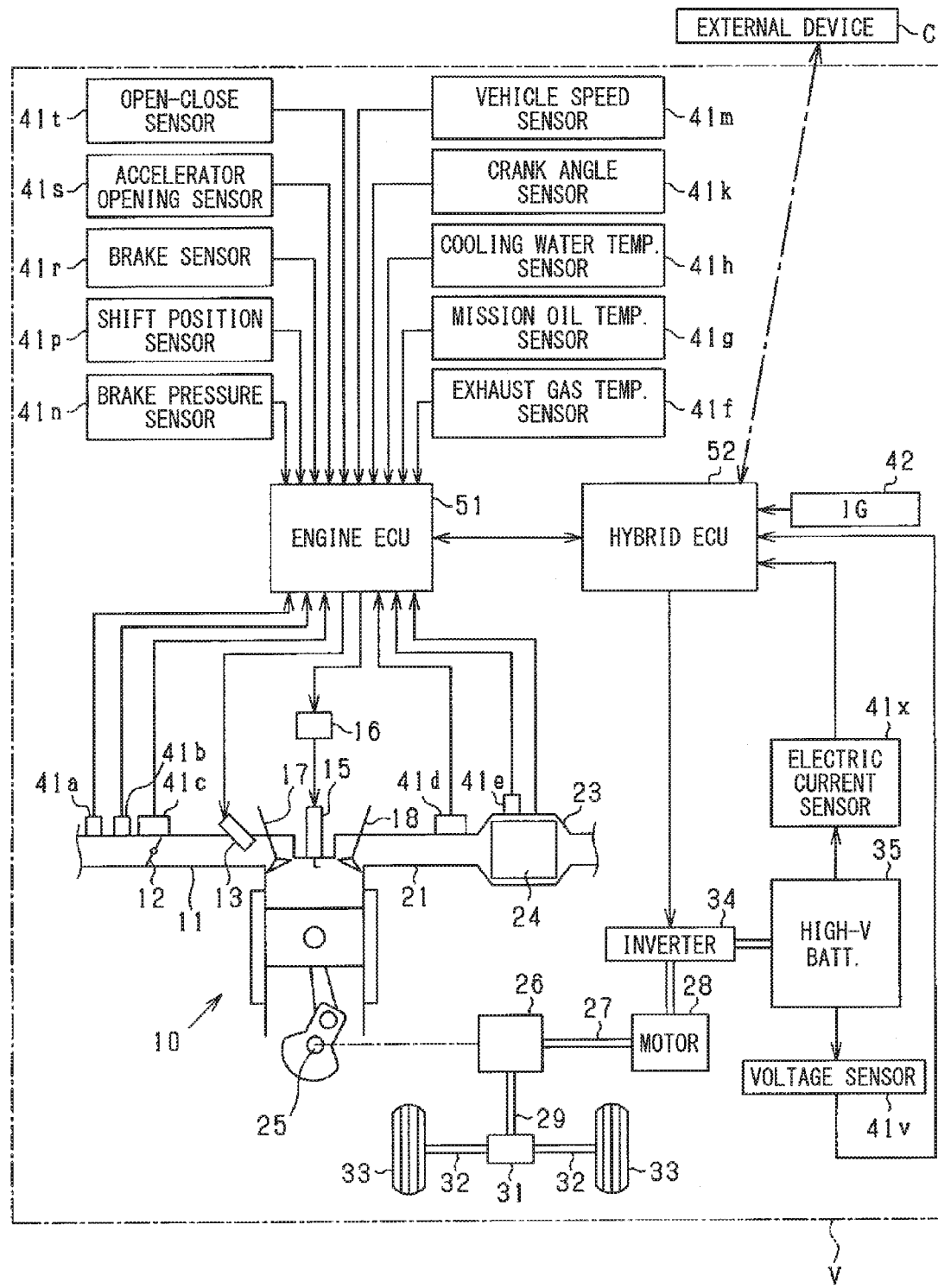
FIG. 1 is a block diagram of a vehicle to which one embodiment of the present disclosure is applied.

Hereafter, one embodiment which materializes the present disclosure is described, referring to the drawings. For the ease of understanding of the embodiment, a modification, or modifications, of the embodiment is not put in a description of an embodiment, but is put at the end of the description thereof.

<Entire Configuration of a Vehicle>

An external device C shown in FIG. 1 is disposed in data-communicable manner with a vehicle V, which is a so-called hybrid vehicle, via a communication channel that is either a wired communication or a wireless communication.

The vehicle V has an engine 10 (i.e., a multi-cylinder gasoline engine of a spark ignition type) installed therein. A throttle valve 12 of the electric drive type is disposed in an inlet pipe 11 of the engine 10. Near an intake port which is a connection section between the inlet pipe 11 and a cylinder, an injector 13 as a means to inject gasoline fuel is disposed. A spark plug 15 and an igniter 16 which applies high voltage for an ignition of the spark plug 15 are disposed on each cylinder as an ignition means of the engine 10. An intake valve 17 and an exhaust valve 18 are respectively disposed in the intake port and in the exhaust port.

A catalytic converter 23 as an exhaust emission purifier is disposed in an exhaust pipe 21 of the engine 10. The catalytic converter 23 has a three-way catalyst, for example, and it is configured so that the detrimental constituent (i.e., HC, CO, NOx) in the exhaust gas is purified when the exhaust gas passes therethrough.

A transmission 26 containing a power distribution device with a planetary gear mechanism is connected to a crank shaft 25 of the engine 10. A motor 28 which can operate as an electric motor and as a generator is connected to the transmission 26 via a gear shaft 27. Further, to the transmission 26, a wheel (i.e., a driving wheel) 33 is connected via an output shaft 29, a differential gear 31, and a drive shaft 32. That is, the transmission 26 is configured to be capable of outputting an output power of the engine 10 and an output power of the motor 28 to the same drive shaft 32.

The motor 28 is connected to a high voltage battery 35 via an inverter 34. When the motor 28 operates as a generator, the inverter 34 is used for charging an electric power to the high voltage battery 35, after converting the electric power generated by the motor 28 from a direct current to an alternating current.

On the other hand, when the motor 28 operates as an electric motor, the inverter 34 is used to convert the electric power outputted from the high voltage battery 35 from the direct current to the alternating current, and to output the converted electric power to the motor 28.

Two or more sensors which are illustrated in part below are disposed in the vehicle V. Specifically, the inlet pipe 11 has, disposed thereon, an air flow meter 41$a$, an intake air temperature sensor 41$b$, and a throttle position sensor 41$c$. The air flow meter 41$a$ is disposed so that the output (of the meter 41$a$) corresponds to the mass flow rate (Ga) of the intake air which passes through the inlet pipe 11. The intake air temperature sensor 41$b$ is disposed so that the output corresponds to the temperature (Tin) of the above-mentioned intake air. The throttle position sensor 41$c$ is disposed at a position corresponding to the throttle valve 12 so that the output corresponds to a throttle opening TA which is an opening (i.e., a rotation angle) of the throttle valve 12.

On the exhaust pipe 21, an A/F sensor 41$d$, a catalyst temperature sensor 41$e$, and an exhaust gas temperature sensor 41$f$ are provided. The A/F sensor 41$d$ is an oxygen density sensor which produces an output corresponding to the oxygen density in the exhaust gas, and is disposed at an upstream position of the catalytic converter 23 on the exhaust pipe 21. The catalyst temperature sensor 41$e$ is disposed on the catalytic converter 23 so that the output of the sensor 41$e$ corresponds to the temperature (Tc) of the catalytic converter 23. The exhaust gas temperature sensor 41$f$ is provided so that the output of the sensor 41$f$ corresponds to the temperature (Tex) of the exhaust gas which passes through the exhaust pipe 21.

The transmission 26 is equipped with a mission oil temperature sensor 41$g$. The mission oil temperature sensor 41$g$ is disposed so that the output corresponds to the operating oil temperature inside the transmission 26 (Tm). Further, the engine 10 is equipped with a cooling water temperature sensor 41$h$, and a crank angle sensor 41$k$. The cooling water temperature sensor 41$h$ is disposed so that the output corresponds to a cooling water temperature (Tw) of the engine 10. The crank angle sensor 41$k$ is disposed on a crank case of the engine 10 so that an output signal therefrom includes a narrow width pulse at every 10 degree rotation of the crank shaft 25 and a broad width pulse at every 360 degree rotation of the crank shaft 25, which may be mainly used for a detection of an engine rotation number Ne.

The vehicle V is equipped with a vehicle speed sensor 41$m$, and a brake pressure sensor 41$n$. The vehicle speed sensor 41$m$ is disposed so that the output corresponds to a travel speed (ve) of the vehicle V. The brake pressure sensor 41$n$ is disposed so that the output corresponds to a brake oil pressure (Pbr) which is a pressure of a hydraulic fluid supplied to a brake caliper (not illustrated) from a brake actuator (not illustrated).

The vehicle V is equipped with a shift position sensor 41$p$, a brake sensor 41$r$, an accelerator opening sensor 41$s$ and an open-close sensor 41$t$. The shift position sensor 41$p$ is disposed so that the output corresponds to an operation state of the gearshift (not illustrated) disposed near the driver's seat of the vehicle V. The brake sensor 41$r$ is disposed so that the output corresponds to an operation amount of a brake pedal (not illustrated). The accelerator opening sensor 41$s$ is disposed so that the output corresponds to an accelerator opening Acc which is an operation amount of an accelerator (not illustrated). The open-close sensor 41$t$ is disposed so that the output corresponds to an open-close state of a door of the vehicle V or of a hood of the vehicle V (not illustrated).

A voltage sensor 41$v$ and an electric current sensor 41$x$ are electrically connected to the high voltage battery 35. The voltage sensor 41$v$ is disposed so that the output corresponds to a voltage Vb between the terminals of the high voltage battery 35. The electric current sensor 41$x$ is disposed so that the output corresponds to charge and discharge currents Ib of the high voltage battery 35.

A start switch 42, which may also be called as an ignition switch, is provided in the vehicle V. The start switch 42 is a switch operated for a switch ON and a switch OFF of the vehicle V (i.e., a hybrid system), and is disposed near the driver's seat.

An engine ECU 51 and a hybrid ECU 52 are provided in the vehicle V. The engine ECU 51 and the hybrid ECU 52 are basically comprised of a microcomputer that has, as well-known, CPU, ROM, RAM, etc., respectively, and perform various controls about an operation of the vehicle V by executing various kinds of control programs memorized in the ROM.

Specifically, the engine ECU 51 is electrically connected to the above-mentioned sensors, except for the voltage sensor 41$v$ and the electric current sensor 41$x$. The hybrid ECU 52 is electrically connected to the voltage sensor 41$v$, the electric current sensor 41$x$, and to the start switch 42. The engine ECU 51 and the hybrid ECU 52 are electrically connected with each other for an exchange of signals.

The engine ECU 51 receives, as an input signal, a signal outputted from the above-mentioned sensors and the hybrid ECU 52 which are electrically connected thereto (i.e., to the ECU 51), and controls a drive of each part (i.e., the injector 13, igniter 16 etc.) of the engine 10 based on such input signal. The hybrid ECU 52 receives an output signal of the above-mentioned sensors, except for the voltage sensor 41$v$ and the electric current sensor 41$x$, via the engine ECU 51, and (directly) receives an output signal outputted from the voltage sensor 41$v$ and the electric current sensor 41$x$, and, based on those received signals, performs an operation control of the motor 28, an operation control of the inverter 34, a charge and discharge control of the high voltage battery 35, etc.

Further, the engine ECU 51 and the hybrid ECU 52 perform, in cooperation with each other (i.e., through an exchange of a control signal, data, etc.), various controls such as a travel mode control, a temporal stop/restart control of the engine 10 etc. regarding the vehicle V (i.e., a hybrid system). That is, the vehicle V is provided with a temporal stop function of the engine 10 in a hybrid system (i.e., a function that temporarily stops the engine 10 when a prescribed condition is satisfied). A "temporal engine stop function" is a function to temporarily stop the engine when a prescribed condition is satisfied. In the following description, "a temporal stop of an engine" may simply be designated as "a temporal stop" or "a temp-stop" for brevity. Similarly, "a temporal engine stop function" may simply be designated as "a temporal stop function" or a "temp-stop function" for brevity.

<System Configuration of a Vehicle Diagnosis System of the First Embodiment>

Figure 2:
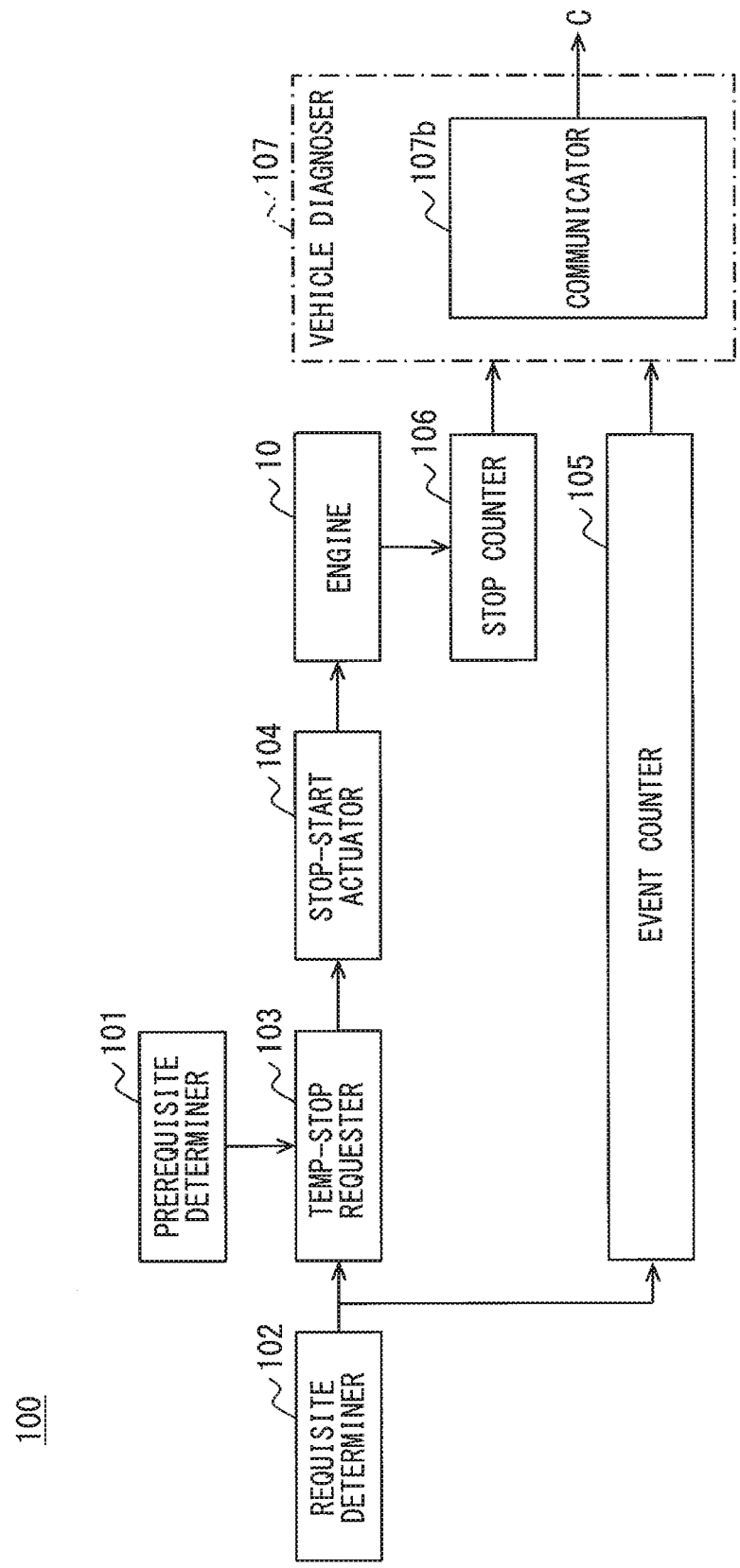
FIG. 2 is a functional block diagram of a vehicle diagnosis system of the vehicle in FIG. 1 and an external device of the present disclosure.

With reference to FIG. 2, a vehicle diagnosis system 100 in the first embodiment of the present disclosure is described in terms of how it performs a process about diagnosis of the vehicle V of FIG. 1. Specifically, such a vehicle diagnosis system 100 has a prerequisite determiner 101, a requisite determiner 102, a temp-stop requester 103, a stop-start actuator 104 (i.e., a temporal-stop and restart section 104 in a very true translation), an event counter 105, a stop counter 106, and a vehicle diagnoser 107.

The prerequisite determiner 101 equivalent to a "prerequisite determiner" of the present disclosure is provided so that formation, or a satisfaction, of the prerequisite for performing a temporal stop may be determined. Such a "prerequisite" is a condition, or a state of the vehicle V, that should normally, i.e., when having no abnormality/failure, be satisfied after a preset time from a start of the engine 10, which may be at least one of the followings.

(1) $Tw > Tw0$ (i.e., Tw0: a specified value), (2) Completion of warming up of the catalytic converter 23: [$Tc > Tc0$ (i.e., Tc0: a specified value)], (3) The A/F sensor 41$d$ in an active state, (4) $Tm > Tm0$ (i.e., Tm0: a specified value), (5) SOC of the high voltage battery 35 is in an estimable/foreseeable state (SOC: State Of Charge), (6) $SOC > SOCth$ (i.e., SOCth: a specified value), (7) $Vb > Vb0$ (i.e., Vb0: a specified value), and (8) Specific components (e.g., the high voltage battery 35, an alternator, a starter motor, etc.) not in an out of order state.

In the present embodiment, the prerequisite determiner 101 determines "the satisfaction of the prerequisite" when all of the conditions (1)-(8) mentioned above are satisfied.

Specifically, the item (5) "SOC of the high voltage battery 35 is in an estimable/foreseeable state" may be rephrased as a condition in which the high voltage battery 35 is substantially in a full charge state at least once (i.e., a charging current<a predetermined threshold value). That is, SOC can be estimated, as everyone knows, based on "a relation between a charging current and SOC." Now, when SOC is low, "the relation between the charging current and SOC" may vary drastically under the influence of the temperature etc., which does not enables an accurate estimation of SOC. Therefore, a standard procedure of estimating SOC is that, (i) a battery is once brought to a full charge state, and (ii) an SOC estimation value of such a full charge state is obtained, and (iii) such an SOC estimation value is updated according to the charging and discharging currents of the high voltage battery 35.

The requisite determiner 102 equivalent to a "requisite determiner" or an "operation condition determiner" of the present disclosure is provided so that formation, or a satisfaction, of an operation condition (i.e., requisite, or a condition, for a temporal stop which is different from the above-mentioned prerequisite) may be determined.

The "operation condition" is a state of drive operation of the vehicle V for performing a temporal stop, based on an assumption that the "prerequisite" is (already) satisfied/satisfied, which may be at least one of the followings.

(i) Brake ON (i.e., the amount of brake pedal operation is equal to or greater than a predetermined quantity), (ii) Accelerator-OFF [$Acc < Acc0$ (i.e., Acc0: a specified value)], (iii) $ve < ve0$ (i.e., ve0: a specified value), (iv) Door and hood closed, and (v) $Pbr > Pbr0$ (i.e., Pbr0: a specified value).

In the present embodiment, the requisite determiner 102 determines "the satisfaction of the requisite" when all of the conditions (i)-(v) mentioned above are satisfied.

When satisfaction of a prerequisite is determined by the prerequisite determiner 101 and satisfaction of an operation condition (i.e., requisite) is determined by the requisite determiner 102, the temp-stop requester 103 is configured to issue a temporal stop request (i.e., a signal for performing a temporal stop process of the engine 10). Based on a reception state of the temporal stop request from the temp-stop requester 103, the stop-start actuator 104 is configured to temporarily stop the engine 10 and restarts the engine 10.

The event counter 105 is equivalent to an "event counter" of the present disclosure is provided so that an event counted value Creq may be obtained. In the present embodiment, an "event counted value Creq" is a counted value about the frequency of, i.e., the number or quantity of, "expected events." The "expected event" is an event in which satisfaction of the operation condition (i.e., requisite) is determined by the requisite determiner 102 in a prerequisite satisfaction expected state, i.e., in which satisfaction of the prerequisite is expected.

In the present embodiment, the "prerequisite satisfaction expected state" which is the condition for obtainment of the event counted value Creq shall mean a time lapse state in which a predetermined time has passed from a start of the engine 10. Here, the "predetermined time" should be respectively different for a restart-from-temp-stop case and for other cases (i.e., typically, for a cold-start case). Therefore, in the present embodiment, the event counter 105 switches a threshold value for the restart-from-temp-stop case and for the other cases, for the determination whether the predetermined time has passed from a start of the engine 10.

The stop counter 106 is equivalent to an "episode counter" or an "operation counter" of the present disclosure is provided so that an operation counted value Cstp may be obtained. Here, in the present embodiment, the "operation counted value Cstp" is a counted value about the frequency, or the number or quantity of, temporal stop operations by the stop-start actuator 104, i.e., how many times an operation is performed for a temporal stop.

As clearly understood from the above description, the prerequisite determiner 101, the requisite determiner 102, the temp-stop requester 103, the event counter 105, and the stop counter 106 are provided in the hybrid ECU 52. Further, the stop-start actuator 104 is provided in the engine ECU 51.

The vehicle diagnoser 107 is configured to send the event counted value Creq obtained by the event counter 105 and the operation counted value Cstp obtained by the stop counter 106 to the external device C from the vehicle V (refer to FIG. 1). Specifically, the vehicle diagnoser 107 is provided with a communicator 107b. The communicator 107b, which is provided in the hybrid ECU 52, sends the newest/latest value of the event counted value Creq obtained by the event counter 105 and the newest value of operation counted value Cstp obtained by the stop counter 106 to the external device C according to a request from the external device C, or the like. These newest values transmitted to the external device C by the communicator 107b may be memorized by the event counter 105, or by the stop counter 106, or may also be memorized by a memory provided in the vehicle diagnoser 107.

In the present embodiment, the event counter 105 obtains the event counted value Creq by counting the number of trips in which the expected event happened. Further, the stop counter 106 obtains the operation counted value Cstp by counting the number of trips in which a temporal stop (causing) operation had happened (i.e., causing a temporal stop operation to occur). In the present embodiment, a "trip" shall mean a period from a switching OFF to ON of the start switch 42 to a next switching OFF to ON of the start switch 42.

<Operation of the Vehicle Diagnosis System in the First Embodiment>

The operation and effect of the configuration of the present embodiment is described in the following.

The engine ECU 51 and the hybrid ECU 52 control an operation of each part of the vehicle V (i.e., a hybrid system) based on the various states etc. of the vehicle V grasped by the output signal of the above-mentioned multiple sensors, exchanging various signals among the two (ECUs). Specifically, the hybrid ECU 52 obtains the various states of the vehicle V, etc., based on the input signals from the voltage sensor 41v, the electric current sensor 41x, the start switch 42 etc., and also based on the signal inputted by the signal exchange with the engine ECU 51, etc., for example. Then, the hybrid ECU 52 sets up a travel mode (i.e., including a temporal stop/restart of the engine 10) of the vehicle V, taking the fuel mileage of the engine 10 into consideration and based on the various states etc. of the vehicle V.

The engine ECU 51 performs a drive control of the engine 10 according to the travel mode set up (i.e., determined) by the hybrid ECU 52. That is, for example, the engine ECU 51 performs various controls (i.e., a fuel injection control including a so-called fuel cut, an ignition control, etc.) of the engine 10 during a drive period of the engine 10 based on the drive state or the like of the vehicle V. The hybrid ECU 52 calculates a remaining amount of charge (SOC) of the high voltage battery 35 based on the charge and discharge currents detected by the electric current sensor 41x. Further, the hybrid ECU 52 controls the drive of the motor 28, the inverter 34 etc. based on the drive state of the vehicle V, a remaining amount of charge of the high voltage battery 35, or the like.

Hereafter, a temporal stop/restart control of the engine 10, especially, a temporal stop control, is described in more details. As mentioned above, in such a control, whether the prerequisite for performing a temporal stop is satisfied is determined by the prerequisite determiner 101. Further, whether the above-mentioned operation condition (i.e., requisite) is satisfied is determined by the requisite determiner 102.

When satisfaction of the prerequisite is determined by the prerequisite determiner 101 and satisfaction of the operation condition (i.e., requisite) is determined by the requisite determiner 102, a temporal stop request is issued by the temp-stop requester 103. If such a temporal stop request is issued, the stop-start actuator 104 temporarily stops the engine 10.

Here, in a normal operation, i.e., having no abnormality/failure, the prerequisite satisfied determination by the prerequisite determiner 101 should be established after a predetermined time from a start of the engine 10, as mentioned above. Therefore, if the above-mentioned operation condition (i.e., requisite) is satisfied after a predetermined time from a start of the engine 10 (with a reservation that "a predetermined time" is different for a restart-after-temp-stop case and for other cases), the engine 10 is temporarily stopped and a greenhouse gas reduction effect should be achieved.

However, a following scenario may have to be considered. That is, the temporal stop of the engine 10 may be not performed, or may be hindered due to unknown abnormality/failure, even though (i) the prerequisite has already been satisfied and (ii) the above-mentioned operation condition (i.e., requisite) has already been satisfied, which results in cancelling the greenhouse gas reduction effect (i.e., the reduction effect will not be fully/preferably achieved). Driving the vehicle V continued for a long time in such a state, i.e., a temp-stop function disabled state, is problematic from a viewpoint of an environmental impact. Therefore, when such an abnormality (i.e., failure) is caused, the driver (of the vehicle V) should be prompted to fix the vehicle as soon as possible.

Thus, the event counter 105 counts a value regarding the number of occurrences of the expected event (i.e., more practically, the number of trips in which the expected event happened), and obtains the event counted value Creq. Specifically, the event counter 105 increments, i.e., counts up by only one count, the event counted value Creq, when an expected event occurs even once in the current trip. Further, the event counter 105 switches a threshold value for a restart-after-temp-stop case and for other cases, for a determination of a condition, i.e., whether a predetermined time has passed from a start of the engine 10, which is, in other words, a "prerequisite satisfaction expected state."

Further, the stop counter 106 obtains the operation counted value Cstp, by counting a value regarding the number of temporal stop (causing) operations (i.e., the number of trips in which the stop-start actuator 104 has performed a temporal stop (causing) operation). Specifically, the stop counter 106 increments, i.e., counts up only one count, the operation counted value Cstp, when the above-mentioned operation occurs even once in the current trip. The event counted value Creq and the operation counted value Cstp are outputted to the external device C by the communicator 107b provided on a vehicle V side.

Thus, in the present embodiment, information about whether "the abnormality of a temporal stop function in a mode by which a greenhouse gas reduction effect is reduced/cancelled" is caused is transmitted to the external device C side from the vehicle V via the communicator 107b. Therefore, according to the present embodiment, the vehicle diagnosis system 100 enables a manufacturer, a seller, a maintenance personnel or the like of the vehicle V to quickly and appropriately obtain a state of abnormality (i.e., failure) of the vehicle V which leads to an increase of the greenhouse gas emitted from the vehicle V in a market.

<System Configuration of a Vehicle Diagnosis System of the Second Embodiment>

Another example (i.e., a different embodiment) of the configuration concerning the present disclosure is described in the following. The example(s) in the following share the same/like numbers for the same/like parts, for the brevity of the description. Further, the same/like parts, unless otherwise described, or unless any technical difficulty affects, operate in the same manner and achieve the same/similar effects as the preceding one.

Figure 3:
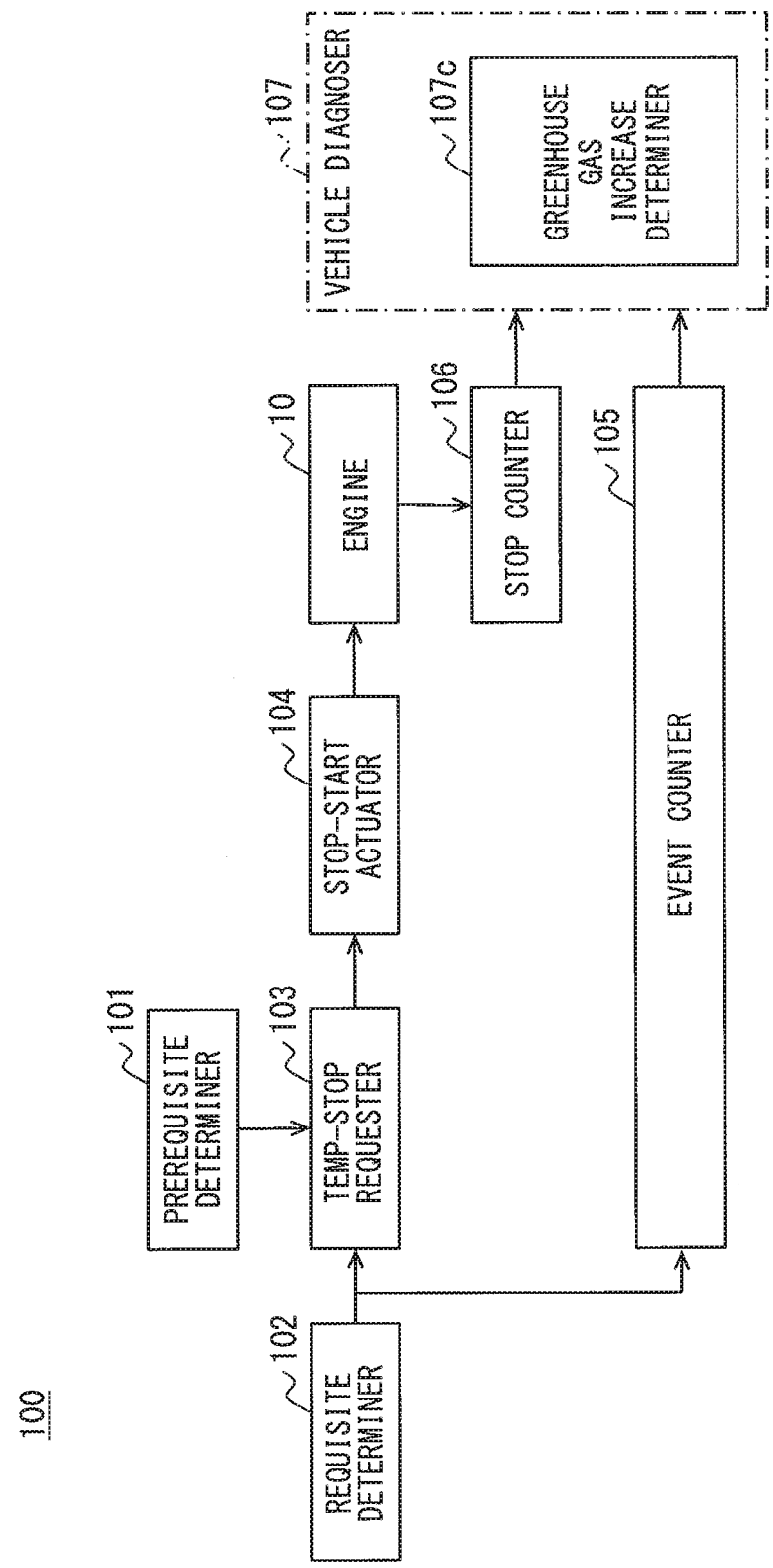
FIG. 3 is a functional block diagram of the vehicle diagnosis system of the vehicle in FIG. 1 and the external device of the present disclosure.

With reference to FIG. 3, the vehicle diagnosis system 100 in the second embodiment of the present disclosure is understood as being configured to perform a diagnosis of the vehicle V (see also FIG. 1). Specifically, such vehicle diagnosis system 100 has the prerequisite determiner 101, the requisite determiner 102, the temp-stop requester 103, the stop-start actuator 104, the event counter 105, the stop counter 106, and the vehicle diagnoser 107. In the present embodiment, the prerequisite determiner 101, the requisite determiner 102, the temp-stop requester 103, the stop-start actuator 104, the event counter 105, and the stop counter 106 are the same as those of the above-mentioned first embodiment.

In the present embodiment, the vehicle diagnoser 107 is provided with a greenhouse gas increase determiner 107c. Such a greenhouse gas increase determiner 107c is configured to detect/determine, based on the newest value (i.e., a value received from the communicator 107b) of the event counted value Creq and the operation counted value Cstp, whether "the abnormality of a temporal stop function in a mode by which a greenhouse gas reduction effect is reduced/cancelled" is caused. In the following, such determination is designated as "a greenhouse gas increase determination."

<Operation of the Vehicle Diagnosis System in the Second Embodiment>

The operation and effect in the configuration of the present embodiment are described in the following. In flowcharts in FIG. 4 and other drawings, a "step" is written as "S" that is prefixed to a step number.

The determination by the prerequisite determiner 101 whether the prerequisite has been satisfied is, in a normal operation, i.e., having no abnormality/failure, is established as satisfied after a predetermined time from a start of the engine 10. Therefore, when the prerequisite is satisfied after a predetermined time from a start of the engine 10 (with a reservation that "a predetermined time" is different for a restart-after-temp-stop case and for other cases), the temporal stop of the engine 10 is (i.e., should be) performed and the greenhouse gas reduction effect should be achieved/exerted.

However, a following scenario may have to be considered. That is, the temporal stop of the engine 10 may be not performed, or may be hindered due to some/unknown abnormality/failure, even though (i) the prerequisite has already been satisfied and (ii) the above-mentioned operation condition (i.e., requisite) has already been satisfied, which results in cancelling the greenhouse gas reduction effect (i.e., the reduction effect will not be fully/preferably achieved). Driving the vehicle V continued for a long time in such a state, i.e., a temp-stop function disabled state, is problematic from a viewpoint of an environmental impact. Therefore, when such an abnormality (i.e., failure) is caused, the driver (of the vehicle V) should be prompted to fix the vehicle as soon as possible. Thus, in the present embodiment, the vehicle diagnose 107 (i.e., the greenhouse gas increase determiner 107c) performs the greenhouse gas increase determination based on an occurrence state of a temporal stop (causing) operation.

That is, the event counter 105 counts a value regarding the number of occurrence times of an expected event (i.e., the number of trips in which the expected event had happened, more specifically), and obtains the event counted value Creq. Specifically, the event counter 105 increments, or counts up, by only one count, the event counted value Creq when an expected event occurs even once in the current trip. Further, the event counter 105 switches a threshold value for a restart-after-temp-stop case and for other cases, for a determination of a condition, i.e., whether a predetermined time has passed from a start of the engine 10, which is, in other words, a "prerequisite satisfaction expected state."

Further, the stop counter 106 obtains the operation counted value Cstp, by counting a value regarding the number of temporal stop (causing) operations (i.e., the number of trips in which the stop-start actuator 104 has performed a temporal stop (causing) operation). Specifically, the stop counter 106 increments, i.e., counts up only one count, the operation counted value Cstp, when the above-mentioned operation occurs even once in the current trip. Then, the greenhouse gas increase determiner 107c performs the greenhouse gas increase determination, based on the newest values of the event counted value Creq and the operation counted value Cstp.

Figure 4:
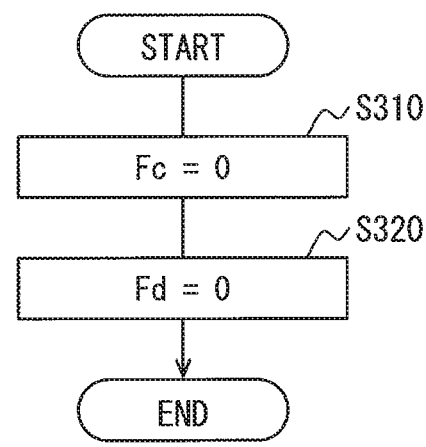
FIG. 4 is a flowchart of an operation of the vehicle diagnosis system in FIG. 3.
Figure 5:
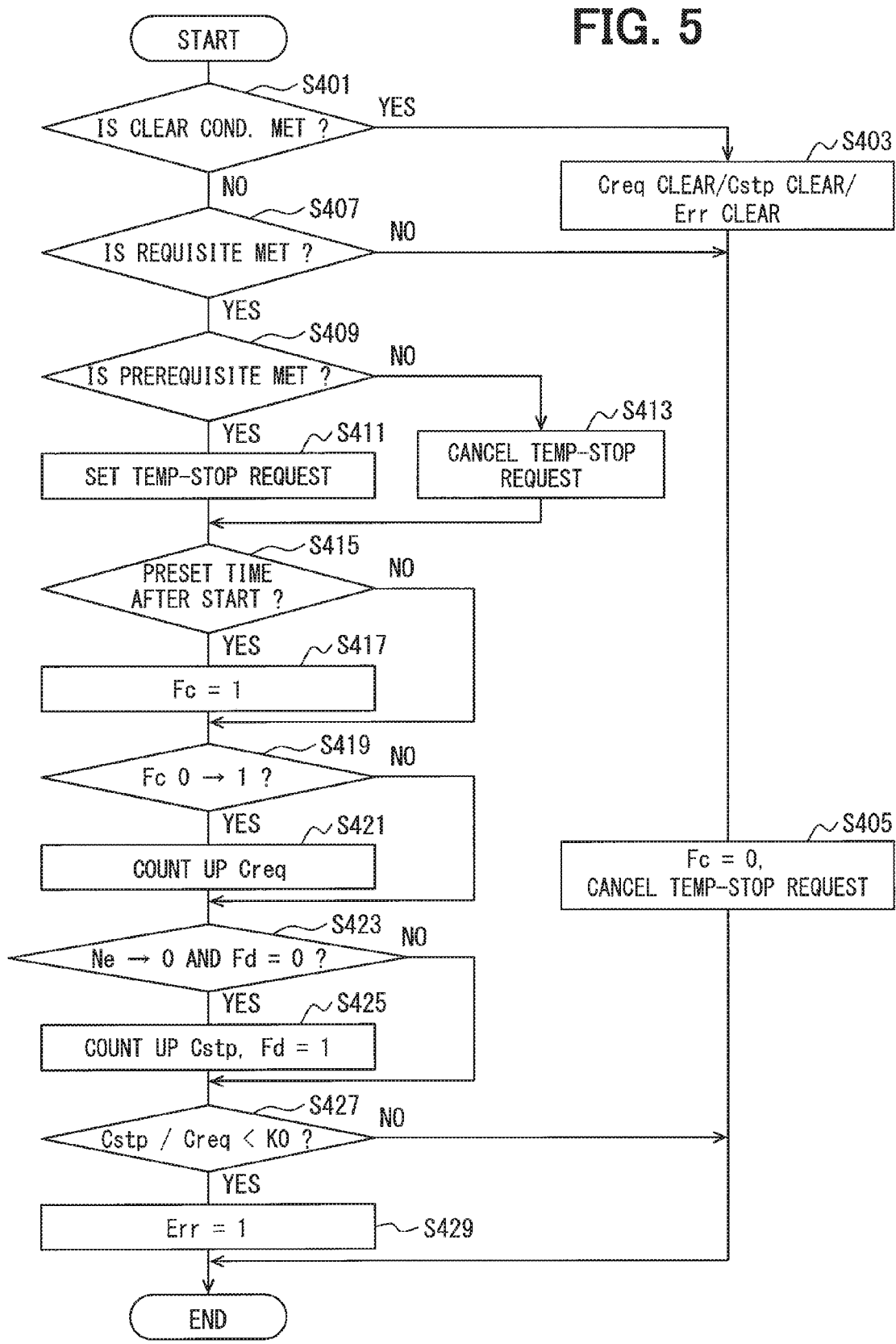
FIG. 5 is a flowchart of an operation of the vehicle diagnosis system in FIG. 3.

Hereafter, one example of the above-mentioned operation is described in flowcharts shown in FIGS. 4 and 5. An initialization routine shown in FIG. 4 is started by a main CPU in the hybrid ECU 52 immediately after a start of the hybrid system by the start switch 42. After the start of this routine, in Step 310, the routine resets a count request flag Fc first (Fc=0). Next, a temp-stop already-counted flag Fd is reset in Step 320 (Fd=0). Then, such routine is finished.

The procedure shown in FIG. 5 is performed at predetermined intervals after a start of the hybrid system by the start switch 42. When such a procedure (i.e., a series of processes) is started, whether predetermined clear conditions (e.g., input of a clear command from the external device C, etc.) are satisfied is determined in Step 401. If the clear conditions are satisfied (Step 401=YES), after the proceeding to Steps 403 and 405, such procedure will once be finished. On the other hand, if clear conditions are not satisfied (Step 401=NO), the process proceeds to Step 407.

In Step 403, memory values of the event counted value Creq and the operation counted value Cstp are cleared (i.e., reset of the values: Creq=0, Cstp=0). Further, a greenhouse gas increase determination flag Err is cleared (Err=0). That is, greenhouse gas increase determination conditions in the greenhouse gas increase determiner 107c are reset.

In Step 405, while the count request flag Fc is reset (Fc=0), a temporal stop request is canceled.

In Step 407, whether the operation condition (i.e., requisite) is satisfied is determined. When the operation condition (i.e., requisite) is not satisfied (Step 407=NO), after the process proceeds to above-mentioned step 405, such procedure is once finished. On the other hand, when the operation condition (i.e., requisite) is satisfied (Step 407=YES), the process proceeds to Step 409.

In Step 409, whether the prerequisite is satisfied or not is determined.

When the prerequisite is satisfied (Step 409=YES), the process proceeds to Step 411 and a temporal stop request is set. On the other hand, when the prerequisite is not satisfied (Step 409=NO), the process proceeds to Step 413 and a temporal stop request is canceled. Thus, after the process of Step 411 or the process of 413 is performed according to the determined result of Step 409, the process proceeds to Step 415.

In Step 415, whether a predetermined time has pass after a start of the engine 10 is determined. Step 415 is a determination process regarding an "expected event" or a "prerequisite satisfaction expected state." When it is determined that the predetermined time has passed after the start (Step 415=YES), the process proceeds to Step 417, and the count request flag Fc is set (Fc=1), and the process proceeds to Step 419 thereafter. On the other hand, when it is determined that the predetermined time has not passed after the start (Step 415=NO), the process of Step 417 is skipped and the process proceeds to Step 419 thereafter.

Further, for a determination of Step 415, the threshold value of the determination of whether a predetermined time has passed from a start of the engine 10 is switched for a restart-after-temp-stop case and for other cases. Specifically, a threshold value for the restart-after-temp-stop case is set as a value smaller than a threshold value for the other cases (see a setting process of a threshold value t0 in a flowchart of FIG. 7 concerning the embodiment mentioned later).

In Step 419, whether the count request flag Fc is changed to the set state from the reset state by a current execution of the procedure is determined. When the count request flag Fc has been changed into the set state from the reset state by the current execution of the procedure (Step 419=YES), after proceeding to Step 421 and the event counted value Creq counted up (i.e., incremented), the process proceeds to Step 423.

On the other hand, when the determination of Step 419 is "NO", the process of Step 421 is skipped and the process proceeds to Step 423 thereafter.

In Step 423, whether an "edge" which indicates that an engine rpm Ne is equal to zero is detected is determined, and whether a temp-stop already-counted flag Fd is in the reset state (Fd=0) is determined. When both of the above are affirmed (Step 423=YES), after proceeding to Step 425, the process proceeds to Step 427.

In Step 425, while the operation counted value Cstp is counted up (i.e., incremented), a temp-stop already-counted flag Fd is set (Fd=1). On the other hand, when at least one of the two is negatively determined (Step 423=NO), the process of Step 425 is skipped and the process proceeds to Step 427.

In Steps 427 and 429, the greenhouse gas increase determination is performed based on the event counted value Creq and the operation counted value Cstp. Specifically, it is first determined in Step 427 whether the value (i.e., a ratio) which is derived by dividing the operation counted value Cstp by the event counted value Creq is smaller than a predetermined threshold value K0. After the process of Step 429 is performed according to the determined result in Step 427, the procedure is once finished.

When the value of Cstp divided by Creq is smaller than the threshold value K0 (Step 427=YES), whether the abnormality about the temporal stop function in the mode by which a greenhouse gas reduction effect is reduced is caused is determined. Therefore, the process proceeds to Step 429 in such case, and the greenhouse gas increase determination flag Err is set (Err=1).

On the other hand, when the value of Cstp divided by Creq is greater than the threshold value K0 (Step 427=NO), the process of Step 429 is skipped.

Thus, in the present embodiment, whether the abnormality about the temporal stop function in the mode by which a greenhouse gas reduction effect is reduced is caused is determined based on an occurrence state of the temporal stop (causing) operation in the prerequisite satisfaction expected state.

A determination of occurrence of such an abnormality may enable a quick fix of the abnormality as soon as possible by notifying a driver etc. about such an abnormality. Therefore, according to the present embodiment, the system 100 reduces the environmental impact caused by the vehicle V having the engine 10 as much as possible.

Third Embodiment

Figure 6:
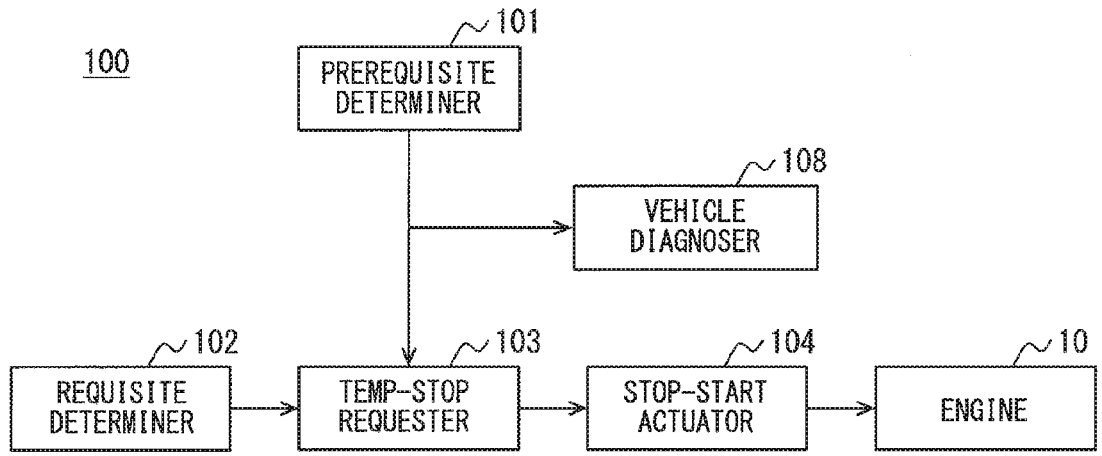
FIG. 6 is a functional block diagram of the vehicle diagnosis system of the vehicle in FIG. 1 and the external device of the present disclosure.

The vehicle diagnosis system 100 in the third embodiment of the present disclosure is provided with the prerequisite determiner 101, the requisite determiner 102, the temp-stop requester 103, the stop-start actuator 104, and a vehicle diagnoser 108 as shown in FIG. 6. The prerequisite determiner 101, the requisite determiner 102, the temp-stop requester 103, and the stop-start actuator 104 are the same as those of the above-mentioned first embodiment.

In the present embodiment, the vehicle diagnoser 108 is disposed in the hybrid ECU 52, i.e., on a vehicle V side. Such a vehicle diagnoser 108 performs the greenhouse gas increase determination based on the determination state in the prerequisite determiner 101. That is, the vehicle diagnoser 108 is provided with a greenhouse gas determination section (refer to greenhouse gas determination section 107c in FIG. 3) as well as the vehicle diagnoser 107 in the second embodiment.

Specifically, the vehicle diagnoser 108 determines whether the abnormality about the temporal stop function in the mode by which a greenhouse gas reduction effect is reduced is caused when satisfaction of the prerequisite is not determined by the prerequisite determiner 101 even after satisfaction of a condition of a predetermined time having passed after a start of the engine 10. Further, the vehicle diagnoser 108 switches a threshold value (i.e., a threshold value t0 in a flowchart of FIG. 7) for determining whether a condition of a predetermined time having passed after a start of the engine 10 is satisfied for a restart-after-temp-stop case and for other cases.

Hereafter, one example of operation by the configuration of the third embodiment is described.

Figure 7:
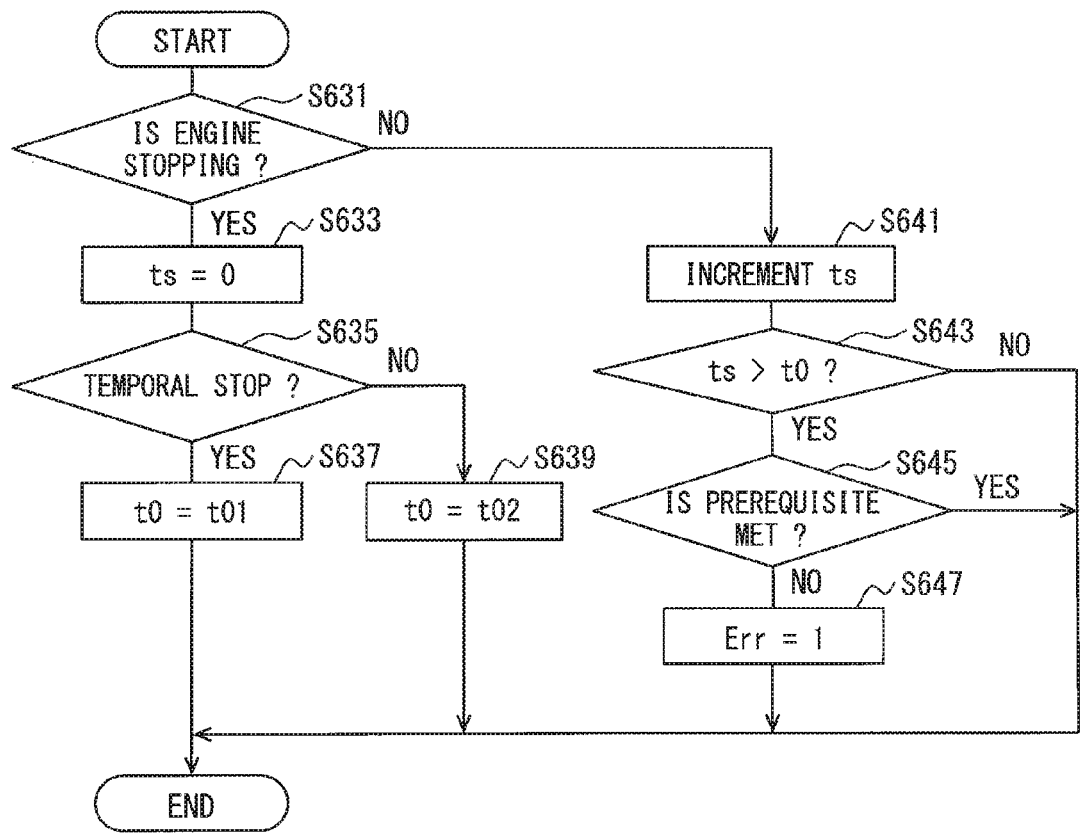
FIG. 7 is a flowchart of an operation of the vehicle diagnosis system in FIG. 6.

The procedure shown in FIG. 7 is performed at predetermined intervals after a start of the hybrid system by the start switch 42. When such a procedure (i.e., a series of processes) is started, whether the engine 10 is stopping is determined in Step 631 first. When the engine 10 is currently stopping (Step 631=YES), after the processes of Steps 633-639 are performed, the procedure is once finished. On the other hand, when the engine 10 is currently operating (Step 631=NO), after the processes of Steps 641-647 are performed, the procedure is once finished.

That is, when the engine 10 is currently stopping (Step 631=YES), the process proceeds to Step 633, and an engine operation time counter ts is reset (ts=0). Next, the process proceeds to Step 635, and whether a stop the engine 10 is "a temporal stop," i.e., a stop of the engine 10 is caused by the temporal stop request issued by the temp-stop requester 103.

When a temporal stop of the present the engine 10 is a "temporal stop" (Step 635=YES), the process proceeds to Step 637, and the threshold value t0 is set to a specified value t01 (t0=t01).

On the other hand, when a stop of the engine 10 is not a "temporal stop" (Step 635=NO), the process proceeds to Step 639 and the threshold value t0 is set to t02 which is a greater value than the above-mentioned specified value t01 (t0=t02).

In this example, such value t02 is obtained from a map (i.e., from a look-up table) which defines t0 values with parameters such as a cooling water temperature (Tw), an intake air temperature (Tin) etc. of the engine 10.

When the engine 10 is currently operating (Step 631=NO), the process proceeds to Step 641, and an increment of the engine operation time counter ts is performed. Next, in Step 643, whether the engine operation time counter ts is greater than the threshold value t0 is determined. Here, the threshold value t0 is switched for a restart-after-temp-stop case and for other cases by the processes after the above-mentioned step 635. Therefore, the process in Step 643 determines whether a predetermined time has passed from a start of the engine 10 with respectively different thresholds for the restart-after-temp-stop case and for the other cases.

When the engine operation time counter ts is equal to or smaller than the threshold value t0 (Step 643=NO), the process after Step 645 is skipped and the procedure is once finished.

On the other hand, when the engine operation time counter ts is greater than the threshold value t0 (Step 643=YES), after proceeding to Step 645, the procedure is once finished (i.e., finished for the current cycle).

In Step 645, whether a satisfaction of the prerequisite is determined by the prerequisite determiner 101 is determined. When the determined result by the prerequisite determiner 101 is "prerequisite unsatisfied" (Step 645=NO), the process proceeds to Step 647 and the greenhouse gas increase determination flag Err is set (Err=1). On the other hand, when the determined result by the prerequisite determiner 101 is "prerequisite satisfied" (Step 645=YES), the process of Step 647 is skipped.

According to the present embodiment, when, due to some failure (e.g., degradation of the high voltage battery 35, failure of the cooling water temperature sensor 41h, etc.) the prerequisite will not be satisfied, the abnormality may be quickly fixed as soon as possible by notifying a driver etc. of such prerequisite unsatisfiable state.

Therefore, according to the present embodiment, the system 100 reduces the environmental impact caused by the vehicle V having the engine 10 as much as possible.

Modification

Hereafter, representative modifications are described and exemplified.

In the description of modifications, the same/like numbers for the same/like parts are shared with the preceding embodiments, for the brevity of the description. Further, the same/like parts, unless otherwise described, or unless any technical difficulty prevents such combination, operate in the same manner and achieve the same/similar effects as the preceding embodiments.

Further, even though it should be understood without mentioning it, the modifications of the present disclosure are not limited to the following examples, but a combination between two or more modifications and/or embodiments, in part or in entirety, should also be allowed unless otherwise described, or unless any technical difficulty prevents such combination.

The present disclosure is not limited to the configuration of each embodiment mentioned above. For example, the present disclosure is not limited to a hybrid vehicle which is mentioned above. That is, the present disclosure is widely applicable to the various vehicles, which may have an internal-combustion engine (not limited to a gasoline engine) as its source of thrust power.

More practically, when the present disclosure is applied to the vehicles provided only with an internal-combustion engine as the source of thrust power, for example, a temporal stop function is called an "idle stop function." However, a temporal stop of the engine 10 in a hybrid vehicle may also be called as an "idle stop" depending on a situation.

The engine ECU 51 and the hybrid ECU 52 may have one body configuration. Further, in each of the various configurations of the above-mentioned embodiments, a parameter obtained by using a certain sensor may be replaced with other parameters derived from outputs of other sensors, or on-board estimation values derived from outputs of other sensors. More practically, a brake oil pressure Pbr may be replaceable with a negative pressure, for example.

The prerequisite determiner 101 determines "the satisfaction of the prerequisite" when all of the eight conditions are satisfied. The prerequisite satisfaction conditions may have three conditions in addition to the above-mentioned eight conditions. More practically, the following three conditions may be added, that is, (9) Diagnosis of ISC (Idle Speed Control) rotation number is complete,

(10) Learning of a learn value for controlling ICS rotation number to have a target value is complete, and

(11) Various learning in idle region is complete (e.g., Learning of correction value for an air fuel ratio FB control is completed, etc.).

In the configuration of the second embodiment, the greenhouse gas increase determiner 107c may be disposed on a vehicle V side, or may be disposed on the external device C, or may be disposed in a server etc. which is connected to the external device C by the wired channel or the wireless channel so that the information obtained from the external device C is appropriately processed. The same applies to the other embodiments.

The present disclosure is not limited to the example of each of the above-mentioned embodiments in terms of the operation thereof.

For example, the parameter used for the determination of the prerequisite in the prerequisite determiner 101 may be selected from among the above-mentioned items, and may be additionally employed from the items other than the above. Further, any requisite mentioned above may be used as the prerequisite instead. Such a switching of requisite to prerequisite may apply the determination of the requisite by the requisite determiner 102.

For example, when the above-mentioned condition (v) about the brake oil pressure Pbr is used as the prerequisite rather than the requisite, the above-mentioned requisite (i)-(iv) correspond to the operation state of the vehicle V by the driver or occupants (i.e., operation state realized by human).

On the other hand, the above-mentioned prerequisites (1)-(8) and the prerequisite (v) correspond to the drive state (i.e., the operation state) of the vehicle V which is caused by the operation state of the vehicle V by the driver or occupants.

In the first and second embodiments, the number of times by which the temporal stop operation is performed by the stop-start actuator 104 is counted as the number of temporal stop (causing) operations. However, the present disclosure is not limited to such mode.

That is, for example, the number of times by which the engine 10 has actually stopped, the number of times by which the temporal stop request has been issued, and the number of times by which the fuel cut is caused by the temporal stop request may also be counted as the number of temporal stop (causing) operations.

More specifically, the stop counter 106 may count the number of times by which the temporal stop request is issued by the temp-stop requester 103 as the operation counted value Cstp.

Alternatively, the stop counter 106 may count the number of times by which the engine 10 has actually stopped as the operation counted value Cstp.

Further, the stop counter 106 may count the number of times by which the fuel cut is caused by the temporal stop request as the operation counted value Cstp.

Although the number of temporal stop (causing) operations during the occurrence of the expected event is counted in first and second embodiments, the counting subject may be switched to the number of voidings of the temporal stop (causing) operation during (i.e., in spite of) the occurrence of the (expected) event. In such case, the abnormality is determined by the number of occurrences of the expected event and the number of voidings.

Further, although the abnormality is determined by the number of occurrences of the expected event and the number of temporal stop (causing) operations in first and second embodiments, the abnormality may also be determined differently, i.e., by the number of temporal stop (causing) operations and the number of voidings of the temporal stop (causing) operation.

In first and second embodiments, even if the number of times by which the expected event occurred in one trip is greater than one, the event counted value Creq is counted up only by one (i.e., incremented). Similarly, even if the number of times by which the temporal stop (causing) operations occurred in one trip is greater than one, the operation counted value Cstp is counted up only by one (i.e., incremented). However, the present disclosure is not limited to such mode.

Figure 8:
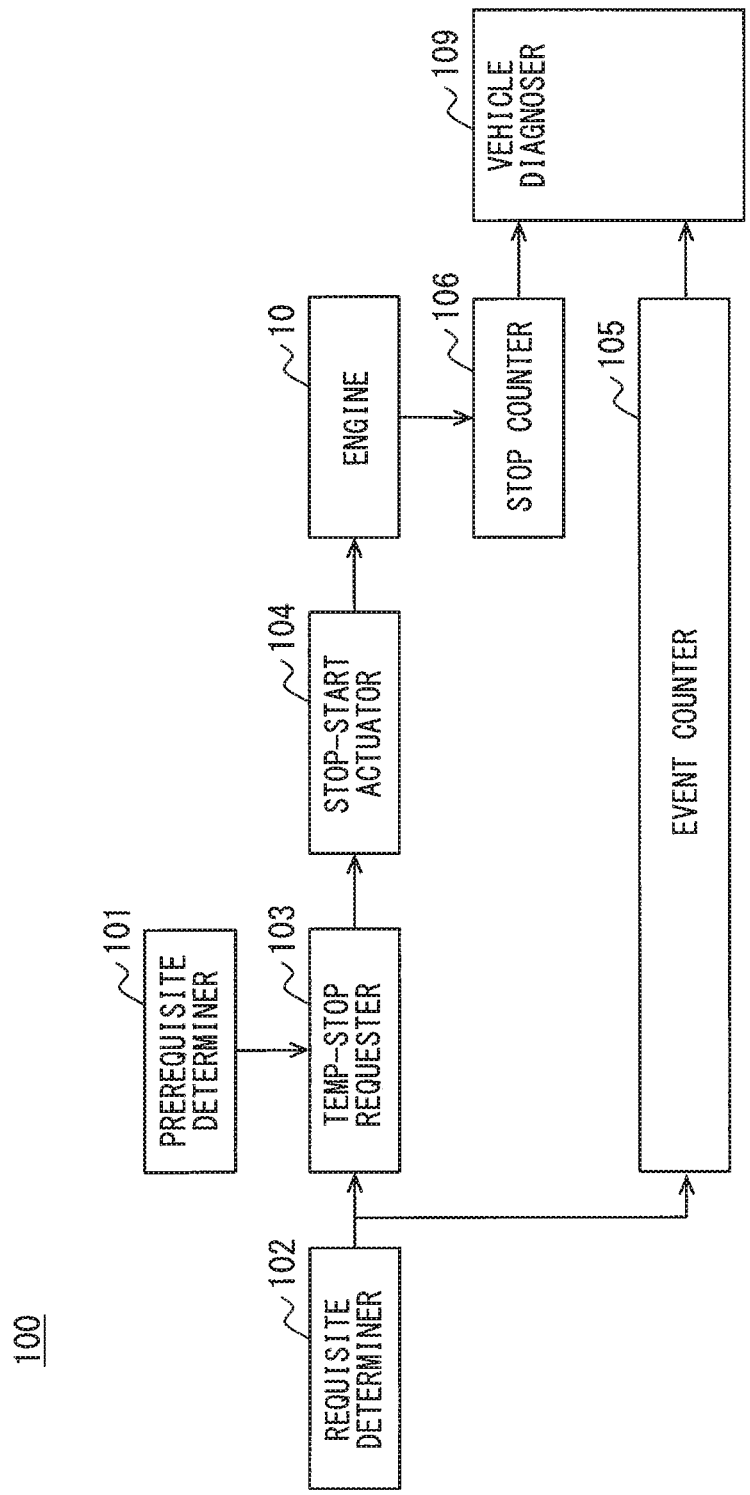
FIG. 8 is a functional block diagram of a modification of the vehicle diagnosis system in FIG. 2.

FIG. 8 corresponds to a modification of the vehicle diagnosis system in FIG. 2. That is, in the modification of FIG. 8, the event counter 105 obtains the event counted value Creq whenever an expected event occurs, i.e., by actually counting the number of the expected events. The stop counter 106 obtains the operation counted value Cstp whenever the temporal stop (causing) operations occurs, i.e., by actually counting the number of temporal stop (causing) operations.

The vehicle diagnoser 109 is configured to perform the greenhouse gas increase determination, similarly to the vehicle diagnoser 107 (refer to FIG. 3) in the above-mentioned second embodiment, based on the event counted value Creq obtained by the event counter 105 and the operation counted value Cstp obtained by the stop counter 106. That is, the vehicle diagnoser 109 is provided with the greenhouse gas determination section (refer to the greenhouse gas determination section 107c in FIG. 3) just like the vehicle diagnoser 107 in the second embodiment.

Figure 9:
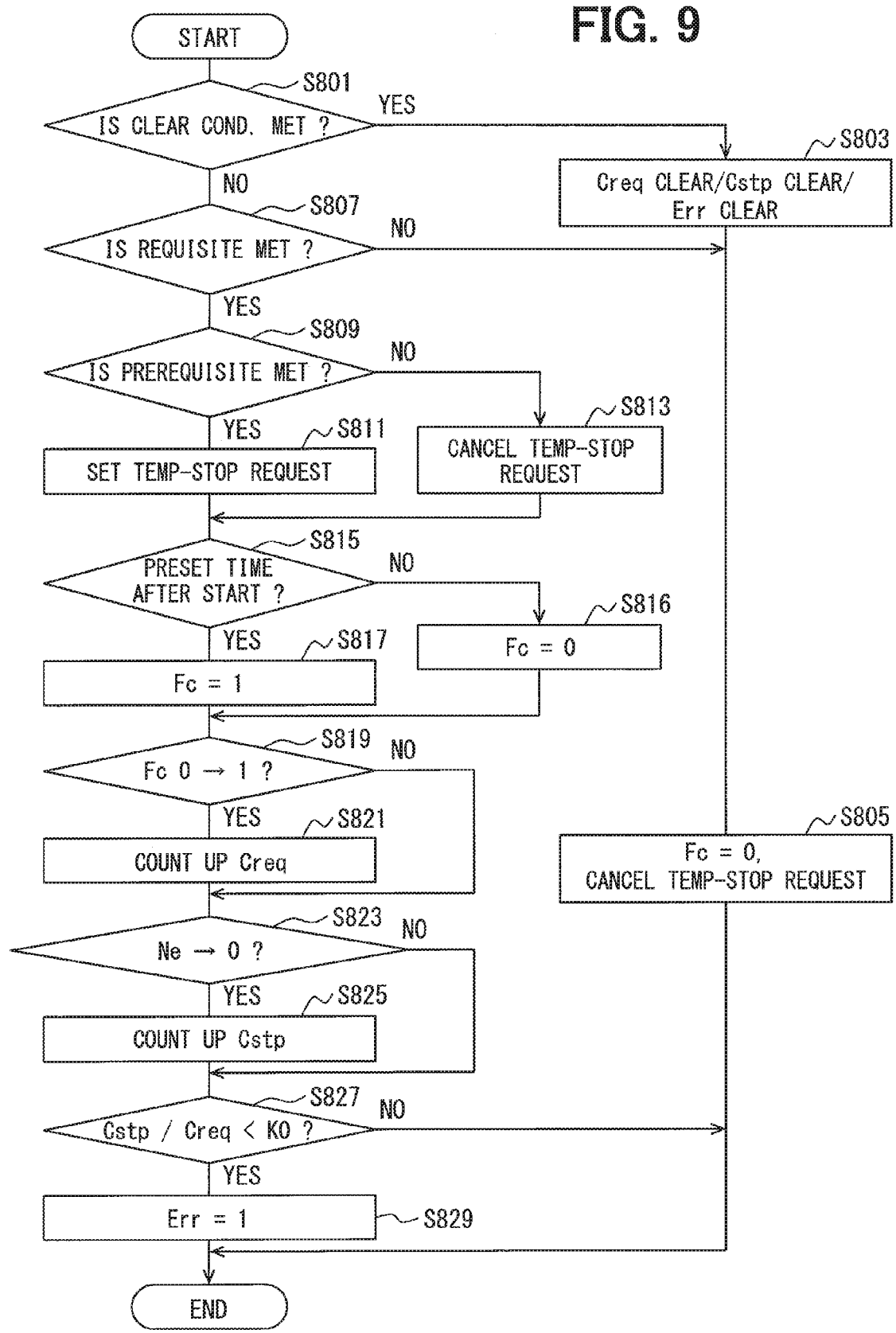
FIG. 9 is a flowchart of an operation of the vehicle diagnosis system in FIG. 8.

The procedure shown in FIG. 9 is a concrete example of the operation of the modified configuration described above. The procedure is performed at predetermined intervals after a start of the hybrid system by the start switch 42. The procedure in FIG. 9 is similar to the one in FIG. 5. However, unlike the procedure in FIG. 5, the execution of an initialization routine (refer to FIG. 4) or the temp-stop already-counted flag Fd (refer to FIGS. 4 and 5) are not required.

After a start of the procedure of FIG. 9, whether the predetermined clear conditions (same as the above in FIG. 5) are satisfied is determined in Step 801. If the clear conditions are satisfied (Step 801=YES), after proceeding to Steps 803 and 805, the procedure will once be finished. On the other hand, if clear conditions are not satisfied (Step 801=NO), the process proceeds to Step 807.

In Step 803, memory values of the event counted value Creq and the operation counted value Cstp are cleared (i.e., memory values memorized in a storage area in the hybrid ECU 52). Further, the greenhouse gas increase determination flag Err is cleared (Err=0).

In Step 805, while the count request flag Fc is reset (Fc=0), a temporal stop request is canceled.

In Step 807, whether the operation condition (i.e., requisite) is satisfied is determined. When the operation condition (i.e., requisite) is not satisfied (Step 807=NO), after proceeding to the above-mentioned step 805, the procedure is once finished.

On the other hand, when the operation condition (i.e., requisite) is satisfied (Step 807=YES), the process proceeds to Step 809.

In Step 809, whether the prerequisite is satisfied is determined. When the prerequisite is satisfied (Step 809=YES), the process proceeds to Step 811 and a temporal stop request is set.

On the other hand, when the prerequisite is not satisfied (Step 809=NO), the process proceeds to Step 813 and a temporal stop request is canceled.

Thus, after the process of Step 811 or the process of 813 is performed according to the determined result of Step 809, the process proceeds to Step 815.

In Step 815, whether a predetermined time has passed from a start of the engine 10 is determined. When a predetermined time has not passed after a start (Step 815=NO), the process proceeds to Step 816, and the count request flag Fc is reset (Fc=0), and the process proceeds to Step 819 thereafter.

On the other hand, when a predetermined time has already passed after a start (Step 815=YES), the process proceeds to Step 817, and the count request flag Fc is set (Fc=1), and the process proceeds to Step 819 thereafter.

In Step 819, whether the count request flag Fc is changed to the set state from the reset state by a current execution of the procedure is determined. When the count request flag Fc has been changed into the set state from the reset state by the current execution of the procedure (Step 819=YES), after proceeding to Step 821 and the event counted value Creq counted up (i.e., incremented), the process proceeds to Step 823.

On the other hand, when the determination of Step 819 is "NO", the process of Step 821 is skipped and the process proceeds to Step 823 thereafter.

In Step 823, whether an "edge" which indicates that an engine rpm Ne is equal to zero is detected is determined. When the "edge" indicating the engine rpm Ne being equal to zero is detected (Step 823=YES), after proceeding to Step 825, the process proceeds to Step 827. In Step 825, the operation counted value Cstp is counted up (i.e., incremented).

On the other hand, when the "edge" indicating the engine rpm Ne being equal to zero is not detected (Step 823=NO), the process of Step 825 is skipped and the process proceeds to Step 827.

In Steps 827 and 829, the greenhouse gas increase determination is performed based on the event counted value Creq and the operation counted value Cstp. Specifically, it is first determined in Step 827 whether the value (i.e., a ratio) which is derived by dividing the operation counted value Cstp by the event counted value Creq is smaller than a predetermined threshold value K0. After the process of Step 829 is performed according to the determined result in Step 827, the procedure is once finished.

When the value of Cstp divided by Creq is smaller than the threshold value K0 (Step 827=YES), whether the abnormality about the temporal stop function in the mode by which a greenhouse gas reduction effect is reduced is caused is determined. Therefore, the process proceeds to Step 829 in such case, and the greenhouse gas increase determination flag Err is set (Err=1).

On the other hand, when the value of Cstp divided by Creq is greater than the threshold value K0 (Step 827=NO), the process of Step 829 is skipped.

For example, when the high voltage battery 35 deteriorates, in a relatively short time after a temporal stop of the engine 10, the remaining amount of charge (SOC) reaches a permissible minimum and a restart of the engine 10 is requested. Therefore, even if the determination by the "number of times" is normal (i.e., indicating normal operation), the greenhouse gas reduction effect becomes insufficient as a result of decrease of an actual temporal stop time (i.e., duration) of the engine 10. Therefore, the determination by the "number of times" may be replaced with the determination by "time" (i.e., duration).

Figure 10:
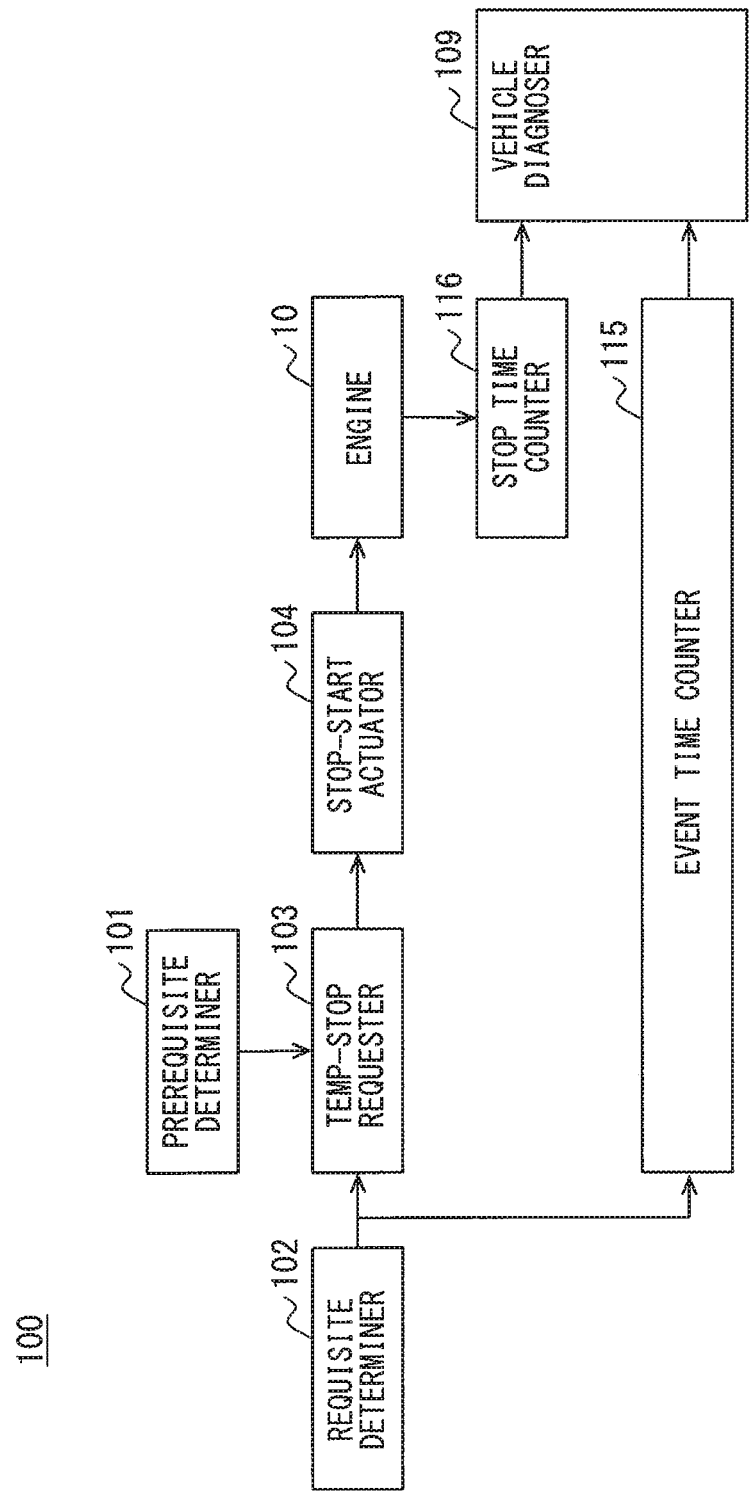
FIG. 10 is a functional block diagram of another modification of the vehicle diagnosis system in FIG. 2.
Figure 11:
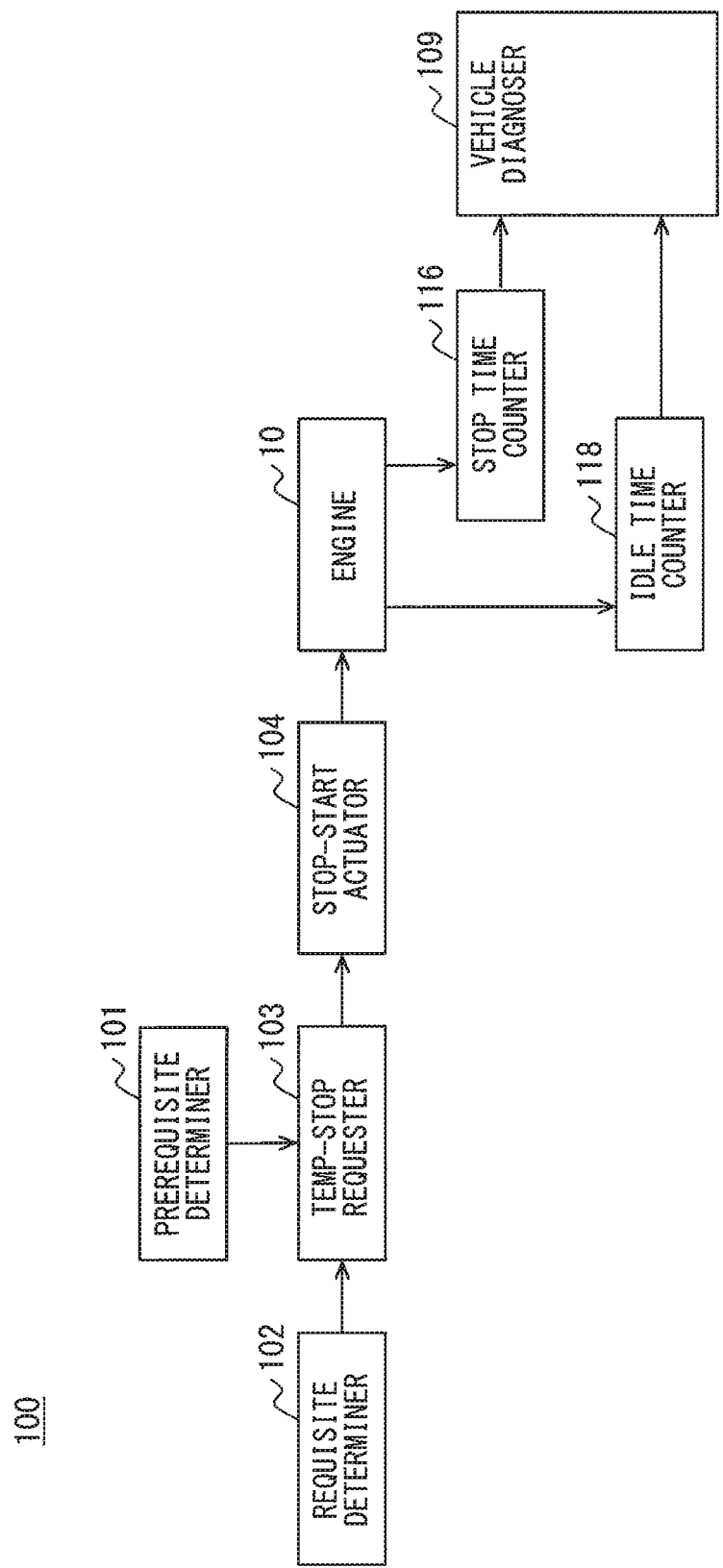
FIG. 11 is a functional block diagram of another modification of the vehicle diagnosis system in FIG. 2.

FIG. 10 corresponds to a modification of the vehicle diagnosis system in FIG. 2. That is, in the modification shown in FIG. 10, the vehicle diagnosis system 100 has the prerequisite determiner 101, the requisite determiner 102, the temp-stop requester 103, the stop-start actuator 104, the vehicle diagnoser 109, the event time counter 115, and the stop time counter 116. FIG. 11 is similar to FIG. 10 but includes an idle time counter 118 rather than an event time counter 115.

The even time counter 115 is configured to obtain the event counted value Creq as a counted value of an accumulated time of occurrences of the "expected event".

The stop time counter 116 is configured to obtain the operation counted value Cstp as a counted value of an accumulated time of occurrences of the temporal stop (causing) operation.

The operation in such a configuration may be described by replacing the "number of times" in the flowchart of FIG. 9 with "time (i.e., duration)."

Although the accumulated time of occurrences of the "expected event" and the accumulated time of occurrences of the temporal stop (causing) operation are counted in the modification shown in FIG. 10, instead of counting the accumulated time regarding the expected events and the temporal stop operations, two out of three items in the following may be calculated, that is, (i) an accumulated amount of savable fuel if a temporal stop of the engine were presumably performed entirely during (all of) the occurrences of the event, (ii) an accumulated amount of saved fuel when a temporal stop operation is performed during the occurrences of the expected event, and (iii) an accumulated amount of saved fuel when voiding the temporal stop operation during the occurrences of the expected event.

The accumulated amount of savable fuel is calculated by a time-integration of a per-unit-time idle time fuel consumption amount (calculated based on a water temperature table) for/during an occurrence duration of the expected events. The accumulated amount of saved fuel is calculated by a time-integration of a per-unit-time idle time fuel consumption amount (calculated based on a water temperature table) for/during an occurrence of the temporal stop (causing) operation during an occurrence of the expected events.

The accumulated amount of saved fuel is calculated by a time-integration of a per-unit-time idle time fuel consumption amount (calculated based on a water temperature table) for/during a voiding duration of the temporal stop (causing) operation during an occurrence of the expected events.

Alternatively, the amount may be calculated by a time-integration of an actual injection amount for/during a voiding duration of the temporal stop (causing) operation during an occurrence of the expected events.

The conditions for obtainment of the event counted value Creq, i.e., a "prerequisite satisfaction expected state" is not limited only to a state of lapse of a predetermined time from a start of the engine 10. That is, the others of the above-mentioned prerequisites may be used as such conditions.

More practically, when the brake oil pressure Pbr is low (or when the negative pressure is small), for example, the braking force is weak. Therefore, when a temporal stop of the engine 10 is performed in such a case, a drivability of the vehicle or a control load may be affected. Further, when a temporal stop of the engine 10 is performed in a state where an inter-terminal voltage Vb between terminals of the high voltage battery 35 is low, a restart of the engine 10 may become impossible.

Thus, when the brake oil pressure Pbr is low [Pbr<Pbr0 (i.e., Pbr0: a specified value)] or when a specific component (i.e., the high voltage battery 35 etc.) is deteriorated or has failure (i.e., when at least one of two "whens" in the above is happening), the counting up of the number of occurrences of the expected event or the counting up of the occurrence time accumulation may be prohibited.

The vehicle diagnoser 109 may be a means of communications (refer to the communicator 107b in FIG. 2) just like the vehicle diagnoser 107 in the first embodiment.

Figure 12:
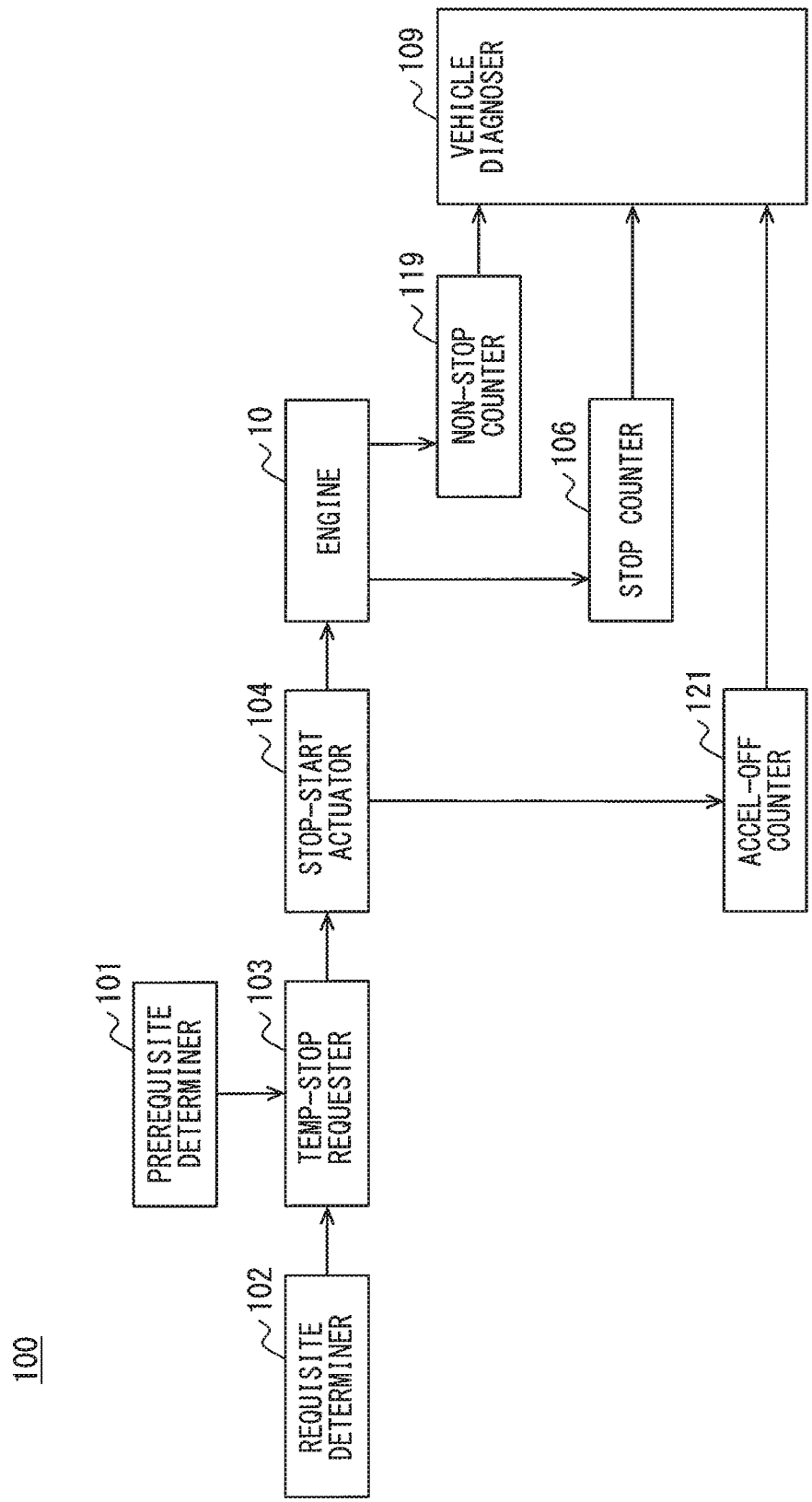
FIG. 12 is a functional block diagram of yet another modification of the vehicle diagnosis system in FIG. 2.

FIG. 12 shows an example of an in-part modification of the configuration of FIG. 8. In such an example of the modification, the event counter 105 is deleted, and the accel-off counter 121 is newly added, for counting the number of times by which an accelerator is turned off, i.e., having an accelerator opening Acc smaller than a preset threshold Acc0. Further, a non-stop counter 119 is added, for counting the number of times by which the engine rpm Ne of the engine 10 stays to be equal to or greater than a specified value Ne0 during an accelerator-off period (i.e., the counter 119 counts the number of not performing a temporal stop of the engine).

Among the three values from the accel-off counter 121, the non-stop counter 119, and the stop counter 106, two values may be used for determining whether the abnormality about the temporal stop function in the mode by which a greenhouse gas reduction effect is reduced is caused. In such case, a quotient of two values outputted to vehicle diagnoser 109 is used for the determination, i.e., whether the quotient is smaller than the preset threshold value is determined.

When the quotient of two values is smaller than the threshold value, the abnormality about a temporal stop function is determined. In the present modification or in other modifications depending therefrom, the "number of times" determination may be replaced with the "time (i.e., duration)" determination. During the temporal stop of the engine 10 of the vehicle V, due to a severe degradation of the high voltage battery 35 etc., the engine may be immediately (e.g., automatically) restarted (for preventing a further voltage lowering in the battery). Such an abnormality may also be covered/detectable by using the present embodiment, as an abnormality about the temporal stop of the engine 10.

As an in-part modification of the configuration in FIG. 12, the accel-off counter 121 may be replaced with a savable fuel amount estimator, which is not illustrated. In such case, the savable fuel amount estimator calculates an amount of savable fuel from a temporal stop of the engine 10 during all accelerator-off periods. Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation.

As another in-part modification of the configuration in FIG. 12, the non-stop counter 119 may be replaced with a used fuel amount calculator. In such case, the used fuel amount calculator calculates/accumulates an amount of used fuel by idling of the engine 10 during an accelerator-off period. Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation.

As yet another in-part modification of the configuration in FIG. 12, the stop counter 106 may be replaced with a saved fuel amount calculator. In such case, the saved fuel amount calculator calculates/accumulates an amount of saved fuel saved by performing a temporal stop of the engine 10 during an accelerator-off period. Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation.

As still yet another in-part modification of the configuration in FIG. 12, the accel-off counter 121 may be replaced with the savable fuel amount estimator, and the non-stop counter 119 may be replaced with the used fuel amount calculator. Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation.

As still yet another in-part modification of the configuration in FIG. 12, the accel-off counter 121 may be replaced with the savable fuel amount estimator, and the stop counter 106 may be replaced with a saved fuel amount calculator. Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation.

As still yet another in-part modification of the configuration in FIG. 12, the stop counter 106 may be replaced with a saved fuel amount calculator, and the non-stop counter 119 may be replaced with the used fuel amount calculator. Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation.

As still yet another in-part modification of the configuration in FIG. 12, the accel-off counter 121 may be replaced with the savable fuel amount estimator, and the stop counter 106 may be replaced with a saved fuel amount calculator, and the non-stop counter 119 may be replaced with the used fuel amount calculator. Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation.

The vehicle V will perform a deceleration fuel cut, if a prescribed condition is satisfied. Specifically, a prescribed condition may be a combination of following three conditions.

(1) Ne>Ne0 (i.e., Ne0: a specified value),
(2) Accelerator OFF [Acc<Acc0 (i.e., Acc0: a specified value)],
(3) ve≥ve0 (i.e., ve0: a specified value).

An in-part modification of the configuration of FIG. 12 applied to the vehicle V which perform a deceleration fuel cut when the above-mentioned three conditions are satisfied is described in the following.

In such a modified configuration, an accel-off time (i.e., duration) or a temporal stop time (i.e., duration) is counted (i.e., accumulated) during the accelerator-off period.

As a temporal stop time, a time (i.e., duration) of having the engine rpm is equal to or smaller than a threshold ($\approx 0$) may be counted (i.e., accumulated), or a fuel cut period during the accelerator-off period may be counted (i.e., accumulated).

However, for appropriately counting the fuel cut period during the accelerator-off period, the above-mentioned deceleration fuel cut has to be taken into account. During the accelerator-off period, a fuel cut for a temporal stop and the above-mentioned deceleration fuel cut may both be caused. However, a period of the above-mentioned deceleration fuel cut is basically a fuel reduction period, regardless of whether the engine 10 has a temporal stop function or not. Therefore, such a period may preferably be excluded from a temporal stop function abnormality determination.

Thus, during the deceleration fuel cut, at least one of the accel-off counter, the stop counter, and the non-stop counter may be prohibited to count up.

On the other hand, from a viewpoint of determining a lowering of the fuel consumption reduction effect of both of the temporal stop function and the deceleration fuel cut, it is not necessary to exclude the above from the determination.

Further, the conditions for starting the fuel cut for the temporal stop may include, other than the accel-off condition, a condition of a vehicle speed falling to be equal to or below a threshold (i.e., to a near-zero value) in a brake depressed state (i.e., when it is securely assumed that the driver is stopping the vehicle). Before such a condition is satisfied, the fuel cut for a temporal stop will not be performed. Therefore, during such a period, various count values may preferably be not counted up.

Therefore, after an accelerator off until a vehicle speed falling to be equal to or below a threshold, the counting up of at least one of the accel-off counter, the stop counter, and the non-stop counter may be prohibited.

Even in such a configuration, with the help of the operation of base configuration in FIG. 12, whether the abnormality about the temporal stop function in the mode by which a greenhouse gas reduction effect is reduced is caused is detectable, based on the occurrence state of the temporal stop operation in the prerequisite satisfaction expected state.

Further, due to other abnormalities such as a VVT return delay abnormality (VVT: Variable Valve Timing) which is a delay of returning of a valve timing to a restartable position prior to a temporal stop of the engine 10, a throttle valve operation delay abnormality (i.e., a delay of throttling the throttle valve 12 prior to a fuel cut for diminishing a stepwise torque change), or a transmission-engine disconnection delay abnormality (i.e., a delay of disconnection between the engine 10 and the transmission 26 for a temporal stop of the engine 10), a period/duration of the temporal stop may be shortened. Such abnormalities are also detectable (by the present configuration) as an abnormality about the temporal stop function.

Further, in the configuration of the modification, in which the vehicle V performs a fuel cut when a preset condition is satisfied, at least one of the accel-off time (i.e., duration) count and a temporal stop time (i.e., duration) count may be prohibited basically in case of performing a fuel cut. In such a configuration, whether the abnormality about the temporal stop function in the mode by which a greenhouse gas reduction effect is reduced is caused is detectable only for the temporal stop of the engine 10.

Further, for each of the modifications in the above, the vehicle diagnoser 109 may be equipped with the communicator, just like the vehicle diagnoser 107 in the first embodiment (refer to the communicator 107b in FIG. 2).

In each of the above-mentioned embodiments and modifications, although the prerequisite determiner 101 and the requisite determiner 102 are divided/separate sections, they may be not necessarily divided. In such a case, an ISS execution determiner may be provided, and such an ISS execution determiner may be configured to be serving as the prerequisite determiner 101 and the requisite determiner 102, for the determination of the prerequisite and for the determination of the operation condition. Such a configuration can also appropriately perform the diagnosis process for diagnosing the vehicle state.

In each of the embodiments and the modifications in which the event counter 105 is provided, the event counter 105 counts the frequency (i.e., the number of events) of the satisfaction of the operation condition (i.e., requisite) in the prerequisite satisfaction expected state.

Such a configuration may be changed to the counting in a prerequisite actually-satisfied (i.e., satisfaction-determined) state, from the prerequisite satisfaction expected state.

In such a case, although a state (of abnormality) in which satisfaction of a prerequisite is not detectable due to an abnormality of a sensor regarding the prerequisite satisfaction is not detectable, decrease of the temporal stop time (i.e., duration) and/or the number of temporal stops is detectable based on the abnormality of other parts (e.g., the stop-start actuator 104).

The definition of a "trip" is not necessarily limited to a period from an OFF-to-ON switching of the start switch 42 to a next OFF-to-ON switching of the start switch 42.

For example, a "trip" may be a period between two ON-to-OFF switching timings of the start switch 42. That is, a "trip" may be variously defined according to a kind of the vehicle V, etc. and according to an intended use of a trip period.

More practically, when the vehicle V is a plug-in hybrid vehicle, a "trip" may be a period from a charge timing to a next charge timing, for example, respectively by using a charger. Alternatively, when the vehicle V is provided only with an internal-combustion engine as a source of thrust power, a "trip" may be a period from a start of the engine 10 to a complete stop of the engine 10, which does not include the above-mentioned temporal stop period.

An external device C shown in FIG. 1 is disposed in data-communicable manner with a vehicle V, which is a so-called hybrid vehicle, via a communication channel that is either a wired communication or a wireless communication.

The vehicle V has an engine 10 (i.e., a multi-cylinder gasoline engine of a spark ignition type) installed therein. A throttle valve 12 of the electric drive type is disposed in an inlet pipe 11 of the engine 10. Near an intake port which is a connection section between the inlet pipe 11 and a cylinder, an injector 13 as a means to inject gasoline fuel is disposed. A spark plug 15 and an igniter 16 which applies high voltage for an ignition of the spark plug 15 are disposed on each cylinder as an ignition means of the engine 10. An intake valve 17 and an exhaust valve 18 are respectively disposed in the intake port and in the exhaust port.

A catalytic converter 23 as an exhaust emission purifier is disposed in an exhaust pipe 21 of the engine 10. The catalytic converter 23 has a three-way catalyst, for example, and it is configured so that the detrimental constituent (i.e., HC, CO, NOx) in the exhaust gas is purified when the exhaust gas passes therethrough.

A transmission 26 containing a power distribution device with a planetary gear mechanism is connected to a crank shaft 25 of the engine 10. A motor 28 which can operate as an electric motor and as a generator is connected to the transmission 26 via a gear shaft 27. Further, to the transmission 26, a wheel (i.e., a driving wheel) 33 is connected via an output shaft 29, a differential gear 31, and a drive shaft 32. That is, the transmission 26 is configured to be capable of outputting an output power of the engine 10 and/or the motor 28 to the same drive shaft 32.

The motor 28 is connected to a high voltage battery 35 via an inverter 34. When the motor 28 operates as a generator, the inverter 34 is used for charging an electric power to the high voltage battery 35, after converting the electric power generated by the motor 28 from a direct current to an alternating current.

On the other hand, when the motor 28 operates as an electric motor, the inverter 34 is used to convert the electric power outputted from the high voltage battery 35 from the direct current to the alternating current, and to output the converted electric power to the motor 28.

Two or more sensors which are illustrated in part below are disposed in the vehicle V. Specifically, the inlet pipe 11 has, disposed thereon, an air flow meter 41a, an intake air temperature sensor 41b, and a throttle position sensor 41c. The air flow meter 41a is disposed so that the output (of the meter 41a) corresponds to the mass flow rate (Ga) of the intake air which passes through the inlet pipe 11. The intake air temperature sensor 41b is disposed so that the output corresponds to the temperature (Tin) of the above-mentioned intake air. The throttle position sensor 41c is disposed at a position corresponding to the throttle valve 12 so that the output corresponds to a throttle opening TA which is an opening (i.e., a turning angle) of the throttle valve 12.

On an exhaust pipe 21, an A/F sensor 41d, a catalyst temperature sensor 41e, and an exhaust gas temperature sensor 41f are provided. The A/F sensor 41d is an oxygen density sensor which produces an output corresponding to the oxygen density in the exhaust gas, and is disposed at an upstream position of the catalytic converter 23 on the exhaust pipe 21. The catalytic converter 23 is equipped with a catalyst temperature sensor 41e so that the output corresponds to the temperature (Tc) of the catalytic converter 23. The exhaust gas temperature sensor 41f are provided so that the output corresponding to the temperature (Tex) of the exhaust gas which passes through the exhaust pipe 21.

The transmission 26 is equipped with a mission oil temperature sensor 41g. The mission oil temperature sensor 41g is disposed so that the output corresponds to the operating oil temperature inside the transmission 26 (Tm). Further, the engine 10 is equipped with a cooling water temperature sensor 41h, and a crank angle sensor 41k. The cooling water temperature sensor 41h is disposed so that the output corresponds to a cooling water temperature (Tw) of the engine 10. The crank angle sensor 41k is disposed on a crank case of the engine 10 so that an output signal therefrom includes a narrow width pulse at every 10 degree rotation of the crank shaft 25 and a broad width pulse at every 360 degree rotation of the crank shaft 25, which may be mainly used for a detection of an engine rotation number Ne.

The vehicle V is equipped with a vehicle speed sensor 41m, and a brake pressure sensor 41n. The vehicle speed sensor 41m is disposed so that the output corresponds to a travel speed (ve) of the vehicle V. The brake pressure sensor 41n is disposed so that the output corresponds to a brake oil pressure (Pbr) which is a pressure of a hydraulic fluid supplied to a brake caliper (not illustrated) from a brake actuator (not illustrated).

The vehicle V is equipped with a shift position sensor 41p, a brake sensor 41r, an accelerator opening sensor 41s and an open-close sensor 41t. The shift position sensor 41p is disposed so that the output corresponds to an operation state of the gearshift (not illustrated) disposed near the driver's seat of the vehicle V. The brake sensor 41r is disposed so that the output corresponds to an operation amount of a brake pedal (not illustrated). The accelerator opening sensor 41s is disposed so that the output corresponds to an accelerator opening Acc which is an operation amount of an accelerator (not illustrated). The open-close sensor 41t is disposed so that the output corresponds to an open-close state of a door of the vehicle V or of a hood of the vehicle V (not illustrated).

A voltage sensor 41v and an electric current sensor 41x are electrically connected to the high voltage battery 35. The voltage sensor 41v is disposed so that the output corresponds to a voltage Vb between the terminals of the high voltage battery 35. The electric current sensor 41x is disposed so that the output corresponds to charging and discharge currents Ib of the high voltage battery 35.

A start switch 42, which may also be called as an ignition switch, is provided in the vehicle V. The start switch 42 is a switch operated for a switch ON and a switch OFF of the vehicle V (i.e., a hybrid system), and is disposed near the driver's seat.

An engine ECU 51 and a hybrid ECU 52 are provided in the vehicle V. The engine ECU 51 and the hybrid ECU 52 are basically comprised of a microcomputer that has, as well-known, CPU, ROM, RAM, etc., respectively, and perform various controls about an operation of the vehicle V by executing various kinds of control programs memorized in the ROM.

Specifically, the engine ECU 51 is electrically connected to two or more above-mentioned sensors, except for the voltage sensor 41v and the electric current sensor 41x. The hybrid ECU 52 is electrically connected to the voltage sensor 41v, the electric current sensor 41x, and to the start switch 42. The engine ECU 51 and the hybrid ECU 52 are electrically connected with each other for an exchange of signals.

The engine ECU 51 receives, as an input signal, a signal outputted from the above-mentioned sensors and the hybrid ECU 52 which are electrically connected thereto, and controls a drive of each part (i.e., the injector 13, igniter 16 etc.) of the engine 10 based on such input signal. The hybrid ECU 52 receives an output signal of the above-mentioned sensors, except for the voltage sensor 41v and the electric current sensor 41x, via the engine ECU 51, and an output signal outputted from the voltage sensor 41v and the electric current sensor 41x, and, based on those received signals, performs an operation control of the motor 28, an operation control of the inverter 34, a charge and discharge control of the high voltage battery 35, etc.

Further, the engine ECU 51 and the hybrid ECU 52 perform, in cooperation with each other (i.e., through an exchange of a control signal, data, etc.), various controls such as a travel mode control, a temporal stop/restart control of the engine 10 etc. regarding the vehicle V (i.e., a hybrid system). That is, the vehicle V is provided with a temporal stop function of the engine 10 in a hybrid system (i.e., a function that temporarily stops the engine 10 when a preset condition is satisfied).

<System Configuration of a Vehicle Diagnosis System of One Embodiment>

Figure 13:
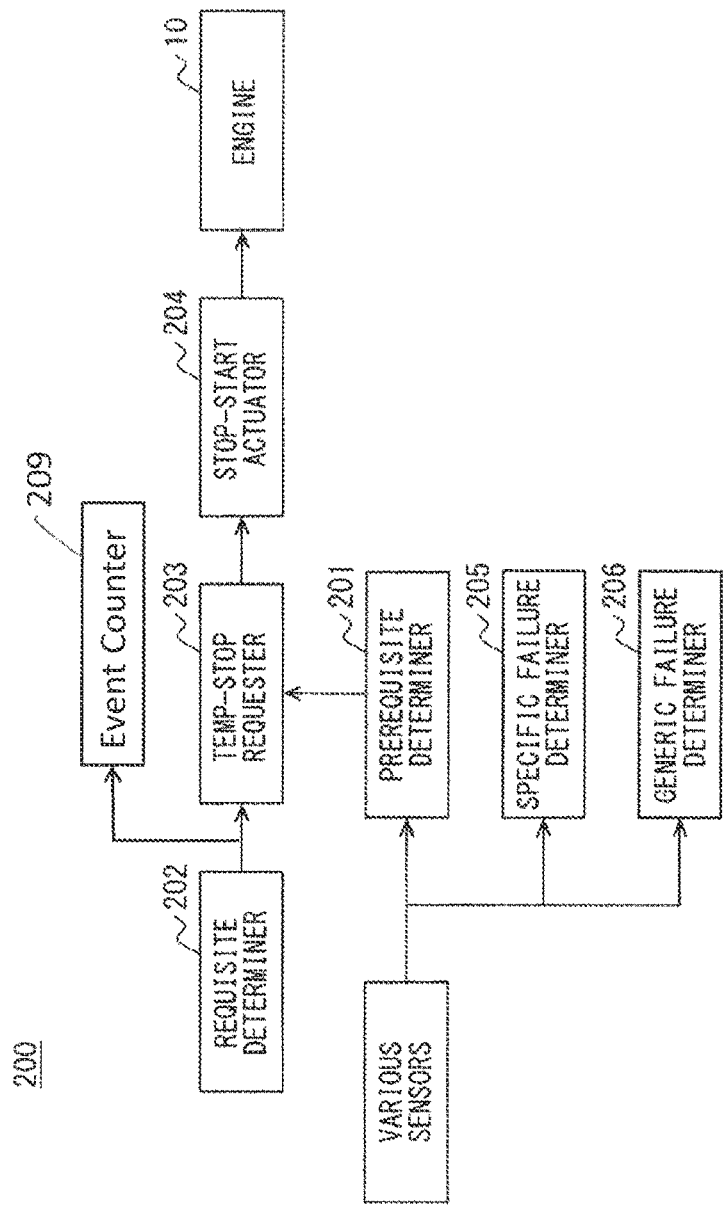
FIG. 13 is a functional block diagram of a vehicle diagnosis system of the vehicle in FIG. 1 in the present disclosure.

With reference to FIG. 13, a vehicle diagnosis system 200 in a third embodiment of the present disclosure is described in terms of how it performs a process about diagnosis of the vehicle V of FIG. 1. Specifically, such a vehicle diagnosis system 200 has a prerequisite determiner 201, a requisite determiner 202, a temp-stop requester 203, a stop-start actuator 204 (=a temporal-stop and restart section 204 in a very true translation), an event counter 209, a specific-failure determiner 205, and a generic-failure determiner 206. As described in the following embodiment, the components 201, 202, 203, 205, 206 are provided in a hybrid ECU 52, while the component 204 is provided in an engine ECU 51.

The prerequisite determiner 201 equivalent to a "prerequisite determiner" of the present disclosure is provided so that formation, or a satisfaction, of the prerequisite for performing a temporal stop may be determined. Such a "prerequisite" is a condition, or a state of the vehicle V, that should normally, i.e., when having no abnormality/failure, be satisfied after a preset time from a start of the engine 10, which may be at least one of the following eight items.

(1) Tw>Tw0 (i.e., Tw0: a specified value),
(2) Completion of warming up of the catalytic converter 23: (i.e., Tc>Tc0 and Tc0: a specified value),
(3) The A/F sensor 41d in an active state,
(4) Tm≥Tm0 (i.e., Tm0: a specified value),
(5) SOC of the high voltage battery 35 is in an estimable/foreseeable state (SOC: State Of Charge),
(6) SOC≥SOC0 (i.e., SOC0: a specified value),
(7) Vb≥Vb0 (i.e., Vb0: a specified value), and
(8) Specific components (e.g., the high voltage battery 35, an alternator, a starter motor, etc.) not in an out of order/failure state.

In the present embodiment, the prerequisite determiner 201 determines "the satisfaction of the prerequisite" when all of the conditions (1)-(8) mentioned above are satisfied.

The requisite determiner 202 equivalent to a "requisite determiner" or an "operation condition determiner" of the present disclosure is provided so that formation, or a satisfaction, of an operation condition (i.e., requisite, or a condition, for a temporal stop which is different from the above-mentioned prerequisite) may be determined.

The "operation condition" is a state of drive operation of the vehicle V for performing a temporal stop, based on an assumption that the "prerequisite" is (already) satisfied/met, which may be at least one of the followings.

(i) Brake ON (i.e., the amount of brake pedal operation is equal to or greater than a predetermined quantity), (ii) Accelerator-OFF [Acc<Acc0 (i.e., Acc0: a specified value)], (iii) ve<ve0 (i.e., ve0: a specified value), (iv) Door and hood closed, and (v) Pbr≥Pbr0 (i.e., Pbr0: a specified value).

In the present embodiment, the requisite determiner 202 determines "the satisfaction of the requisite" when all of the conditions (i)-(v) mentioned above are satisfied.

When formation/satisfaction of a prerequisite is determined by the prerequisite determiner 201 and formation/satisfaction of an operation condition (i.e., requisite) is determined by the requisite determiner 202, the temp-stop requester 203 is configured to issue a temporal stop request (i.e., a signal for performing a temporal stop process of the engine 10). Based on a reception state of the temporal stop request from the temp-stop requester 203, the stop-start actuator 204 is configured to suspend/temporarily stop the engine 10 and restarts the engine 10.

The specific failure determiner 205 is configured to determine an occurrence of a specific abnormality based on an output from at least one of the plural sensors described above. The generic failure determiner 206 is configured to determine an occurrence of a generic abnormality that is different from the specific abnormality based on an output from at least one of the plural sensors described above.

The "specific abnormality" may be defined here as, for example, a vehicle abnormality of/in the vehicle V by which a greenhouse gas reduction effect by a temporal stop function is reduced/cancelled. In other words, the specific abnormality is an abnormality that either hinders or delays (i) a satisfaction of the above-described prerequisite or (ii) a determination of a satisfaction thereof (i.e., an abnormality that (i-a) may hinder a satisfaction of the prerequisite or (i-b) may delay a satisfaction of the prerequisite OR an abnormality that (ii-a) may hinder a determination of satisfaction of the prerequisite or (ii-b) may delay a determination of satisfaction of the prerequisite). The specific abnormality may be an abnormality that hinders or delays (i) a reaching of an engine cooling water temperature to a standard temperature or (ii) a detection of the reaching of the engine cooling water temperature to the standard temperature.

More practically, in the present embodiment, the specific failure determiner 105 is configured to determine an occurrence of an abnormality that hinders a detection of a rise of a cooling water temperature Tw to a standard temperature (i.e., an abnormality (i) that hinders or delays a rise of the temperature to the standard temperature or (ii) that hinders or delays a detection of a rise of the temperature to the standard temperature).

<Operation of the Vehicle Diagnosis System in the Present Embodiment>

The operation and effect of the configuration of the present embodiment is described in the following. In the following, a flowchart of FIG. 14 and the like uses "S" instead of "Step" in the drawing.

The engine ECU 51 and the hybrid ECU 52 control an operation of each part of the vehicle V (i.e., a hybrid system) based on the various states etc. of the vehicle V grasped by the output signal of the above-mentioned multiple sensors, exchanging various signals among the two (ECUs). Specifically, the hybrid ECU 52 acquires the various states of the vehicle V, etc., based on the input signals from the voltage sensor 41v, the electric current sensor 41x, the start switch 42 etc., and also based on the signal inputted by the signal exchanged with the engine ECU 51, etc., for example. Then, the hybrid ECU 52 sets up a travel mode (i.e., including a temporal stop/restart of the engine 10) of the vehicle V, taking the fuel mileage of the engine 10 into consideration and based on the various states, etc. of the vehicle V.

The engine ECU 51 performs a drive control of the engine 10 according to the travel mode set up (i.e., determined) by the hybrid ECU 52. That is, for example, the engine ECU 51 performs various controls (i.e., a fuel injection control including a so-called fuel cut, an ignition control, etc.) of the engine 10 during a drive period of the engine 10 based on the drive state or the like of the vehicle V. The hybrid ECU 52 calculates a remaining amount of charge (SOC) of the high voltage battery 35 based on the charging and discharge currents detected by the electric current sensor 41x. Further, the hybrid ECU 52 controls the drive of the motor 28, the inverter 34 etc. based on the drive state of the vehicle V, a remaining amount of charge of the high voltage battery 35, or the like.

Hereafter, a temporal stop/restart control of the engine 10, especially, a temporal stop control, is described in more details. As mentioned above, in such a control, whether the prerequisite for performing a temporal stop is satisfied is determined by the prerequisite determiner 201. Further, whether the above-mentioned operation condition (i.e., requisite) is satisfied is determined by the requisite determiner 202.

When satisfaction of the prerequisite is determined by the prerequisite determiner 201 and satisfaction of the operation condition (i.e., requisite) is determined by the requisite determiner 202, a temporal stop request is issued by the temp-stop requester 203. If such a temporal stop request is issued, the stop-start actuator 204 temporarily stops the engine 10. The prerequisite includes that the cooling water temperature Tw is equal to or greater than the standard temperature Tw0 (Tw≥Tw0). The reasons why such condition is included are reasons (a) to (c) in the following. Reason (a): for prevention of deterioration of an emission due to a repeat of the start (of the engine 10) at low temperature. Reason (b): for a prohibition of a temporal stop (of the engine 10) during a temperature rise period that continues until a device temperature reaches a preset operation guarantee value, for each of the devices that either operate in an in-proper/non-guaranteed manner or yield only a deteriorated performance in low temperature, such as VVT, EGR or the like. Reason (c): for a prohibition of a temporal stop (of the engine 10) until a water temperature reaches a sufficiently-high value for the heating of the vehicle compartment.

The specific failure determiner 205 and the generic failure determiner 106 diagnose, based on the output from various sensors and the like, various parts of the vehicle V. The results of such diagnosis are notified to a driver of the vehicle V via a meter, a gauge and the like in the vehicle V, and are transmitted to the external device C when circumstances allow such a transmission of data thereto.

Here, in a normal operation, i.e., having no abnormality/failure, the prerequisite satisfied determination by the prerequisite determiner 101 should be established after a predetermined time from a start of the engine 10, as mentioned above. Therefore, if the above-mentioned operation condition (i.e., requisite) is satisfied after a predetermined time from a start of the engine 10 (with a reservation that "a predetermined time" is different for a restart-after-temp-stop case and for other cases), the engine 10 is temporarily stopped and a greenhouse gas reduction effect should be achieved.

However, a following scenario may have to be considered. That is, the temporal stop of the engine 10 may be not performed, or may be hindered due to some/unknown abnormality/failure, even though (i) the prerequisite has already been satisfied and (ii) the above-mentioned operation condition (i.e., requisite) has already been satisfied.

More practically, even when the cooling water temperature Tw has reached to a preset standard temperature, the output of the cooling water temperature sensor 41*h* may not transit from a low temperature side to a high temperature side, due to an abnormality, for example. Further, when a specific failure occurs in the vehicle V (e.g., a thermostat valve having a failure to stay in a valve open state in a cooling water circulation system of the engine 10, which is not illustrated in the drawing), the above-mentioned prerequisite becomes unsatisfiable in the first place/to begin with.

When, as a result of the above situation, the vehicle V is put in such a state of cancelling the greenhouse gas reduction effect (i.e., the reduction effect not fully/preferably achieved), driving the vehicle V continued for a long time in such a state is problematic from a viewpoint of an environmental impact. Therefore, when such an abnormality (i.e., failure) is caused, the driver (of the vehicle V) should be prompted to fix the vehicle as soon as possible.

Thus, in the configuration of the present embodiment, the specific failure determiner 205 is configured to determine an occurrence of a vehicle abnormality, i.e., a "specific abnormality," which is caused in a mode that cancels a greenhouse gas reduction effect of the vehicle V by the temporal stop function.

More practically, in the present embodiment, the specific failure determiner determines an occurrence of an abnormality that hinders a detection of a rise of a cooling water temperature Tw to a standard temperature (i.e., an abnormality (i) that hinders or delays a rise of the temperature to the standard temperature or (ii) that hinders or delays a detection of a rise of the temperature to the standard temperature even when the temperature has actually risen to the standard temperature).

In such manner, when the specific failure determiner 205 determines an occurrence of a specific failure, such a specific failure is notified to the driver or the like, thereby enabling a quick fix of such abnormality as soon as possible. Thus, in such a configuration, the vehicle V having the engine 10 is controlled to reduce its impact on the environment as much as possible.

Hereafter, one example of operation by the above-described configuration is described with reference to a flowchart in FIG. 3.

Figure 14:
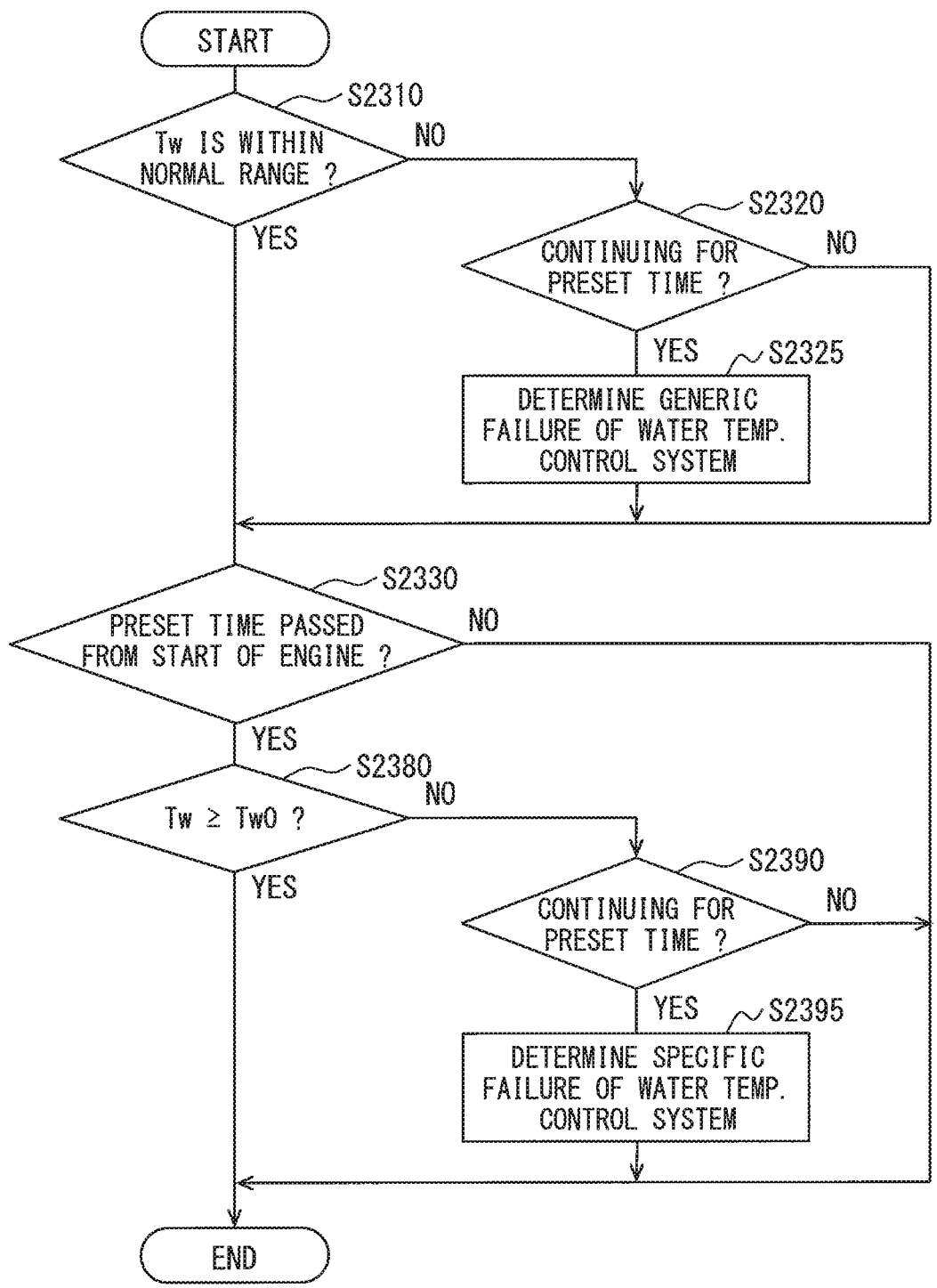
FIG. 14 is a flowchart of an operation of the vehicle diagnosis system in FIG. 13.

The procedure shown in FIG. 14 is performed at predetermined intervals from a start of the hybrid system by the start switch 42. When such a procedure is started, in Step 2310, whether the detection value Tw of the cooling water temperature sensor 41*h* is within a normal range (e.g., is equal to or lower than 130 degree Celsius) is determined.

When the detection value Tw of the cooling water temperature sensor 41*h* is in an outside of the normal range (Step 2310=NO), the process advances to Step 2320, and it is determined whether such a state is continuing for a preset time. When such a state in which the detection value Tw of the cooling water temperature sensor 41*h* is outside of the normal range is continuing for a preset time (Step 2320=YES), the process advances to Step 2325, in which a generic failure of a water temperature control system (i.e., the cooling water temperature sensor 41*h* or the above-mentioned thermostat valve) is determined, and the process advances to Step 2330.

On the other hand, even when the detection value Tw of the cooling water temperature sensor 41*h* is outside of the normal range, if such a state is not continuing for a preset time (Step 2320=NO), the process of Step 2325 is skipped and the process advances to Step 2330. Further, when the detection value Tw of the cooling water temperature sensor 41*h* is in the normal range (Step 2310=YES), the process of Steps 2320 and 2325 is skipped and the process advances to Step 330.

As the above-mentioned generic failure of the water temperature control system, what is called an "open short failure" of the cooling water temperature sensor 41*h* may be happening, for example. In such a case, the detection value Tw of the cooling water temperature by cooling water temperature sensor 41*h* sticks to (i.e., stays) a value that indicates an unusual high temperature as mentioned above. Alternatively, as for such a generic failure, what is called a "closed failure" may also be happening, in which the above-mentioned thermostat valve stays in a closed state, for example. In these generic failures, with regard to the detection value Tw of the cooling water temperature sensor 41*h*, a satisfaction of the prerequisite for a temporal stop of the engine 10 or a determination of satisfaction thereof is not hindered or delayed. Therefore, these generic failures are not a "specific failure" in a mode by which the greenhouse gas reduction effect by a temporal stop function is reduced.

In Step 2330, whether a preset time has passed from a start of the engine 10 is determined. In such a determination, a "preset time" is switched for an after-temp-stop restart case and for other cases. When the restart is performed after a temporal stop, a threshold serving as the preset time may be a predetermined value. When the restart is not an after-temp-stop restart, a threshold may be a value greater than the above-mentioned predetermined value. The threshold for the latter case may be, more practically, obtained from a map (i.e., from a look-up table of a microcomputer) having parameters such as a cooling water temperature Tw, a temperature of an intake air (Tin), or the like.

When the preset time has not passed from a start of the engine 10 (Step 2330=NO), the process after Step 2380 is skipped, and the present procedure is finished (i.e., finished or completed for the current cycle of execution of the process).

On the other hand, the preset time has passed from a start of the engine 10 (Step 2330=YES), the process advances to Step 2380.

In Step 2380, whether the detection value Tw of the cooling water temperature sensor 41*h* is equal to or higher than a preset standard temperature Tw0 (i.e., a temporal stop permission temperature).

When the detection value of the cooling water temperature sensor 41*h* is equal to or higher than the standard temperature Tw0 (Step 2380=YES), the present procedure is once finished.

On the other hand, when the detection value Tw of the cooling water temperature sensor 41*h* has not yet reached the standard temperature Tw0 (Step 2380=NO), the process advances to Step 2390.

In Step 2390, it is determined whether an indetermination state is continuing for a preset time, in which the detection value Tw of the cooling water temperature sensor 41*h* has not reached the standard temperature Tw0 (Step 2380=NO) in spite of having a preset time passed from a start of the engine 10 (Step 2330=YES). When it is determined that such a state is continuing for a preset time (Step 2390=YES), the process advances to Step 2395 and a specific failure about the water temperature control system is determined, and the present procedure is once finished.

When the above-mentioned state has not yet continued for a preset time (Step 2390=NO), the process of Step 2395 is skipped and the present procedure is once finished.

As mentioned above, as a specific failure about the water temperature control system, a failure in a mode in which an output of the cooling water temperature sensor 41*h* will not change to a high temperature side from a low temperature side may be happening, for example. In such a case, even when an actual cooling water temperature Tw is equal to or higher than the standard temperature Tw0 and a temporal stop of the engine 10 is already made possible, a temporal stop will not be performed. Alternatively, as such a specific failure, what is called an "open failure" in which the above-mentioned thermostat valve stays in an open state may be happening, for example. In such a case, the actual cooling water temperature Tw does not rise to be equal to or higher than the standard temperature Tw0 in the first place.

Modification

Hereafter, some of the typical modifications are described. In the description of the following modifications, the same numerals as the above-mentioned embodiments are used to designate the same components and functions as to what is already described in the above embodiments. Thus, other than technical restrictions and the like, the same description of the above is applied thereto. Further, without mentioning, the modifications in the following are not limiting the present disclosure, in any sense. The combination in part or as a whole of the above-mentioned embodiments is always used as an alternative unless otherwise described according to technicality.

The present disclosure is not limited to the above-described configuration. For example, the present disclosure is not limited to a hybrid vehicle which is mentioned above. That is, the present disclosure is widely applicable to the vehicles that use an internal-combustion engine as a source of its thrust power, which is not necessarily limited to a gasoline engine. More practically, when the present disclosure is applied to the vehicles that are provided only with an internal-combustion engine as a source of thrust power, for example, a temporal stop function is called as an "idling stop function." However, a temporal stop of the engine 10 in a hybrid vehicle may also be called as an "idling stop" depending on a context.

In the present embodiment, the eight conditions are respectively described as a "prerequisite" that is usually supposed to be satisfied after a preset time from a start of the engine 10. When one of those eight prerequisites is satisfied, the preset process (i.e., a temporal stop) is performed.

Now, three more conditions may be respectively added as a "prerequisite." More practically, (9) VVT (Variable Valve Timing) is in a ready-to-go state (i.e., operable),

(10) EGR (Exhaust Gas Recirculation) is in a ready-to-go state (i.e., operable),

(11) Negative pressure sensor in a brake booster indicates an over-threshold value (i.e., a difference between a brake booster's negative pressure and an atmospheric pressure is equal to or greater than a threshold).

With an addition of these three conditions, satisfaction of all of eleven items of (1)-(11) may be determined as a satisfaction of prerequisite.

The engine ECU 51 and the hybrid ECU 52 may be combined to have a one-body structure, or those ECUs 51, 52 may be separately disposed. For example, the prerequisite determiner 201 may be distributively disposed on the engine ECU 51 and hybrid ECU 52, and the engine ECU 51 may determine an engine-related prerequisite satisfaction, and the hybrid ECU 52 may determine a satisfaction of the prerequisite for the motor 28 and the high voltage battery 35. In such a case, when both determinations are satisfactory, it may be determined that the prerequisite is satisfied.

Further, in the configuration of the embodiment mentioned above, a parameter obtained by using a certain sensor may be replaced with other parameter obtained by using an output of other sensor, with an on-board estimation value that is derived from an output of other sensor. More practically, in place of a cooling water temperature, an engine oil temperature may be used, for example, and, in place of an amount of brake pedal operation amount (Ab), a brake oil pressure Pbr may be used.

As for the specific failure determiner 205 and the generic failure determiner 206, at least one of the two may be disposed on an external device C side (particularly, the specific failure determiner 205). In such a way, how an abnormality of the vehicle V, i.e., especially an abnormality to increase an emission of the greenhouse gas, is occurring in the market place is quickly and appropriately obtained by a manufacture, a seller, a maintenance shop and the like.

In the above-mentioned embodiment, the specific failure determiner 205 determines an occurrence of abnormality in which the cooling water temperature Tw cannot reach (rise or increase to) the standard temperature Tw0 by using the cooling water temperature sensor 41*h*. Instead, the specific failure determiner 205 may determine an occurrence of abnormality that hinders a detection by the cooling water temperature sensor 41*h* about the cooling water temperature Tw reaching/rising to the preset temperature Twth (i.e., an abnormality (i) that hinders or delays a rise of the temperature Tw to a preset temperature Twth or (ii) that hinders or delays a detection of a rise of the temperature Tw to a preset temperature Twth even when Tw has actually risen to Twth).

Basically, the preset temperature Twth is a temperature value at which a temporal stop is substantially permitted. However, such preset temperature Twth is not necessarily equal to the standard temperature Tw0. For example, when the prerequisite (9) "VVT is in a ready-to-go state" includes as a determination condition "a water temperature has reached a level that makes VVT operable," it becomes not necessary for a determination of the standard temperature Tw0 to consider an operable temperature of VVT. As a result, Twth and Tw0 can be respectively different values.

Further, the preset temperature Twth may be set as a value other than the above-mentioned "water temperature value at which a temporal stop is substantially permitted." Among many devices that are involved in a determination of permission of a temporal stop of the engine 10, some of the devices may be excluded from a subject of the specific abnormality determination (e.g., in case that (i) a certain device may be detected as abnormal by other diagnosis and (ii) no discretion between the specific abnormality and the generic abnormality is required for such a device). In such a case, the preset temperature Twth may be determined without considering such a device, and, as a result, the preset temperature Twth may have a different value from the "water temperature value at which a temporal stop is substantially permitted."

Regarding Step 2330 shown in FIG. 14, whether a preset time has passed from a start of the engine 10 is determined in the above. Instead, whether an estimated cooling water temperature value may be determined as being equal to or higher than the preset temperature (e.g., a preset temperature value may be a sum of the standard temperature Tw0 and an estimated error [a margin]).

Figure 15:
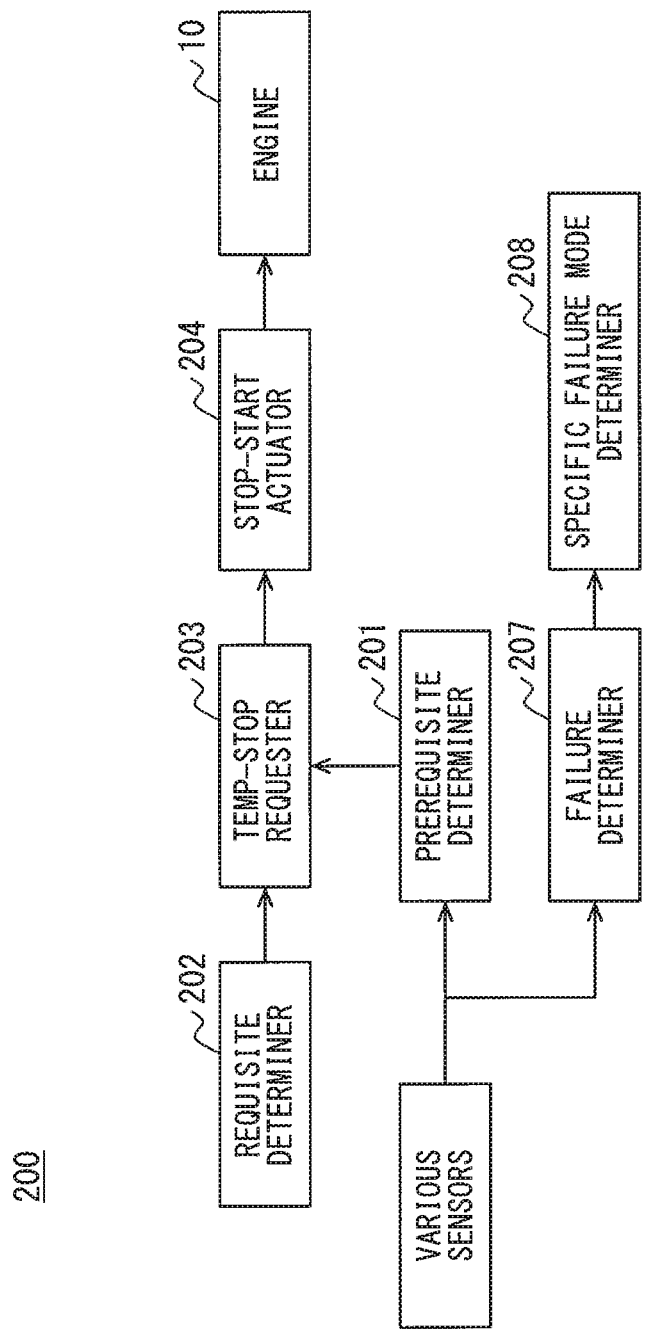
FIG. 15 is a functional block diagram of a modification of the vehicle diagnosis system in FIG. 13.

FIG. 15 is a functional block diagram of one of the modifications of the vehicle diagnostic system 200. The vehicle diagnostic system 200 of this modification is provided with the prerequisite determiner 201, the operation condition determiner 202, the stop requester 203, the stop-start actuator 204, a failure determiner 207, and a specific failure mode determiner 208.

The failure determiner 207 determines an occurrence of failure (i.e., abnormality) of all kinds including the above-mentioned generic failure and specific failure. The specific failure mode determiner 208 determines whether a failure concerned is a specific failure, when a certain failure is determined by the failure determiner 207. In such a configuration, the same effects as the above-mentioned embodiment are achieved.

Figure 16:
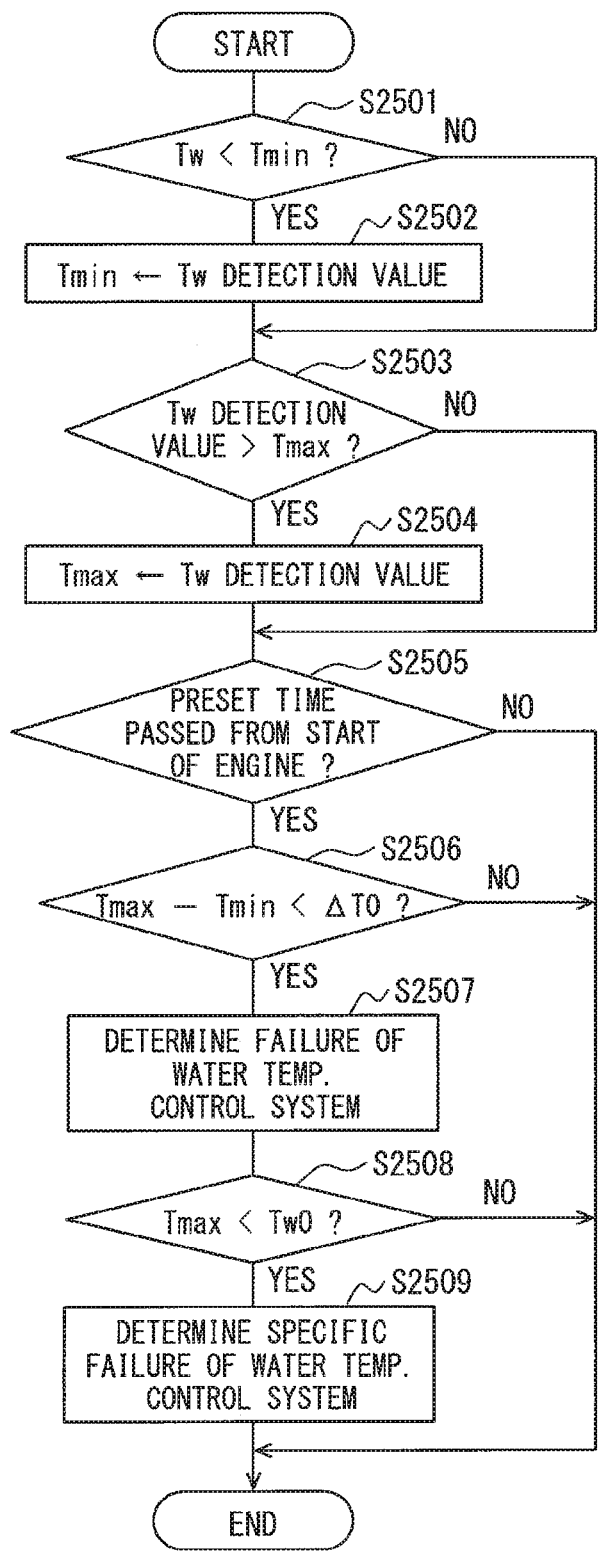
FIG. 16 is a flowchart of an operation of the modification of the vehicle diagnosis system in FIG. 15.

FIG. 16 is a flowchart of an example operation by the configuration of the modification shown in FIG. 15. The procedure shown in FIG. 16 is performed at predetermined intervals after a start of the hybrid system started by the start switch 42. After a start of such a procedure, it is determined in Step 2501 whether the detection value Tw of the cooling water temperature sensor 41$h$ is lower than a value Tmin. Here, "Tmin" is a lowest value of the detection value Tw of the cooling water temperature sensor 41$h$, a latest value of Tmin is memorized (i.e., stored) on demand in a rewritable memory area (e.g., in an EEPROM, etc.) which is provided in the engine ECU 51 or the hybrid ECU 52.

When the detection value Tw of the cooling water temperature sensor 41$h$ is lower than Tmin (Step 2501=YES), the process advances to Step 2502, and the value of Tmin is rewritten by this new detection value Tw of the cooling water temperature sensor 41$h$. Then, the process advances to Step 2503.

On the other hand, when the detection value Tw of the cooling water temperature sensor 41$h$ is higher than Tmin (Step 2501=NO), the process of Step 2502 is skipped and the process advances to Step 2503.

In Step 2503, it is determined whether the detection value Tw of the cooling water temperature sensor 41$h$ is higher than a value Tmax. Here, "Tmax" is a peak/highest value of the detection value Tw of the cooling water temperature sensor 41$h$, and a latest value of Tmax is memorized (i.e., stored) on demand, just like Tmin, in the above-mentioned rewritable memory area.

When the detection value Tw of the cooling water temperature sensor 41$h$ is higher than Tmax (Step 2503=YES), the process advances to Step 2504 and the value of Tmax is rewritten by this new detection value Tw of the cooling water temperature sensor 41$h$. Then, the process advances to Step 2505.

On the other hand, when the detection value Tw of the cooling water temperature sensor 41$h$ is lower than Tmax (Step 2503=NO), the process of Step 2504 is skipped and the process advances to Step 2505.

In Step 2505, it is determined whether a preset time has passed from a start of the engine 10 is determined. When it is determined that a preset time has not passed from a start of the engine 10 (Step 2505=NO), the process after Step 2506 is skipped and the present procedure is once finished.

On the other hand, when it is determined that a preset time has passed from a start of the engine 10 (Step 2505=YES), the process advances to Step 2506.

In Step 2506, it is determined whether the difference between Tmax and Tmin is smaller than a specified value ΔT0. When the differences between Tmax and Tmin is equal to or greater than ΔT0 (Step 2506=NO), which suggests that the water temperature control system working properly, the process after Step 2507 is skipped and the present procedure is once finished.

On the other hand, when the difference between Tmax and Tmin is smaller than the specified value ΔT0 (Step 2506=YES), which suggests a certain kind of abnormality (i.e., failure) is caused in the water temperature control system, the process advances after Step 2507.

Specifically, in Step 2507, an occurrence of a certain failure, including the above-mentioned generic failure and specific failure, in the water temperature control system is determined.

The process advances to Step 2508 after the process of above-mentioned Step 2507.

In Step 2508, it is determined whether the value of the current Tmax is lower than the standard temperature (i.e., a temporal stop permission temperature) Tw0 which is a preset value.

When Tmax is lower than Tw0 (Step 2508=YES), the process advances to Step 2509 and an occurrence of a specific failure about the water temperature control system is determined, just like above-mentioned Step 2395 (refer to FIG. 14). Then, the present procedure is once finished.

On the other hand, when Tmax is equal to or greater than Tw0 (Step 2508=NO), the process of Step 2509 is skipped and the present procedure is once finished.

The present disclosure is not limited to the concrete example of an operation described in the above embodiment.

For example, regarding each of above-mentioned conditions, an inequality sign "≥" may be replaceable with a sign ">" and vice versa. Similarly, "≤" may be replaceable with a sign "<" and vice versa.

The process using the cooling water temperature Tw may be replaceable with a process which uses an operation oil temperature (Tm) inside the transmission 26 almost "as is". That is, the process using the above-mentioned Tw and Tw0 may be replaceable with the process which uses Tm and Tm0 substantially without any change.

In such a way, an abnormality that either hinders or delays a detection of a reach/rise of the operation oil temperature Tm to the standard temperature Tm0 in the transmission 26 is detected as a specific abnormality (i.e., as an abnormality (i) that hinders or delays a rise of the operation oil temperature Tm to the standard temperature Tm0 or (ii) that hinders or delays a detection of a rise of the temperature Tm to the standard temperature Tm0 even when Tm has actually risen to Tm0).

The parameter used for the determination of the prerequisite by the prerequisite determiner 201 may be suitably chosen from among the above, or a new condition or two may further be added to the above.

Further, any requisite, i.e., an operation condition, may be used as a prerequisite instead of being used as a requisite. The same applies to the determination scheme of the requisite by the requisite determiner 202.

For example, when the conditions of the above-mentioned condition (v) about a brake oil pressure Pbr is used NOT as a requisite but as a prerequisite, the above-described operation conditions (i.e., requisites) (i) thru (iv) correspond to the operation state of the vehicle V either by a driver or an occupant of the vehicle V (i.e., an artificial operation state).

On the other hand, the above-mentioned prerequisites (1)-(8) and the prerequisite (v) correspond to the drive state operating state of the vehicle V, which is caused by the operation state of the vehicle V by the driver or the occupant.

A determination of specific abnormality may be, as described above, performed by using parameters other than the cooling water temperature Tw. For example, the determination of specific abnormality may be performed by using the temperature of the various sensors (e.g., the A/F sensor 41d) installed in the exhaust pipe 21.

That is, in other words, the above-mentioned prerequisite includes that the A/F sensor 41d is in an active state, i.e., an element temperature Ts of the A/F sensor 41d (i.e., hereafter simply designated as an "element temperature Ts") is equal to or higher than a preset standard temperature Ts0 (Ts≥Ts0). The reason for such inclusion is for prevention of deterioration of the emission gas quality, due to a sensor inactive state continued for a long time by the temporal stop of the engine 10 that delays a rise of the element temperature Ts.

As is well-known, the element temperature Ts should be reaching the standard temperature Ts0 in a preset time after the start of the engine 10, just like the cooling water temperature Tw does. However, if a certain/unknown abnormality (i.e., failure) is happening, even after a preset time from a start of the engine 10, the reach of the element temperature Ts rising to the standard temperature Ts0 is not detected, which hinders/delays a determination of the element activated state of the A/F sensor 41d (i.e., an activation of the A/F sensor 41d not determined in a preset time from the engine start). In such a case, even though the other prerequisites and all requisites are determined as satisfied, the temporal stop of the engine 10 may be not performable.

Therefore, the above-described specific failure needs to be detected as a specific abnormality (i.e., as an abnormality (i) that hinders or delays a rise of the element temperature Ts to the standard temperature Ts0 or (ii) that hinders or delays a detection of a rise of the temperature Ts to the standard temperature Ts0 even when Ts has actually risen to Ts0).

Figure 17:
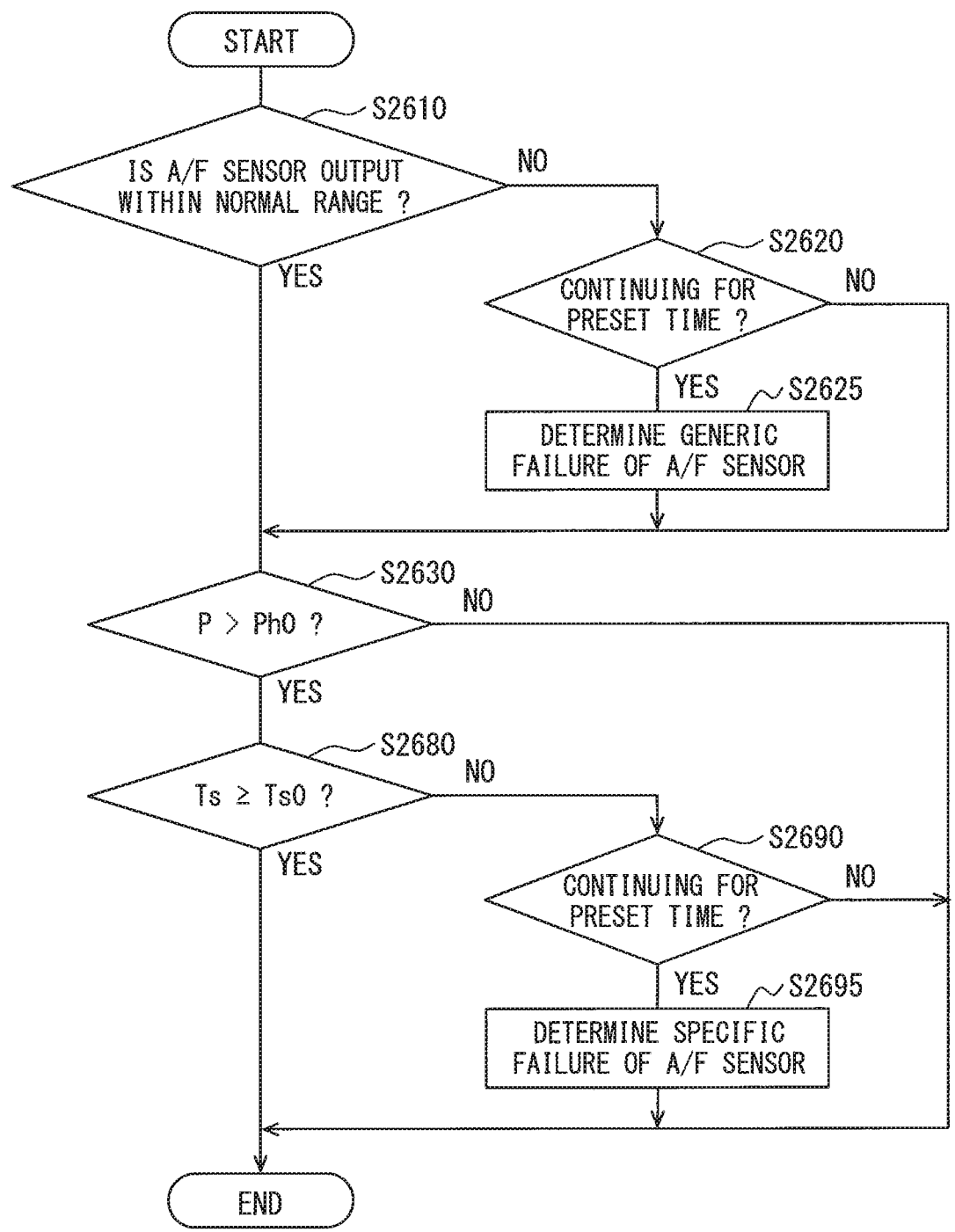
FIG. 17 is a flowchart of a modification of the operation in FIG. 14.

FIG. 17 is a flowchart corresponding to an operation of such a modification. The procedure shown in FIG. 17 is performed at predetermined intervals from a start of the hybrid system by the start switch 42. When such a procedure is started, it is determined first whether an A/F sensor 41d output value is within a normal range in Step 2610.

When the A/F sensor 41d output value is outside of the normal range (Step 2610=NO), the process advances to Step 2620 and it is determined whether such a state is continuing for a preset time.

When such a state in which the A/F sensor 41d output value is outside of the normal range is continuing for a preset time (Step 2620=YES), after the process advances to Step 2625, an occurrence of a generic failure about the A/F sensor 41d is determined, the process advances to Step 2630.

On the other hand, even when the A/F sensor 41d output value is outside of the normal range, if such a state is not continuing for a preset time (Step 2620=NO), the process of Step 2625 is skipped and the process advances to Step 2630.

When the A/F sensor 41d output value is within a normal range (Step 2610=YES), the processes of Steps 2620 and 2625 are skipped and the process advances to Step 2630.

In Step 2630, it is determined whether an accumulated value Ph of the supply power to a heater (not shown) in the A/F sensor 41d is exceeding a specified value Ph0.

When it is determined that Ph≥Ph0 (Step 2630=NO), the process after Step 2680 is skipped and the present procedure is once finished.

On the other hand, when it is determined that Ph>Ph0 (Step 2630=YES), the process advances to Step 2680.

In Step 2680, it is determined whether the element temperature Ts is equal to or higher than a preset standard temperature Ts0. Here, in this example, the element temperature Ts is a detection value (i.e., a measured value). That is, the detection value of the element temperature Ts is obtained from a linear relationship between the resistance of the above-mentioned heater (i.e., the resistance may be computed based on a voltage between two terminals of the heater and the detection value of the supply current to the heater) and the element temperature Ts. Since the detection technique of such an element temperature Ts is well-known, the details of such technique is omitted (if required, refer to a specification of a U.S. Pat. No. 6,332,459, etc.).

When the element temperature Ts is equal to or higher than the standard temperature Ts0 (Step 2680=YES), the present procedure is once finished.

On the other hand, when the element temperature Ts has not yet reached the standard temperature Ts0 (Step 2680=NO), the process advances to Step 2690.

In Step 2690, it is determined whether an "indetermination state" is continuing for a preset time, in which the element temperature Ts has not yet reached the standard temperature Ts0 (Step 2680=NO) even though an accumulated value Ph of supplied power to the heater has exceeded the specified value Ph0 (Step 2630=YES).

When such a state is continuing for a preset time (Step 2690=YES), after the process advances to Step 2695, an occurrence of the specific failure about A/F sensor 41d is determined, and the present procedure is once finished.

When it is determined that the above-mentioned state has not yet continued for a preset time (Step 2690=NO), the process of Step 2695 is skipped and the present procedure is once finished.

Regarding the above, how to detect/measure the element temperature Ts is not limited to the manner described above. That is, for example, the element temperature Ts may be, as is well-known, detected by using the temperature characteristics of the element's electrical properties (e.g., admittance, impedance, etc.).

Alternatively, the element temperature Ts may be on-board estimated, as is well-known, by using (i) other parameters, e.g., an exhaust gas temperature Tex, temperature Tc of the catalytic converter 23, and an intake air temperature Tin, and (ii) a preset equation, etc.

Figure 18:
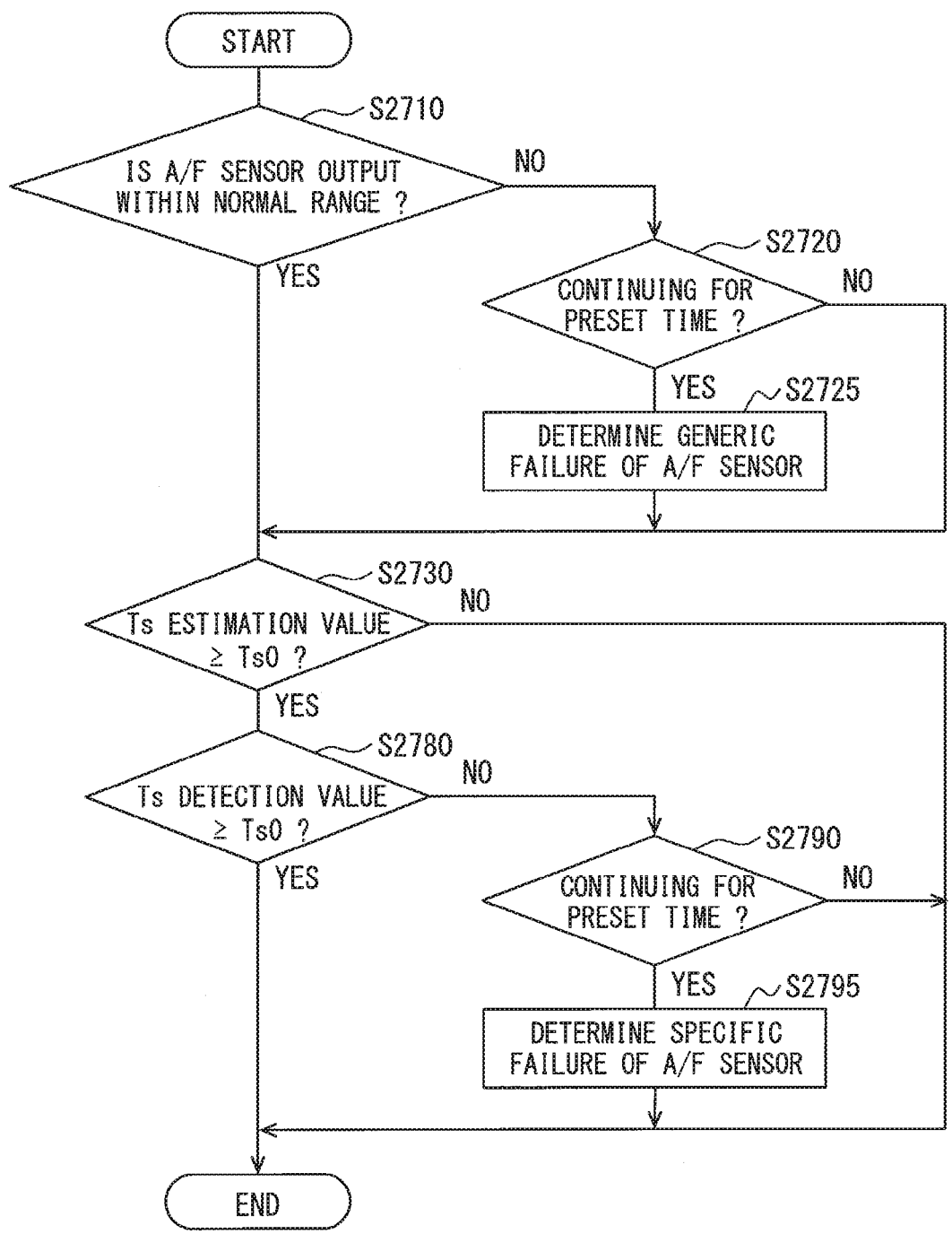
FIG. 18 is a flowchart of another modification of the operation in FIG. 14.

FIG. 18 is a partial modification of the procedure of FIG. 17.

Specifically, the procedure of FIG. 18 performs a determination of a specific failure by using a detection value and an on-board estimation value of the element temperature Ts.

In the procedure of FIG. 18, the processes of Steps 2710, 2720, and 2725 are the same as the processes of Steps 2610, 2620, and 2625 in the procedure of FIG. 17 respectively. Therefore, the processes after Step 2730 are described hereafter.

In Step 2730, it is determined whether the on-board estimation value of the element temperature Ts is equal to or higher than the standard temperature Ts0.

When the on-board estimation value of the element temperature Ts is lower than the standard temperature Ts (Step 2730=NO), the process after Step 2780 is skipped and the present procedure is once finished.

On the other hand, when the on-board estimation value of the element temperature Ts is equal to or higher than the standard temperature Ts0 (Step 2730=YES), the process advances to Step 2780.

In Step 2780, it is determined whether the detection value of the element temperature Ts is equal to or higher than a preset standard temperature Ts0. When the detection value of the element temperature Ts is equal to or higher than the standard temperature Ts0 (Step 2780=YES), the present procedure is once finished.

On the other hand, when the detection value of the element temperature Ts has not yet reach the standard temperature Ts0 (Step 2780=NO), the process advances to Step 2790.

The processes of Step 2790 and Step 2795 are the same as the processes of Step 2690 and Step 2695 in the procedure of FIG. 17, respectively.

Further, the element temperature of the A/F sensor 41d may be replaced with the element temperature of other exhaust gas sensors (e.g., a NOx sensor, a PM sensor, etc.) which are not illustrated.

Further, in addition to the A/F sensor 41d, an oxygen density sensor (i.e., such a sensor may be called as an "O2 sensor") may be disposed on the downstream side of the catalytic converter 23 in the exhaust pipe 21. In such a case, the element temperature of such a sensor may be used.

For a temporal stop function to be properly operated, It is important that a restart power system of the engine 10 (i.e., the high voltage battery 35 and various sensors connected thereto) is normal. More practically, in the configuration of the above-mentioned vehicle V, the temporarily stopped engine 10 cannot be restarted when the remaining amount of charge (i.e., SOC) of the high voltage battery 35 is low. Therefore, the above-mentioned prerequisite includes that the remaining charge amount is greater than a preset standard remaining amount (SOC≥SOC0).

However, if a certain abnormality (i.e., failure) is happening in the above-mentioned restart power system, the remaining charge amount may be hindered or delayed to reach an amount of equal to or greater than a preset standard remaining amount, or a detection of the reach of the remaining charge amount may be hindered or delayed even when the remaining charge amount has already reached to standard remaining amount. In such a case, the temporal stop of the engine 10 becomes impossible or the timing of enablement of such a temporal stop is may be delayed.

In view of such a situation, practical examples about a determination of a specific failure in the above-mentioned restart power system are shown below (refer to FIGS. 20-25).

Figure 19:
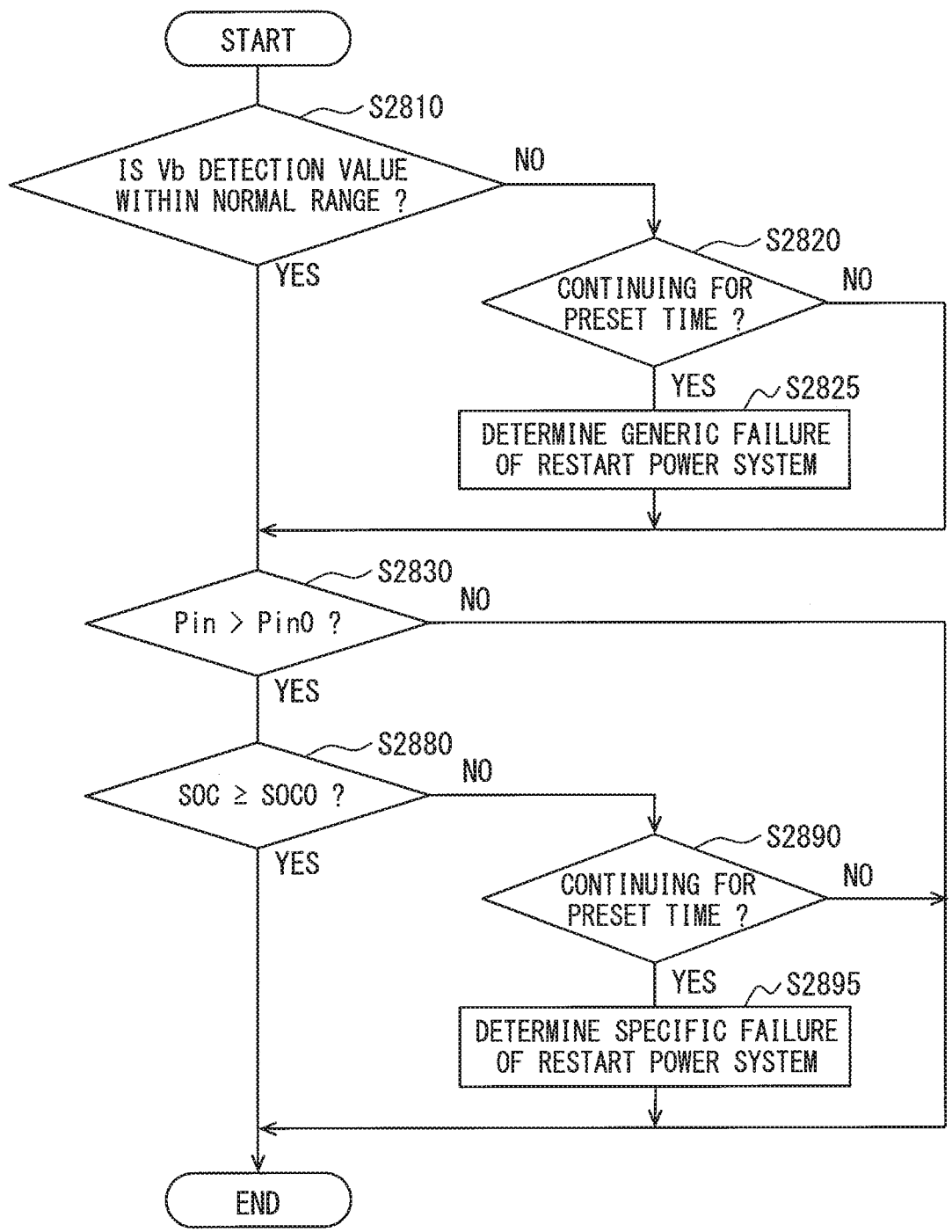
FIG. 19 is a flowchart of yet another modification of the operation in FIG. 14.

The procedure shown in FIG. 19 is performed at predetermined intervals after a start of the hybrid system by the start switch 42.

The present procedure determines first, after a start of the system, whether the detection value Vb of the voltage sensor 41v is within a normal range in Step 2810.

When the detection value Vb of the voltage sensor 41v is outside of the normal range (Step 2810=NO), the process advances to Step 2820, and it is determined whether such a state is continuing for a preset time.

When such a state in which the detection value Vb of the voltage sensor 41v is outside of the normal range is continuing for a preset time (Step 2820=YES), after the process advances to Step 2825 and an occurrence of the generic failure about the restart power system is determined, the process advances to Step 2830.

On the other hand, even when the detection value Vb of the voltage sensor 41v is outside of the normal range, if such a state is not continuing for a preset time (Step 2820=NO), the process of Step 2825 is skipped and the process advances to Step 2830.

When the detection value Vb of the voltage sensor 41v is within a normal range (Step 2810=YES), the processes of Steps 2820 and 2825 are skipped and the process advances to Step 2830.

In Step 2830, it is determined whether an accumulated value Pin of the input power to the high voltage battery 35 after a start of the engine 10 (i.e., in the current "trip") is greater than a specified value Pin0.

When it is determined that Pin≤Pin0 (Step 2830=NO), the process after Step 2880 is skipped and the present procedure is once finished.

On the other hand, when it is determined that Pin>Pin0 (Step 2830=YES), the process advances to Step 2880.

In Step 2880, it is determined whether the detection value SOC of the remaining charge amount of the high voltage battery 35 is equal to or greater than the standard remaining amount SOC0.

When the detection value SOC of the remaining charge amount is equal to or greater than the standard remaining amount SOC0 (Step 2880=YES), the present procedure is once finished.

On the other hand, when the detection value SOC of the remaining charge amount has not reached the SOC0 (Step 2880=NO), the process advances to Step 2890.

In Step 2890, it is determined whether an indetermination state is continuing for a preset time, in which the detection value SOC of the remaining charge amount has not reached the standard remaining amount SOC0 (Step 2880=NO) even though an accumulated value Pin of the input power to the high voltage battery 35 in the current trip is greater than the specified value Pin0 (Step 2830=YES).

When such a state is continuing for a preset time (Step 2890=YES), after the process advances to Step 2895 and an occurrence of a specific failure about a restart power system is determined (i.e., it is determined that a specific abnormality is happening which (i) hinders or delays a reach of the detection value SOC of the remaining charge amount to the standard remaining amount SOC0, or (ii) hinders or delays a detection of reach of the detection value SOC of the remaining charge amount to the standard remaining amount SOC0), the present procedure is once finished.

When the above-mentioned state is not continuing for a preset time (Step 2890=NO), the process of Step 2895 is skipped and the present procedure is once finished.

Figure 20:
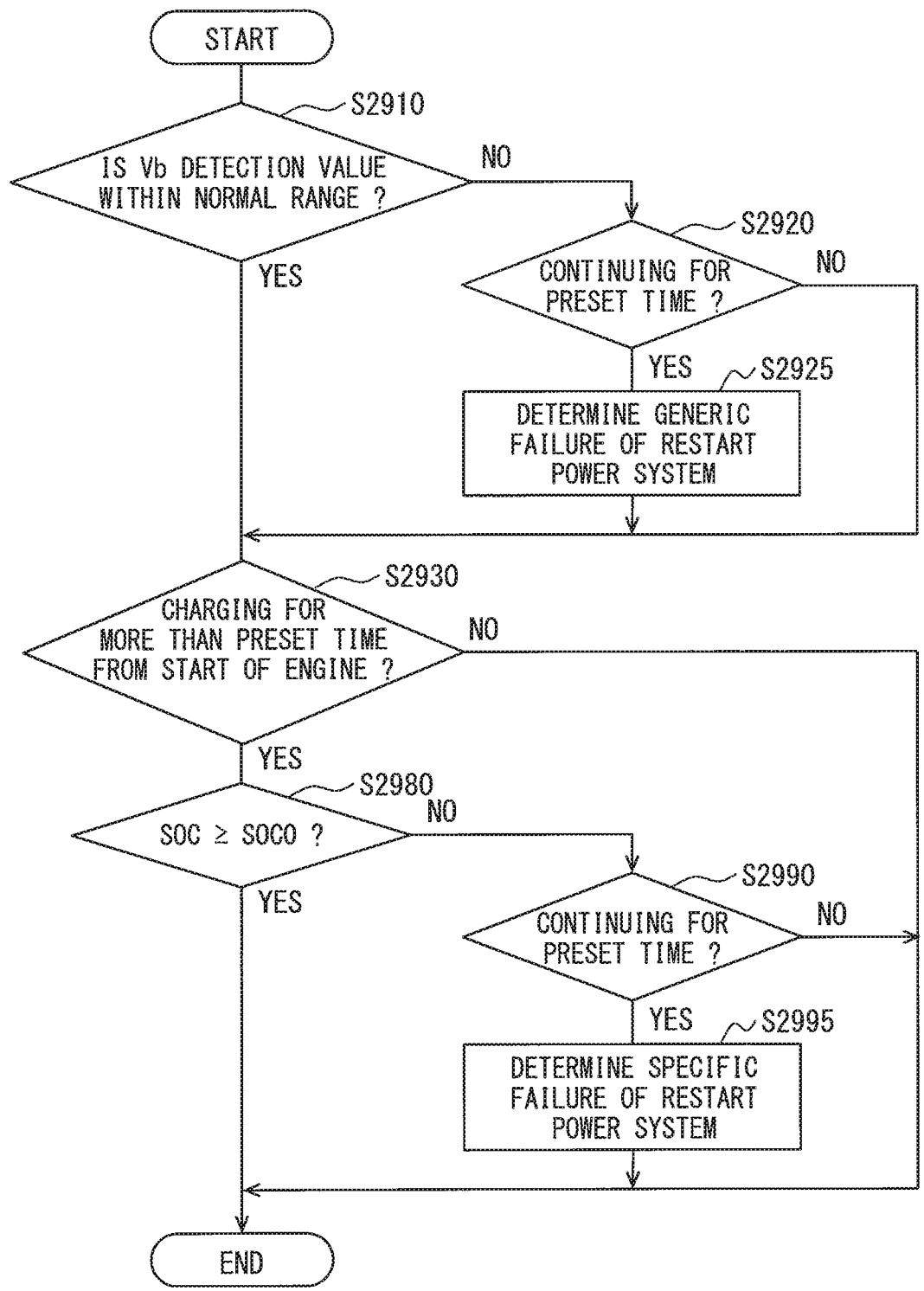
FIG. 20 is a flowchart of yet another modification of the operation in FIG. 14.

FIG. 20 is a partial modification of the procedure of FIG. 19.

That is, a comparison determination between the accumulated value Pin of the electric power and the specified value Pin0 in FIG. 19 (Step 2830) is replaced with a determination of whether a charging of the high voltage battery 35 is performed for a preset time or more from a start of the engine 10 (Step 2930).

Except for the above, the process of each of the Steps 2910, 2920, 2925, 2980, 2990, and 2995 of FIG. 20 is the same as the process of each of the Steps 2810, 2820, 2825, 2880, 2890, and 2895 of FIG. 19, respectively. According to such a procedure of FIG. 20, the same effects as FIG. 19 are also achievable.

Figure 22:
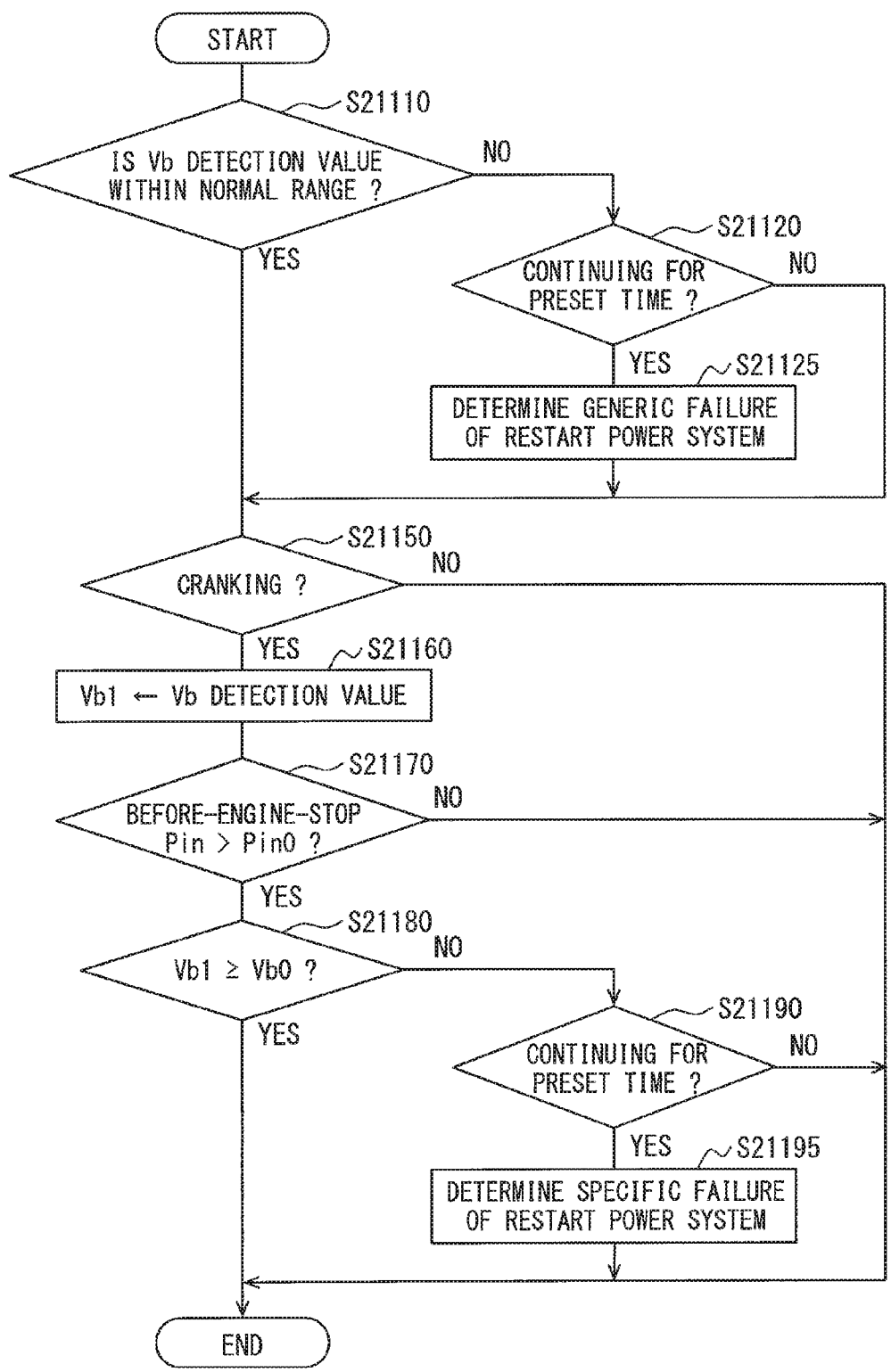
FIG. 22 is a flowchart of yet another modification of the operation in FIG. 14.

FIG. 22 is also a partial modification of the procedure of FIG. 22.

That is, a comparison determination between the accumulated value Pin of the electric power and the specified value Pin0 in FIG. 19 (Step 2830) is replaced with a determination of whether a preset time has passed from a start of the engine 10 (i.e., a determination of whether the crank shaft 25 has rotated for a preset time or more from the start of the engine 10) (Step 2930).

Figure 21:
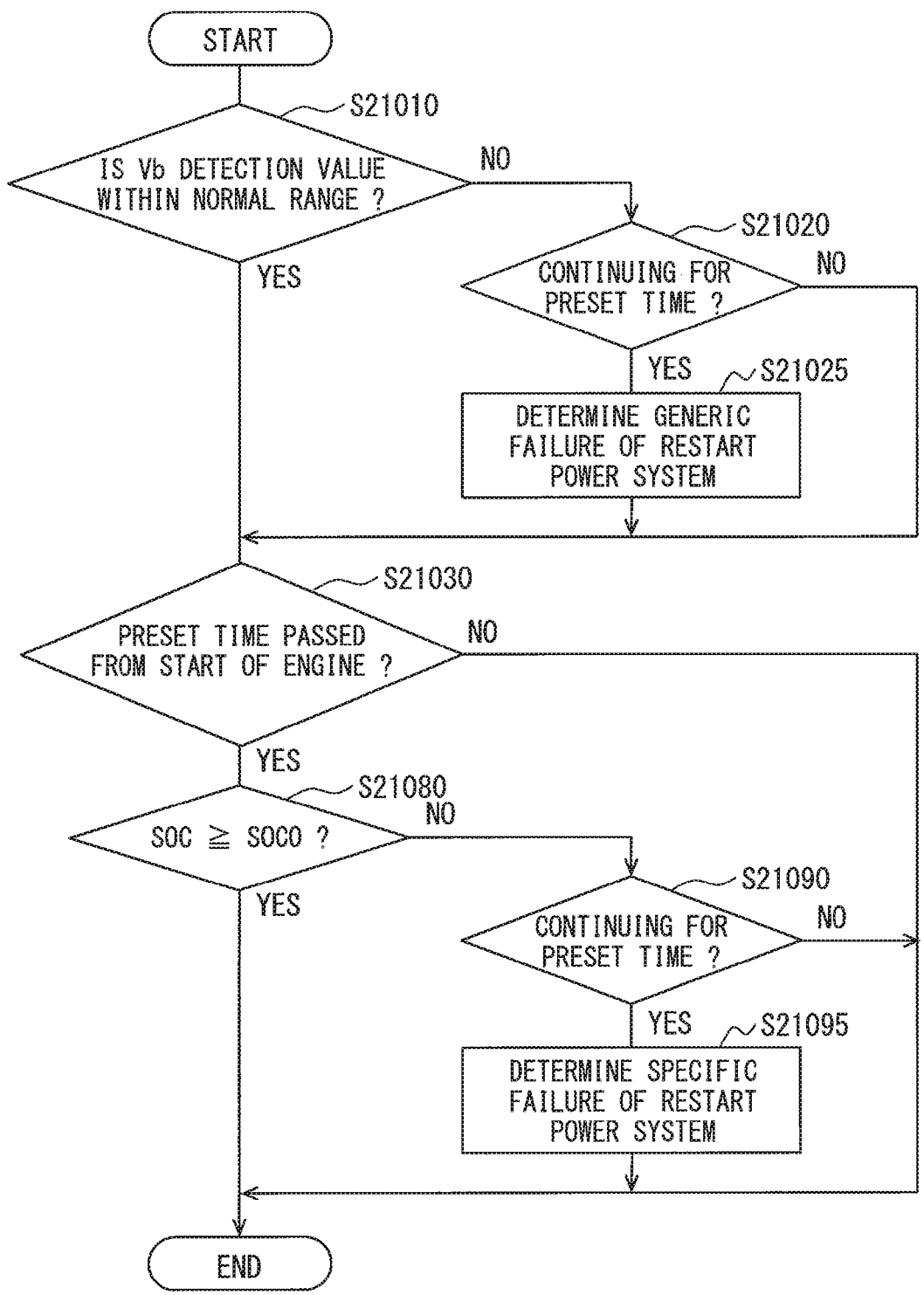
FIG. 21 is a flowchart of yet another modification of the operation in FIG. 14.

Except for the above, the process of each of the Steps 21010, 21020, 21025, 21080, 21090, and 21095 of FIG. 21 is the same as the process of each of the Steps 2810, 2820, 2825, 2880, 2890, and 2895 of FIG. 19 respectively. According to such a procedure of FIG. 21, the same effects as FIG. 19 are also achievable.

Figure 23:
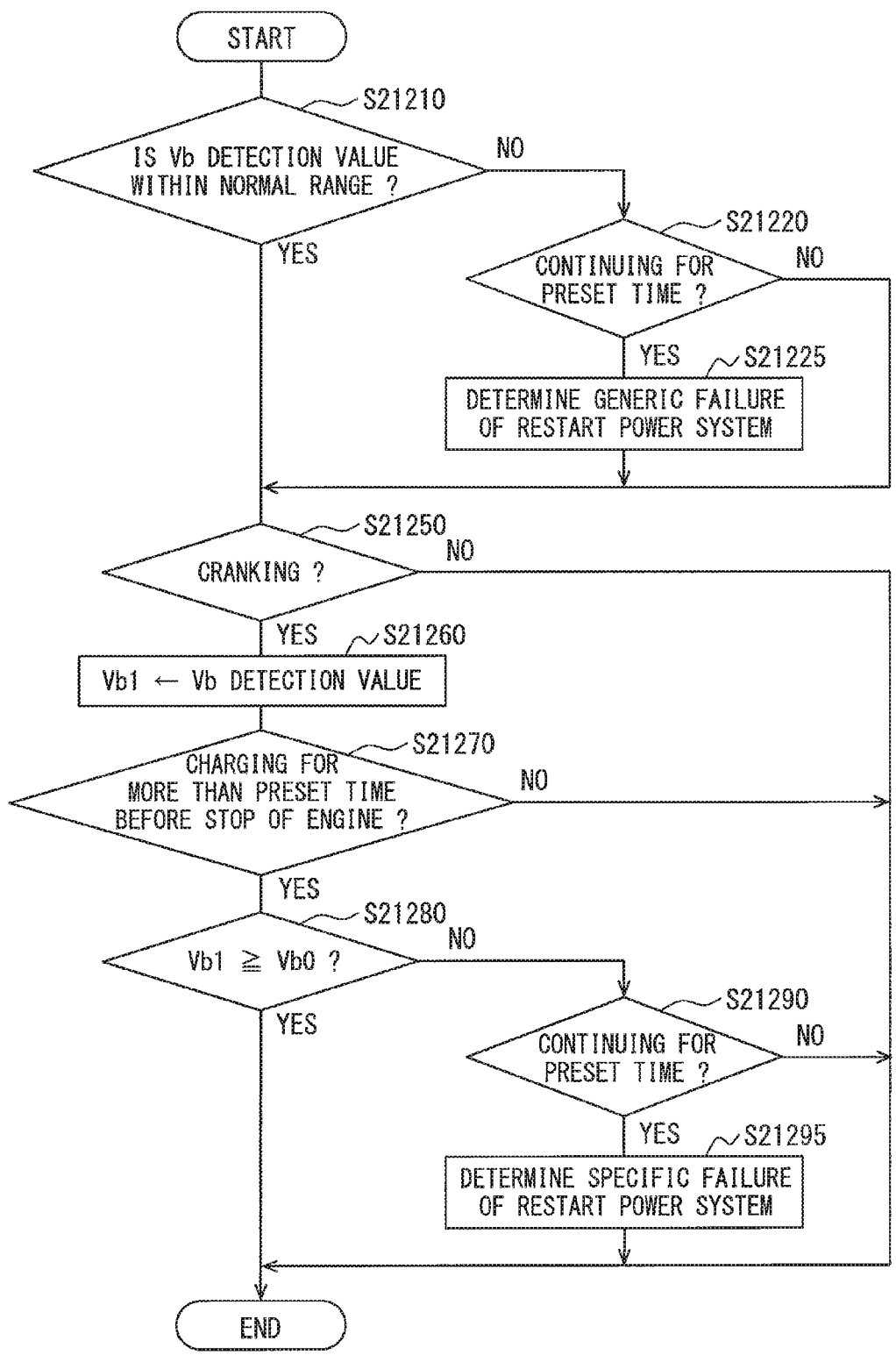
FIG. 23 is a flowchart of yet another modification of the operation in FIG. 14.
Figure 24:
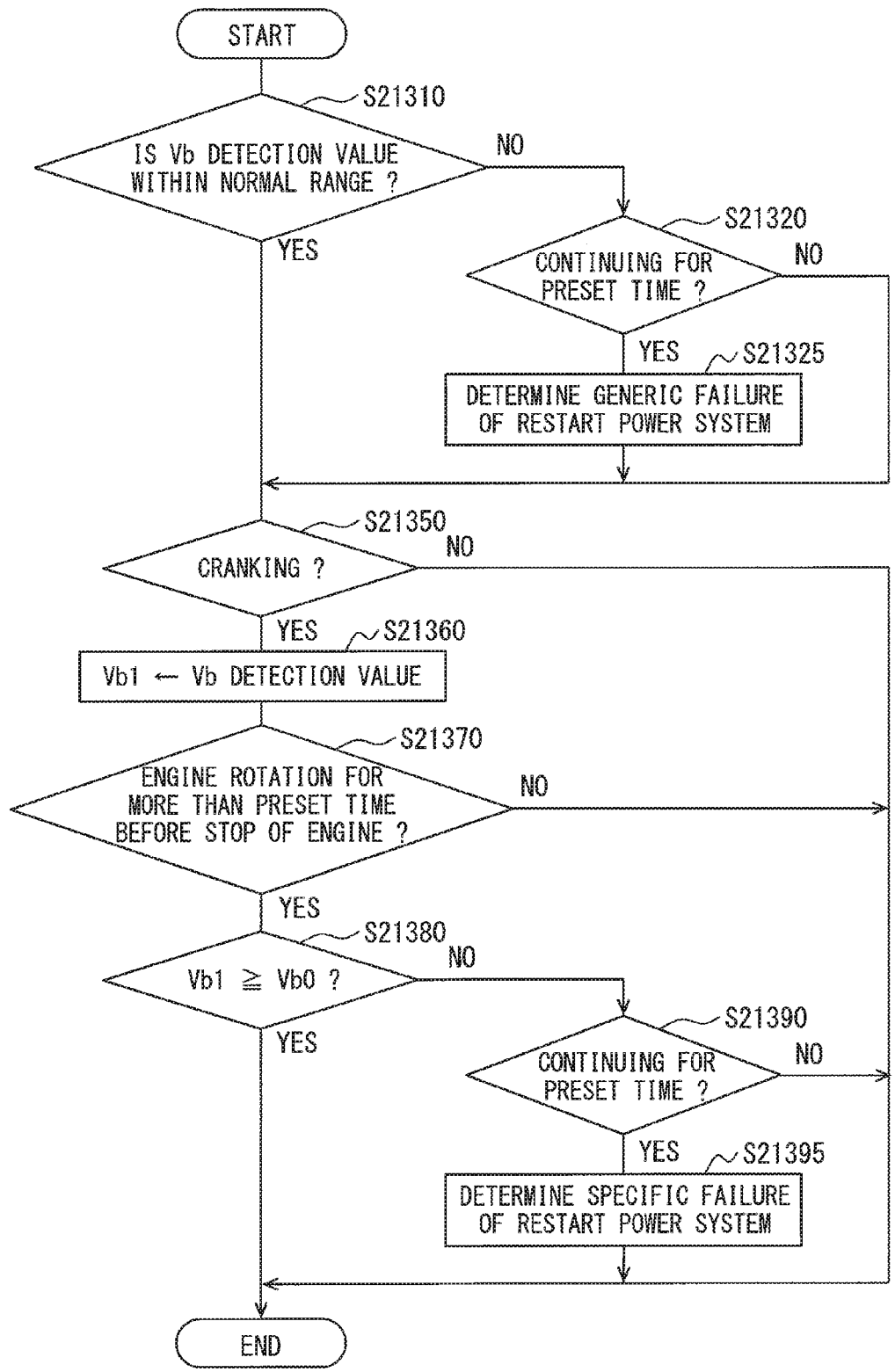
FIG. 24 is a flowchart of yet another modification of the operation in FIG. 14.

FIGS. 22 to 24 are also part modifications of the procedure of FIGS. 19 to 21. The same effects are achieved by the procedures of FIGS. 22 to 24, as to the procedures of FIGS. 19 to 21.

First, the procedure shown in FIG. 22 is performed at predetermined intervals after a start of the hybrid system by the start switch 42. When such a procedure is started, it is determined in Step 21110 whether the detection value Vb of the voltage sensor 41v is within a normal range.

When the detection value Vb of the voltage sensor 41v is outside of the normal range (Step 21110=NO), the process advances to Step 21120, and it is determined whether such a state is continuing for a preset time.

When such a state in which the detection value Vb of the voltage sensor 41v is outside of the normal range is continuing for a preset time (Step 21120=YES), after the process advances to Step 21125 and an occurrence of a generic failure about a restart power system is determined, the process advances to Step 21150.

On the other hand, even when the detection value Vb of the voltage sensor 41v is outside of the normal range, if such a state is not continuing for a preset time (Step 21120=NO), the process of Step 21125 is skipped and the process advances to Step 21150.

When the detection value Vb of the voltage sensor 41v is within a normal range (Step 21110=YES), the process of Steps 21120 and 21125 is skipped and the process advances to Step 21150.

In Step 21150, it is determined whether the engine 10 is currently cranking. When the engine 10 is not currently cranking (Step 21150=NO), the process after Step 21160 is skipped and the present procedure is once finished.

On the other hand, when the engine 10 is currently cranking (Step 21150=YES), the process advances to Step 21160.

In Step 21160, the detection value Vb of the voltage sensor 41v is set up as a specific failure determination parameter Vb1. Then, the process advances to Step 21170.

In Step 21170, it is determined whether the accumulated value Pin of the input power to the high voltage battery 35 until the last (i.e., an immediately-before) temporal stop of the engine 10 is greater than the specified value Pin0.

When it is determined that Pin≤Pin0 (Step 21170=NO), the process after Step 21180 is skipped and the present procedure is once finished.

On the other hand, when it is determined that Pin>Pin0 (Step 21170=YES), the process advances to Step 21180.

In Step 21180, it is determined whether the specific failure determination parameter Vb1 (i.e., a value estimated to be an actual voltage between the terminals of the high voltage battery 35) is the preset reference voltage Vb0. Here, as mentioned above, the standard voltage Vb0 is one of the prerequisites of a temporal stop of the engine 10, and it corresponds to the minimum value of the voltage between the terminals of the high voltage battery 35 which is required for a restart (of the engine 10).

When it is determined that Vb1≥Vb0 (Step 21180=YES), the present procedure is once finished.

On the other hand, when Vb1 has not reached Vb0 (Step 21180=NO), the process advances to Step 21190.

In Step 21190, it is determined whether an indetermination state is continuing for a preset time, in which the specific failure determination parameter Vb1 has not reached the standard voltage Vb0 (Step 21180=NO) even though the engine 10 is cranking (Step 21150=YES) and the input power accumulated value Pin until the last temporal stop of the engine 10 is greater than the specified value Pin0 (Step 21170=YES).

When such a state is continuing for a preset time (Step 21190=YES), the process advances to Step 21195, after an occurrence of the specific failure about the restart power system is determined (i.e., an abnormality which (i) hinders or delays of reach of the voltage Vb between the terminals of the high voltage battery 35 to reach the standard voltage Vb0, or (ii) hinders or delays a detection of reach of the voltage Vb between the terminals of the high voltage battery 35 to the standard voltage Vb0 even when Vb has actually reached Vb0), the present procedure is once finished.

When the above-mentioned state has not yet continued for a preset time (Step 21190=NO), the process of Step 21195 is skipped and the present procedure is once finished.

FIG. 24 is a partial modification of the procedure of FIG. 23.

That is, a determination of whether the accumulated value Pin of the input power to the high voltage battery 35 until the last temporal stop of the engine 10 in FIG. 22 is greater than a specified value Pin0 (Step 21170) is replaced with a determination of whether a charging of the high voltage battery 35 is performed for a preset time or more before the last stop of the engine 10 (Step 21270).

Except for the above, the process of each of the Steps 21210, 21220, 21225, 21250, 21260, 21280, 21290, and 21295 of FIG. 23 is the same as the process of each of the Steps 21110, 21120, 21125, 21150, 21160, 21180, 21190, and 21195 of FIG. 22, respectively.

FIG. 24 is also a partial modification of the procedure of FIG. 22.

That is, a determination of whether the accumulated value Pin of the input power to the high voltage battery 35 until the last temporal stop of the engine 10 in FIG. 22 is greater than a specified value Pin0 (Step 21170) is replaced with a determination of whether the engine 10 (i.e., the crank shaft 25) has rotated for a preset time or more until/before the last stop of the engine 10 (Step 21370).

Except for the above, the process of each of the Steps 21310, 21320, 21325, 21350, 21360, 21380 21390, and 21395 of FIG. 24 is, respectively, the same as the process of each of the Steps 21110, 21120, 21125, 21150, 21160, 21180, 21190, and 21195 of FIG. 22.

When a sufficient negative pressure for braking is not reserved in the brake booster, it is necessary to suck air out of the inside of the booster and to reserve a negative pressure in the inside thereof, by operating the engine 10 and having the inside of the inlet pipe in a negative pressure state.

Therefore, in the above-mentioned prerequisites, a condition that a negative pressure sensor value of the brake is equal to or greater than a standard amount (i.e., a difference between an in-booster pressure and an atmospheric pressure is equal to or greater than a standard amount).

However, a negative pressure Vbr of the brake may be hindered or delayed to reach the standard amount Vbr0 if a certain abnormality is happening in the booster, or a detection of the reach of the negative pressure Vbr to Vbr0 may be hindered or delayed even when Vbr has already reached Vbr0 if a certain abnormality is happening in the negative pressure sensor of the brake. In such a case, a temporal stop of the engine 10 becomes impossible or the timing of enablement of such a temporal stop may be delayed.

The specific failure of the negative pressure sensor of the brake is determined by the same procedure as the procedure of FIG. 21 described above. In such a case, in Step corresponding to S21010, it is determined whether a negative pressure sensor value of the brake is within a normal range. Further, in Step corresponding to Step 21080, it is determined whether the negative pressure Vbr of the brake is equal to or greater than Vbr0. The processes other than the above are performed according to the process of each of the Step of FIG. 21, i.e., according to S21020, S21025, S21030, S21090, and S21095.

In the above description of the embodiment, among the conditions for performing a temporal stop of the engine 10, how to detect an abnormality that (i) hinders or delays the satisfaction of the prerequisite or (ii) hinders or delays a determination/detection of the satisfaction of the prerequisite is mentioned. The same abnormality detection may also be applicable to the satisfaction or the satisfaction detection of the requisite.

Figure 25:
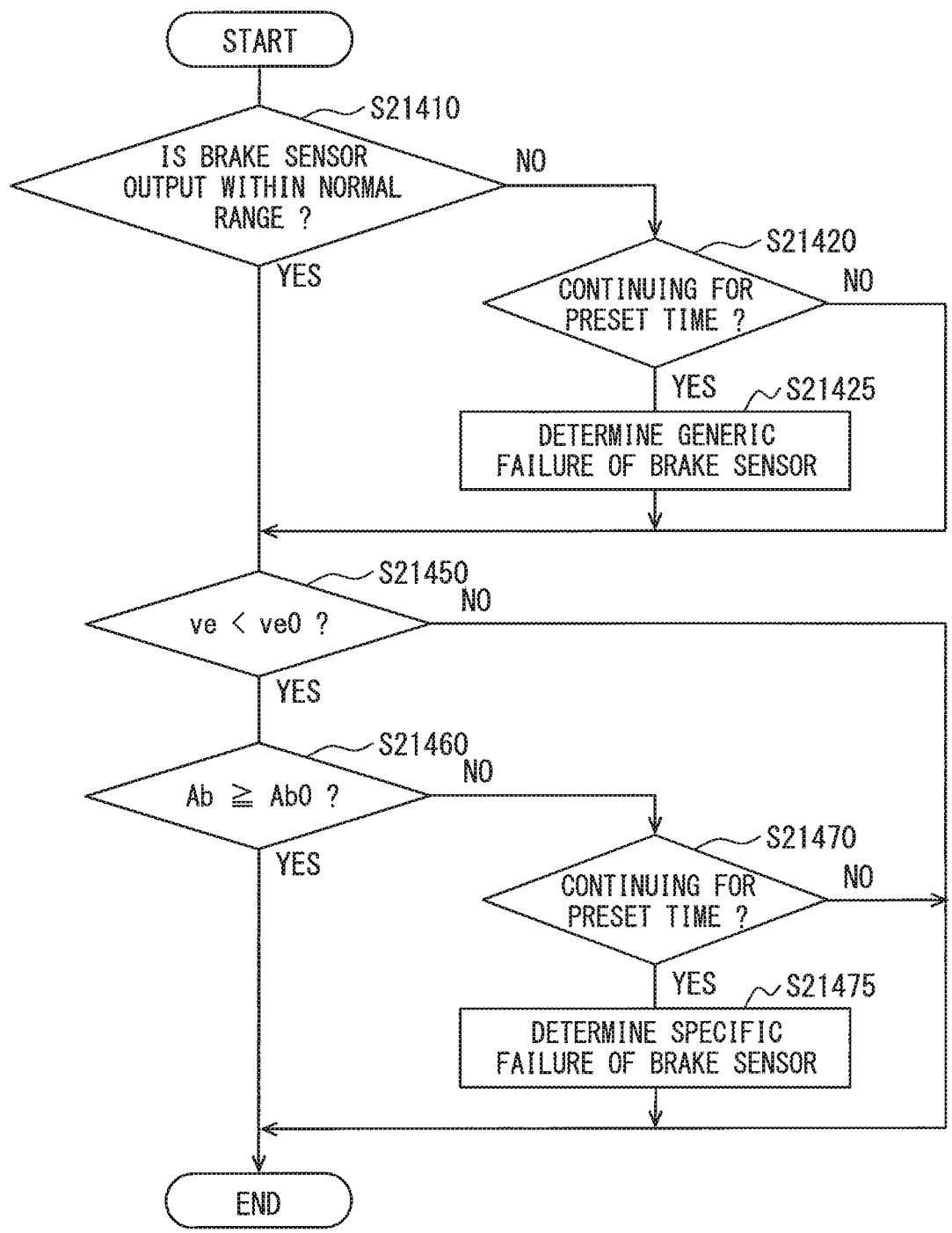
FIG. 25 is a flowchart of yet another modification of the operation in FIG. 14.

FIG. 25 describes an embodiment, in which an abnormality that hinders satisfaction of one of the requisites, i.e., an amount of operation of the brake pedal is equal to or greater than a preset amount, due to a sensor failure of the brake sensor 41r is detected.

The procedure shown in FIG. 25 is performed at predetermined intervals after a start of the hybrid system by the start switch 42. Here, it is assumed that a gearshifter is operated to be in a D range (i.e., drive).

When the present procedure is started, it is determined in Step 21410 whether an output value of a brake pedal depression amount Ab from a brake sensor 41r is within a normal range.

When the output value of the brake sensor 41r is outside of the normal range (Step 21410=NO), the process advances to Step 21420, and it is determined whether such a state is continuing for a preset time.

When such a state in which the output value of the brake sensor 41r is outside of the normal range is continuing for a preset time (Step 21420=YES), after the process advances to Step 21425 and an occurrence of the generic failure about the brake sensor 41r is determined, the process advances to Step 21450.

On the other hand, even when the output value of the brake sensor 41r is outside of the normal range, if such a state is not continuing for a preset time (Step 21420=NO), the process of Step 21425 is skipped and the process advances to Step 21450.

When the output value of the brake sensor 41r is within a normal range (Step 21410=YES), the processes of Steps 21420 and 21425 are skipped and the process advances to Step 21450.

In Step 21450, it is determined whether a travel speed ve of the vehicle V is lower than a specified value ve0.

When it is determined that ve≥ve0 (Step 21450=NO), the process after Step 21460 is skipped, and the present procedure is once finished. The specified value ve0 is a threshold travel speed for determining whether the vehicle V is in a stop state.

On the other hand, in case that ve<ve0 (Step 21450=YES), the process advance to Step 21460.

In Step 21460, it is determined whether the brake pedal depression amount Ab is equal to or greater than the specified values Ab0.

When the brake pedal depression amount Ab is equal to or greater than Ab0 (Step 21460=YES), the process after Step 21470 is skipped and the present procedure is once finished.

On the other hand, when the brake pedal depression amount Ab has not reached Ab0 (Step 21460=NO), the process advances to Step 21470.

In Step 21470, it is determined whether an indetermination state is continuing for a preset time, in which the brake pedal depression amount Ab is smaller than the specified value Ab0 (Step 21460=NO) even though the travel speed ve of the vehicle V is smaller than the specified value ve0 (i.e., although the vehicle V is in a stop state) (Step 21450=YES).

When such a state is continuing for a preset time (Step 21470=YES), after the process advances to Step 21475 and an occurrence of the specific failure about the brake sensor 41r is determined, the present procedure is once finished.

When such a state is not yet continuing for a preset time (Step 21470=NO), the process of Step 21475 is skipped and the present procedure is once finished.

According to the present modification, a failure that hinders (i.e., makes it impossible for) the brake pedal depression amount Ab to reach the specified value Ab0, or a failure that makes an output value of the brake sensor 41r to stay at a fixed value that is smaller than Ab0 are both determinable/detectable.

That is, when a certain abnormality is happening, such an abnormality is determined as a specific abnormality (A) when the abnormality is causing a non-satisfaction of the requisite or is disabling a determination of satisfaction of the requisite, or (B) when the abnormality is causing a delay of satisfaction of the requisite or a delay of determination of satisfaction of the requisite.

As an example of a partial modification of the procedure of FIG. 25, a comparison determination for comparing the brake pedal depression amount Ab with the specified value Ab0 may be replaced with a comparison determination for comparing the brake oil pressure Pbr with the specified value Pbr0. In such a case, In S21410, it is determined whether an output value of the brake oil pressure Pbr from the brake pressure sensor 41n is within a normal range.

In Step 21460, it is determined whether the brake oil pressure Pbr is equal to or greater than the specified values Pbr0.

Except for the above, the other processes are performed according to the process of each of the Steps 21420, 21425, 21450, 21470, and 21475 of FIG. 25, respectively.

Such a procedure also enables a determination of a specific failure.

As an example of another partial modification of the procedure of FIG. 25, a comparison determination for comparing the brake pedal depression amount Ab with the specified value Ab0 may be replaced with a comparison determination for comparing the travel speed ve with the specified value ve0. In such a case, In S21410, it is determined whether an output value of from the vehicle speed sensor 41m is within a normal range.

In Step 21450, it is determined whether the gearshifter is operated to be in a P (i.e., parking) range based on the output value from the shift position sensor 41p, or whether the brake pedal depression amount Ab is equal to or greater than the specified value Ab0 based on the output of the brake sensor 41r, together with other conditions.

In Step 21460, it is determined whether the travel speed ve is equal to or lower than ve0.

Except for the above, the other processes are performed according to the process of each of the Steps 21420, 21425, 21470, and 21475 of FIG. 25, respectively.

Such a procedure also properly enables a determination of a specific failure.

As an example of a modification of the configuration of FIG. 1 is described, in which the accelerator opening sensor 41s, the brake sensor 41r, and the throttle position sensor 41c are respectively provided as a set of two sensors, i.e., as a combination of one sensor for a control and the other sensor for a diagnosis. In such a case, the procedure of FIG. 25 may be partially modified.

For example, a comparison determination for comparing the brake pedal depression amount Ab with the specified value Ab0 may be replaced with a comparison determination for comparing an output of the control sensor with an output of the diagnosis sensor. In such a case, in Step corresponding to S21410 of FIG. 25, it is determined whether both of the two output values from the brake sensor 41r are within the normal range. Further, Step corresponding to S21450 is removed since, in the present modification, such Step is not required. Further, in Step corresponding to Step 21460, it is determined whether a sensor state indicates the output of the control sensor is smaller than a preset value AB0 even though the output of the diagnosis sensor is equal to or greater than a preset value AB1 (i.e., the value AB1 and the value AB0 are basically the same value. However, the value AB1 and the value AB0 may be different by a variation amount of the output value of the sensor which is cause by an amount of tolerance of each of those sensors. Except for the above, the process is performed according to each of the Steps 21420, 21425, 21470, and 21475 of FIG. 25, respectively.

For the sensors other than the brake sensor 41r, by performing the same determination about the accelerator opening sensor 41s and the throttle position sensor 41c, the specific failure may be determined.

As each of the above-mentioned embodiments in which the system is configured to (i) have the stop requester 203 and the stop-start actuator 204 in separate units and (ii) an exchange of a temporal stop request and a restart request between 203 and 204 is performed via CAN (i.e., Control Area Network), when an abnormality is caused in a CAN communication (i.e., when a frame containing a temporal stop request is unreceivable, or when a checksum of a frame has abnormality, etc.), a temporal stop request cannot be transmitted to the stop-starting actuator 204, and the engine 10 cannot be properly stopped temporarily. Therefore, when such a state continues for a preset time, it is determined that a specific failure of the stop requester 203 is happening.

Regarding the other CAN signals affecting the temporal stop operation (i.e., signals that is input to the prerequisite determiner or to the requisite determiner, etc.), the same determination may be performed.

For example, a vehicle speed signal inputted to the requisite determiner is received via CAN from TCM (Transmission Control Module) or from BCM (Brake Control Module), the same determination may be performed for the vehicle speed signal.

An external device C shown in FIG. 1 is disposed in a data-communicable manner with a vehicle V, which is a so-called hybrid vehicle, via a communication channel that is either a wired communication or a wireless communication.

The vehicle V has an engine 10 (i.e., a multi-cylinder gasoline engine of a spark ignition type) installed therein. A throttle valve 12 of the electric drive type is disposed in an inlet pipe 11 of the engine 10. Near an intake port which is a connection section between the inlet pipe 11 and a cylinder, an injector 13 as a means to inject gasoline fuel is disposed. A spark plug 15 and an igniter 16 which applies high voltage for an ignition of the spark plug 15 are disposed on each cylinder as an ignition means of the engine 10. An intake valve 17 and an exhaust valve 18 are respectively disposed in the intake port and in the exhaust port.

A catalytic converter 23 as an exhaust emission purifier is disposed in an exhaust pipe 21 of the engine 10. The catalytic converter 23 has a three-way catalyst, for example, and it is configured so that the detrimental constituent (i.e., HC, CO, NOx) in the exhaust gas is purified when the exhaust gas passes therethrough.

A transmission 26 containing a power distribution device with a planetary gear mechanism is connected to a crank shaft 25 of the engine 10. A motor 28 which can operate as an electric motor and as a generator is connected to the transmission 26 via a gear shaft 27. In the present embodiment, the motor 28 serves as a generator when a certain condition is satisfied during a deceleration of the vehicle V, for providing a regeneration braking function. The power generation by the motor 28 in the above-described manner by the regeneration braking function is hereafter designated as a "power regeneration."

Further, to the transmission 26, a wheel (i.e., a driving wheel) 33 is connected via an output shaft 29, a differential gear 31, and a drive shaft 32. That is, the transmission 26 is configured to be capable of outputting an output power of the engine 10 and an output power of the motor 28 to the same drive shaft 32.

The motor 28 is connected to a high voltage battery 35 via an inverter 34. When the motor 28 operates as a generator, the inverter 34 is used for charging an electric power to the high voltage battery 35, after converting the electric power generated by the motor 28 from a direct current to an alternating current.

On the other hand, when the motor 28 operates as an electric motor, the inverter 34 is used to convert the electric power outputted from the high voltage battery 35 from the direct current to the alternating current, and to output the converted electric power to the motor 28.

Two or more sensors which are illustrated in part below are disposed in the vehicle V. Specifically, the inlet pipe 11 has, disposed thereon, an air flow meter 41a, an intake air temperature sensor 41b, and a throttle position sensor 41c. The air flow meter 41a is disposed so that the output (of the meter 41a) corresponds to the mass flow rate (Ga) of the intake air which passes through the inlet pipe 11. The intake air temperature sensor 41b is disposed so that the output corresponds to the temperature (Tin) of the above-mentioned intake air. The throttle position sensor 41c is disposed at a position corresponding to the throttle valve 12 so that the output corresponds to a throttle opening TA which is an opening (i.e., a rotation angle) of the throttle valve 12.

On the exhaust pipe 21, an A/F sensor 41d, a catalyst temperature sensor 41e, and an exhaust gas temperature sensor 41f are provided. The A/F sensor 41d is an oxygen density sensor which produces an output corresponding to the oxygen density in the exhaust gas, and is disposed at an upstream position of the catalytic converter 23 on the exhaust pipe 21. The catalyst temperature sensor 41e is disposed on the catalytic converter 23 so that the output of the sensor 41e corresponds to the temperature (Tc) of the catalytic converter 23. The exhaust gas temperature sensor 41f is provided so that the output of the sensor 41f corresponds to the temperature (Tex) of the exhaust gas which passes through the exhaust pipe 21.

The transmission 26 is equipped with a mission oil temperature sensor 41g. The mission oil temperature sensor 41g is disposed so that the output corresponds to the operating oil temperature inside the transmission 26 (Tm). Further, the engine 10 is equipped with a cooling water temperature sensor 41h, and a crank angle sensor 41k. The cooling water temperature sensor 41h is disposed so that the output corresponds to a cooling water temperature (Tw) of the engine 10. The crank angle sensor 41k is disposed on a crank case of the engine 10 so that an output signal therefrom includes a narrow width pulse at every 10 degree rotation of the crank shaft 25 and a broad width pulse at every 360 degree rotation of the crank shaft 25, which may be mainly used for a detection of an engine rotation number Ne.

The vehicle V is equipped with a vehicle speed sensor 41m, and a brake pressure sensor 41n. The vehicle speed sensor 41m is disposed so that the output corresponds to a travel speed (ve) of the vehicle V. The brake pressure sensor 41n is disposed so that the output corresponds to a brake oil pressure (Pbr) which is a pressure of a hydraulic fluid supplied to a brake caliper (not illustrated) from a brake actuator (not illustrated).

The vehicle V is equipped with a shift position sensor 41p, a brake sensor 41r, an accelerator opening sensor 41s and an open-close sensor 41t. The shift position sensor 41p is disposed so that the output corresponds to an operation state of the gearshift (not illustrated) disposed near the driver's seat of the vehicle V. The brake sensor 41r is disposed so that the output corresponds to an operation amount of a brake pedal (not illustrated). The accelerator opening sensor 41s is disposed so that the output corresponds to an accelerator opening Acc which is an operation amount of an accelerator (not illustrated). The open-close sensor 41t is disposed so that the output corresponds to an open-close state of a door of the vehicle V or of a hood of the vehicle V (not illustrated).

A voltage sensor 41v and an electric current sensor 41x are electrically connected to the high voltage battery 35. The voltage sensor 41v is disposed so that the output corresponds to a voltage Vb between the terminals of the high voltage battery 35. The electric current sensor 41x is disposed so that the output corresponds to charge and discharging currents Ib of the high voltage battery 35.

A start switch 42, which may also be called as an ignition switch, is provided in the vehicle V. The start switch 42 is a switch operated for a switch ON and a switch OFF of the vehicle V (i.e., a hybrid system), and is disposed near the driver's seat.

An engine ECU 51 and a hybrid ECU 52 are provided in the vehicle V. The engine ECU 51 and the hybrid ECU 52 are basically comprised of a microcomputer that has, as well-known, CPU, ROM, RAM, etc., respectively, and perform various controls about an operation of the vehicle V by executing various kinds of control programs memorized in the ROM.

Specifically, the engine ECU 51 is electrically connected to the above-mentioned sensors, except for the voltage sensor 41v and the electric current sensor 41x. The hybrid ECU 52 is electrically connected to the voltage sensor 41v, the electric current sensor 41x, and to the start switch 42. The engine ECU 51 and the hybrid ECU 52 are electrically connected with each other for an exchange of signals.

The engine ECU 51 receives, as an input signal, a signal outputted from the above-mentioned sensors and the hybrid ECU 52 which are electrically connected thereto (i.e., to the ECU 51), and controls a drive of each part (i.e., the injector 13, igniter 16, etc.) of the engine 10 based on such input signal. The hybrid ECU 52 receives an output signal of the above-mentioned sensors, except for the voltage sensor 41v and the electric current sensor 41x, via the engine ECU 51, and (directly) receives an output signal outputted from the voltage sensor 41v and the electric current sensor 41x, and, based on those received signals, performs an operation control of the motor 28, an operation control of the inverter 34, a charge and discharge control of the high voltage battery 35, etc.

Further, the engine ECU 51 and the hybrid ECU 52 perform, in cooperation with each other (i.e., through an exchange of a control signal, data, etc.), various controls such as a travel mode control, a temporal stop/restart control of the engine 10 etc. regarding the vehicle V (i.e., a hybrid system). That is, the vehicle V is provided with a temporal stop function of the engine 10 in a hybrid system (i.e., a function that temporarily stops the engine 10 when a prescribed condition is satisfied).

<System Configuration of a Vehicle Diagnosis System of the Fourth Embodiment>

Figure 26:
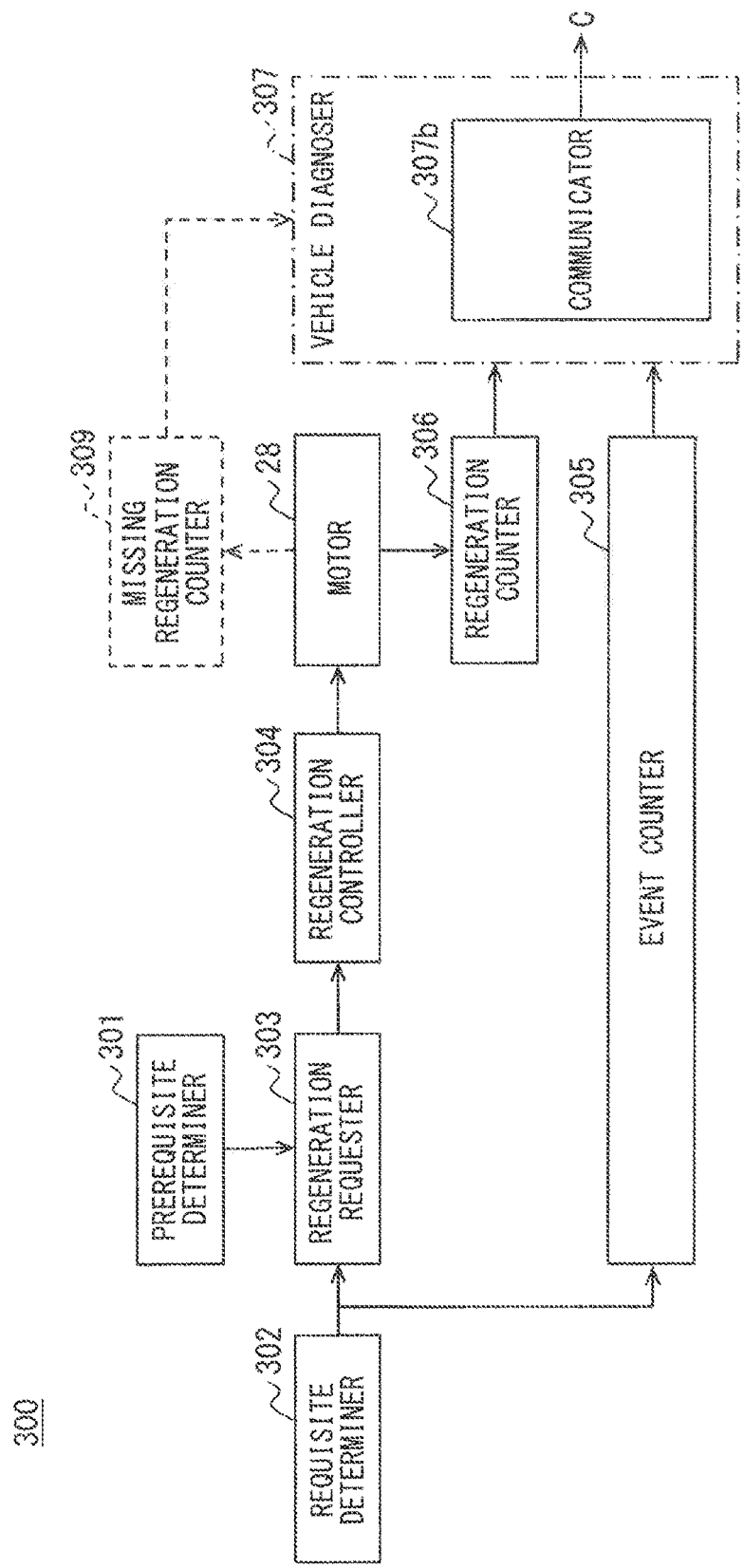
FIG. 26 is a functional block diagram of a vehicle diagnosis system of the vehicle in FIG. 1 and an external device in the present disclosure.

With reference to FIG. 26, a vehicle diagnosis system 300 is described in terms of how it performs a process about diagnosis of the vehicle V of FIG. 1. Specifically, such a vehicle diagnosis system 300 has a prerequisite determiner 301, a requisite determiner 302, a regeneration requester 303, a regeneration controller 304, an event counter 305, a regeneration counter 306, and a vehicle diagnoser 307.

The prerequisite determiner 301 equivalent to a "prerequisite determiner" of the present disclosure is provided so that formation, or a satisfaction, of the prerequisite for performing a power regeneration may be determined. Such a "prerequisite" is a condition, or a state of the vehicle V, that should normally, i.e., when having no abnormality/failure, be satisfied after a preset time from a start of a travel of the vehicle V, which may be at least one of the followings.

(1) A travel speed ve of the vehicle V reaching to a preset value ve0 (i.e., ve0: a preset value) at least one time during a current trip of the vehicle V, (2) A specific component (e.g., the high voltage battery 35, etc.) not in a failure condition.

In the present embodiment, a "trip" indicates a period between two switch-ON timings of the start switch 42, i.e., a period of time from one OFF-to-ON switch of the start switch 42 to the next one.

The requisite determiner 302 equivalent to a "requisite determiner" or an "operation condition determiner" of the present disclosure is provided so that formation, or a satisfaction, of an operation condition (i.e., requisite, or a condition, for performing a power regeneration which is different from the above-mentioned prerequisite) may be determined.

The "operation condition" is a state of drive operation of the vehicle V for performing the power regeneration, based on an assumption that the "prerequisite" is (already) satisfied, which may be at least one of the followings.

(i) Brake ON (i.e., the amount of brake pedal operation is equal to or greater than a predetermined quantity), (ii) Accelerator-OFF [Acc<Acc0 (i.e., Acc0: a preset value)], (iii) Transmission 26 is in a connected state (i.e., the transmission 26 connects the motor 28 and the output shaft 29 in a driver power transferable manner), (iv) ve≥ve0 (i.e., ve0: a preset value),
(v) Fuel injection OFF, and
(vi) Drive power not in being output from the motor 28.

In the present embodiment, the requisite determiner 102 determines that "the requisite is satisfied" when all of the conditions (i)-(vi) mentioned above are satisfied.

The regeneration requester 303 is configured to generate a power regeneration request (i.e., a signal for performing the power regeneration), when satisfaction of the prerequisite is determined by the prerequisite determiner 301 and satisfaction of the operation condition (i.e., requisite) is determined by the requisite determiner 302. Based on a reception state of the power regeneration request from the regeneration requester 303, the regeneration controller 304 is configured to control a power regeneration state of the motor 28.

The event counter 305 is equivalent to an "event counter" of the present disclosure is provided so that an event count value Creq may be obtained. In the present embodiment, an "event count value Creq" is a counted value about the frequency of, i.e., the number or quantity of, "expected events." The "expected event" is an event in which satisfaction of the operation condition (i.e., requisite) is determined by the requisite determiner 302 in a prerequisite satisfaction expected state, i.e., in which satisfaction of the prerequisite is expected.

In the present embodiment, the "prerequisite satisfaction expected state" which is the condition for obtainment of the event count value Creq shall mean a condition that the above-described condition (1) is satisfied.

The regeneration counter 306 is equivalent to an "operation counter" of the present disclosure is provided so that an operation count value Cgen may be obtained. Here, in the present embodiment, the "operation count value Cgen" is a counted value about the frequency, or the number or quantity of, operations for performing the power regeneration (i.e., more practically, the number of power regeneration control operations performed by the regeneration controller 304). As clarified based on the above description, the system 300 in the present embodiment includes, the prerequisite determiner 301, the requisite determiner 302, the regeneration requester 303, the regeneration controller 304, the event counter 305, and the regeneration counter 106 are provided in the hybrid ECU 52.

The vehicle diagnoser 307 is configured to send the event count value Creq obtained by the event counter 305 and the operation count value Cgen obtained by the regeneration counter 306 to the external device C from the vehicle V (refer to FIG. 1). Specifically, the vehicle diagnoser 307 is provided with a communicator 307b.

The communicator 307b, which is provided in the hybrid ECU 52, sends the newest/latest value of the event count value Creq obtained by the event counter 305 and the newest value of operation count value Cgen obtained by the regeneration counter 306 to the external device C according to a request from the external device C, or the like. These newest values sent to the external device C by the communicator 307b may be memorized by the event counter 305, or by the regeneration counter 306, or may also be memorized by a memory provided in the vehicle diagnoser 307.

In the present embodiment, the event counter 305 obtains the event count value Creq by counting the number of trips in which the expected event happened. Further, the regeneration counter 306 obtains the operation count value Cgen by counting the number of trips in which an operation for performing the power regeneration happened.

<Operation of the Vehicle Diagnosis System in the Fourth Embodiment>

The operation and effect of the configuration of the present embodiment is described in the following.

The engine ECU 51 and the hybrid ECU 52 control an operation of each part of the vehicle V (i.e., a hybrid system) based on the various states etc. of the vehicle V grasped by the output signal of the above-mentioned multiple sensors, exchanging various signals among the two (ECUs). Specifically, the hybrid ECU 52 obtains the various states of the vehicle V, etc., based on the input signals from the voltage sensor 41v, the electric current sensor 41x, the start switch 42 etc., and also based on the signal inputted by the signal exchange with the engine ECU 51, etc., for example. Then, the hybrid ECU 52 sets up a travel mode (i.e., including a temporal stop/restart of the engine 10) of the vehicle V, taking the fuel mileage of the engine 10 into consideration and based on the various states etc. of the vehicle V.

The engine ECU 51 performs a drive control of the engine 10 according to the travel mode set up (i.e., determined) by the hybrid ECU 52. That is, for example, the engine ECU 51 performs various controls (i.e., a fuel injection control including a so-called fuel cut, an ignition control, etc.) of the engine 10 during a drive period of the engine 10 based on the drive state or the like of the vehicle V. The hybrid ECU 52 calculates a remaining amount of charge (SOC) of the high voltage battery 35 based on the charge and discharging currents detected by the electric current sensor 41x. Further, the hybrid ECU 52 controls the drive of the motor 28, the inverter 34 etc. based on the drive state of the vehicle V, a remaining amount of charge of the high voltage battery 35, or the like.

Hereafter, a power regeneration control is described in more details. As mentioned above, in such a control, whether the prerequisite for performing a power regeneration is satisfied is determined by the prerequisite determiner 301. Further, whether the above-mentioned operation condition (i.e., requisite) is satisfied is determined by the requisite determiner 302. When satisfaction of the prerequisite is determined by the prerequisite determiner 301 and satisfaction of the operation condition (i.e., requisite) is determined by the requisite determiner 302, a power regeneration request is issued by the regeneration requester 303. If such a power regeneration request is issued, the regeneration controller 304 controls a power regeneration state of the motor 28. In such manner, the motor 28 outputs a regenerated electric power under control of the regeneration controller 304.

Here, in a normal operation, i.e., having no abnormality/failure, the prerequisite satisfied determination by the prerequisite determiner 301 should be established after a predetermined time from a start of the travel of the vehicle V, as mentioned above. Therefore, if the above-mentioned operation condition (i.e., requisite) is satisfied after a predetermined time from a start of the travel of the vehicle V, the kinetic energy of the vehicle should be collected as an electric power/energy by the power regeneration at the time of deceleration of the vehicle V, thereby achieving the greenhouse gas reduction effect.

However, a following scenario may have to be considered. That is, the power regeneration may be not performed due to unknown abnormality/failure, even when the above-described operation condition is satisfied in a prerequisite satisfied state. In such a case, the greenhouse gas reduction effect is reduced or is not preferably achieved.

Driving the vehicle V continued for a long time in such a state, i.e., in a power regeneration function disabled state, is problematic from a viewpoint of the environmental impact. Therefore, when such an abnormality (i.e., failure) is caused, the driver (of the vehicle V) should be prompted to fix the vehicle as soon as possible.

Thus, the event counter 305 counts the number of occurrences of the expected event (i.e., more practically, the number of trips in which the expected event happened), and obtains the event count value Creq. Specifically, the event counter 305 increments, i.e., counts up by only one count, the event count value Creq, when an expected event occurs even once in the current trip.

Further, the regeneration counter 306 obtains the operation count value Cgen, by counting the number of operations for performing the power regeneration (i.e., the number of trips in which the regeneration controller 304 has performed a power regeneration control operation). Specifically, the regeneration counter 306 increments, i.e., counts up only one count, the operation count value Cgen, when the above-mentioned operation occurs even once in the current trip. The event count value Creq and the operation count value Cgen are outputted to the external device C.

Thus, in the present embodiment, information about whether "the abnormality of a power regeneration function in a mode by which a greenhouse gas reduction effect is reduced/cancelled" is caused is sent to the external device C side from the vehicle V via the communicator 307b. Therefore, according to the present embodiment, the vehicle diagnosis system 300 enables a manufacturer, a seller, a maintenance personnel or the like of the vehicle V to quickly and appropriately obtain a state of abnormality (i.e., failure) of the vehicle V which leads to an increase of the greenhouse gas emitted from the vehicle V in a market.

<System Configuration of a Vehicle Diagnosis System of the Fifth Embodiment>

Another example (i.e., a different embodiment) of the configuration concerning the present disclosure is described in the following. The example(s) in the following share the same/like numbers for the same/like parts, for the brevity of the description. Further, the same/like parts, unless otherwise described, or unless any technical difficulty affects, operate in the same manner and achieve the same/similar effects as the preceding one.

Figure 27:
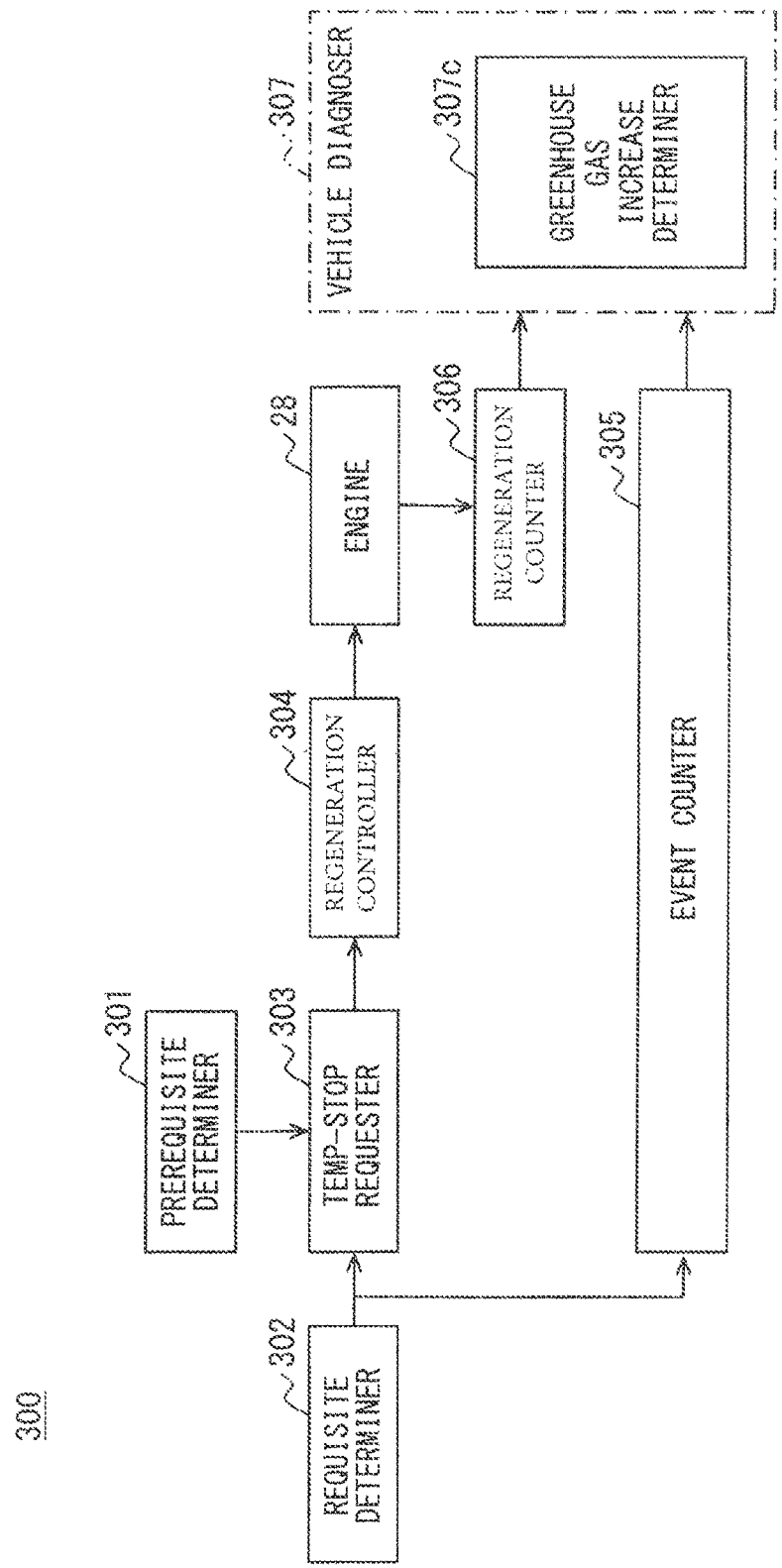
FIG. 27 is a functional block diagram of the vehicle diagnosis system of the vehicle in FIG. 1 and the external device in the present disclosure.

With reference to FIG. 27, the vehicle diagnosis system 300 in the fifth embodiment of the present disclosure is understood as being configured to perform a diagnosis of the vehicle V (see also FIG. 1). Specifically, such vehicle diagnosis system 300 has the prerequisite determiner 301, the requisite determiner 302, the temp-stop requester 303, the regeneration controller 304, the event counter 305, the regeneration counter 306, and the vehicle diagnoser 307.

In the present embodiment, the prerequisite determiner 301, the requisite determiner 302, the temp-stop requester 303, the regeneration controller 304, the event counter 305, and the regeneration counter 306 are the same as those of the above-mentioned fourth embodiment.

In the present embodiment, the vehicle diagnoser 307 is provided with a greenhouse gas increase determiner 307c. Such a greenhouse gas increase determiner 307c is configured to detect/determine, based on the newest value (i.e., a value received from the communicator 307b) of the event count value Creq and the operation count value Cgen, whether "the abnormality of a power regeneration function in a mode by which a greenhouse gas reduction effect is reduced/cancelled" is caused. In the following, such determination is designated as "a greenhouse gas increase determination."

<Operation of the Vehicle Diagnosis System in the Fifth Embodiment>

The operation and effect in the configuration of the present embodiment are described in the following. In flowcharts in FIG. 28 and other drawings, a "step" is written as "S" that is prefixed to a step number.

As described above, the satisfaction determination by the prerequisite determiner 301 whether the prerequisite has been satisfied is, in a normal operation, i.e., having no abnormality/failure, is established after a predetermined time from a start of travel of the vehicle V. Therefore, when the prerequisite is satisfied after a predetermined time from a start of travel of the vehicle V, the power regeneration is (i.e., should be) performed at a vehicle deceleration time and the greenhouse gas reduction effect should be achieved/exerted by collecting a kinetic energy of the vehicle V as an electric energy.

However, a following scenario may also be considered. That is, the power regeneration may be not performed, or may be hindered due to some/unknown abnormality/failure even when the requisite is satisfied, although the prerequisite has already been satisfied. Therefore, such an abnormality results in cancelling the greenhouse gas reduction effect of the power regeneration (i.e., the reduction effect will not be fully/preferably achieved).

That is, when the prerequisite has already been satisfied, the power regeneration should automatically start when the requisite is satisfied, and when the power regeneration does not automatically start in a "requisite satisfied state," that is an abnormality of the regeneration function due to some/unknown failure, and which cancels the greenhouse gas reduction effect.

Driving the vehicle V continued for a long time in such a state, i.e., a regeneration function disabled state, is problematic from a viewpoint of an environmental impact. Therefore, when such an abnormality (i.e., failure) is caused, the driver (of the vehicle V) should be prompted to fix the vehicle V as soon as possible. Thus, in the present embodiment, the vehicle diagnose 307 (i.e., the greenhouse gas increase determiner 307c) performs the greenhouse gas increase determination based on a counted value of the power regeneration operations (Cgen) and a counted value of occurrences of the regeneration-expected state of the vehicle V.

That is, the event counter 305 counts a value regarding the number of occurrences of an expected event (i.e., the number of trips in which the expected event had happened, more specifically), and obtains the event count value Creq. Specifically, the event counter 305 increments, or counts up, by only one count, the event count value Creq when an expected event occurs even once in the current trip.

Further, the regeneration counter 306 obtains the operation count value Cgen, by counting a value regarding the number of power regeneration operations (i.e., the number of trips in which the regeneration controller 304 has performed a power regeneration operation). Specifically, the regeneration counter 306 increments, i.e., counts up only one count, the operation count value Cgen, when the above-mentioned operation occurs even once in the current trip. Then, the greenhouse gas increase determiner 307c performs the greenhouse gas increase determination, based on the newest/latest value of the event count value Creq and the newest/latest value of the operation count value Cgen.

Figure 28:
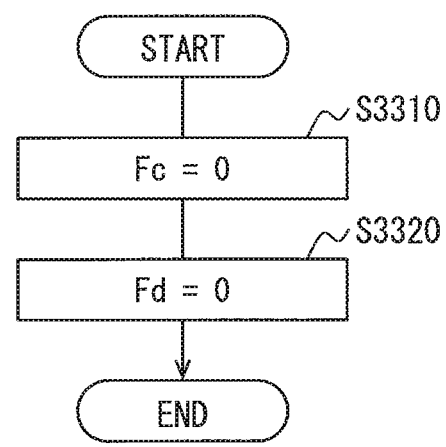
FIG. 28 is a flowchart of an operation of the vehicle diagnosis system in FIG. 27.
Figure 29:
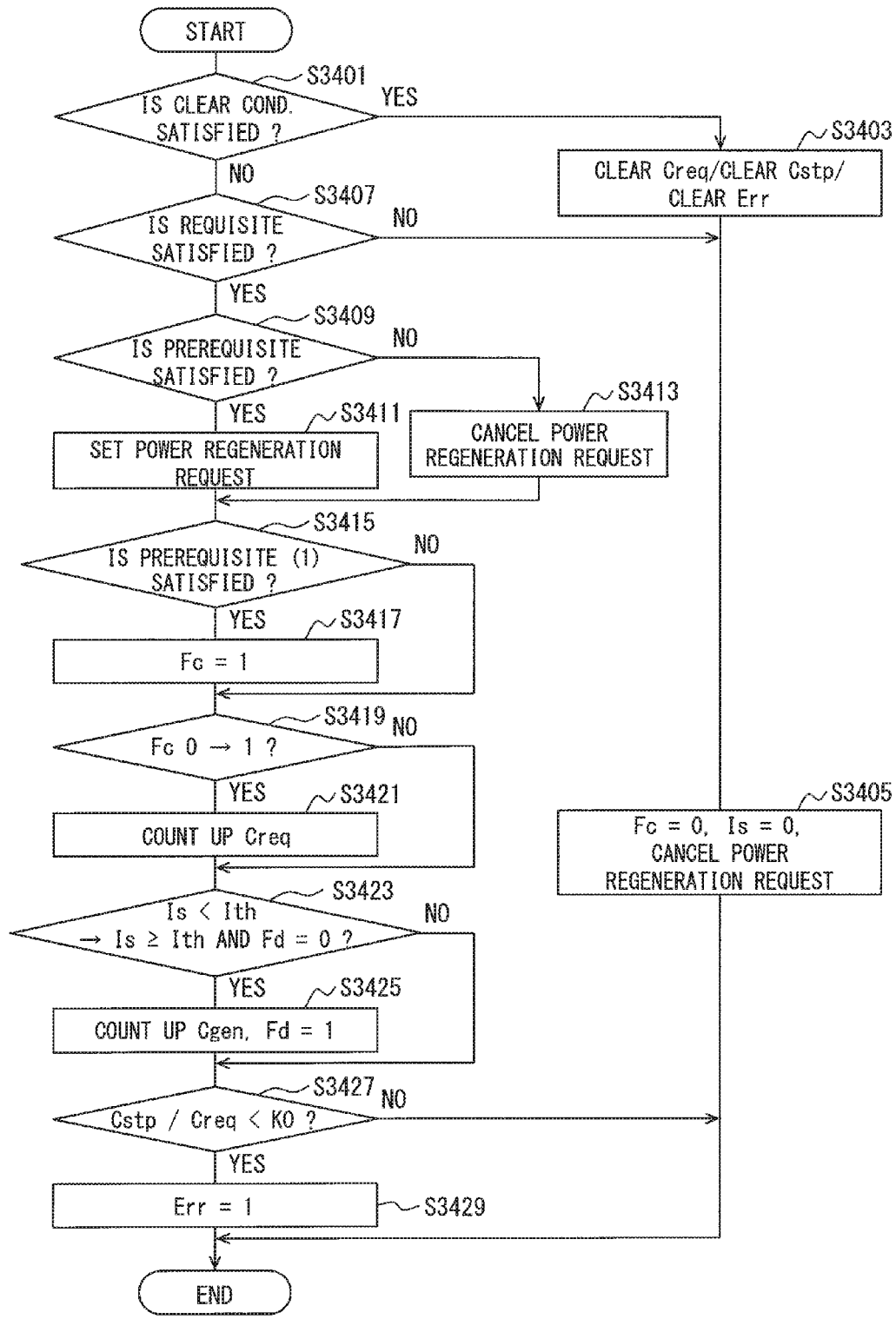
FIG. 29 is a flowchart of an operation of the vehicle diagnosis system in FIG. 27.
Figure 30:
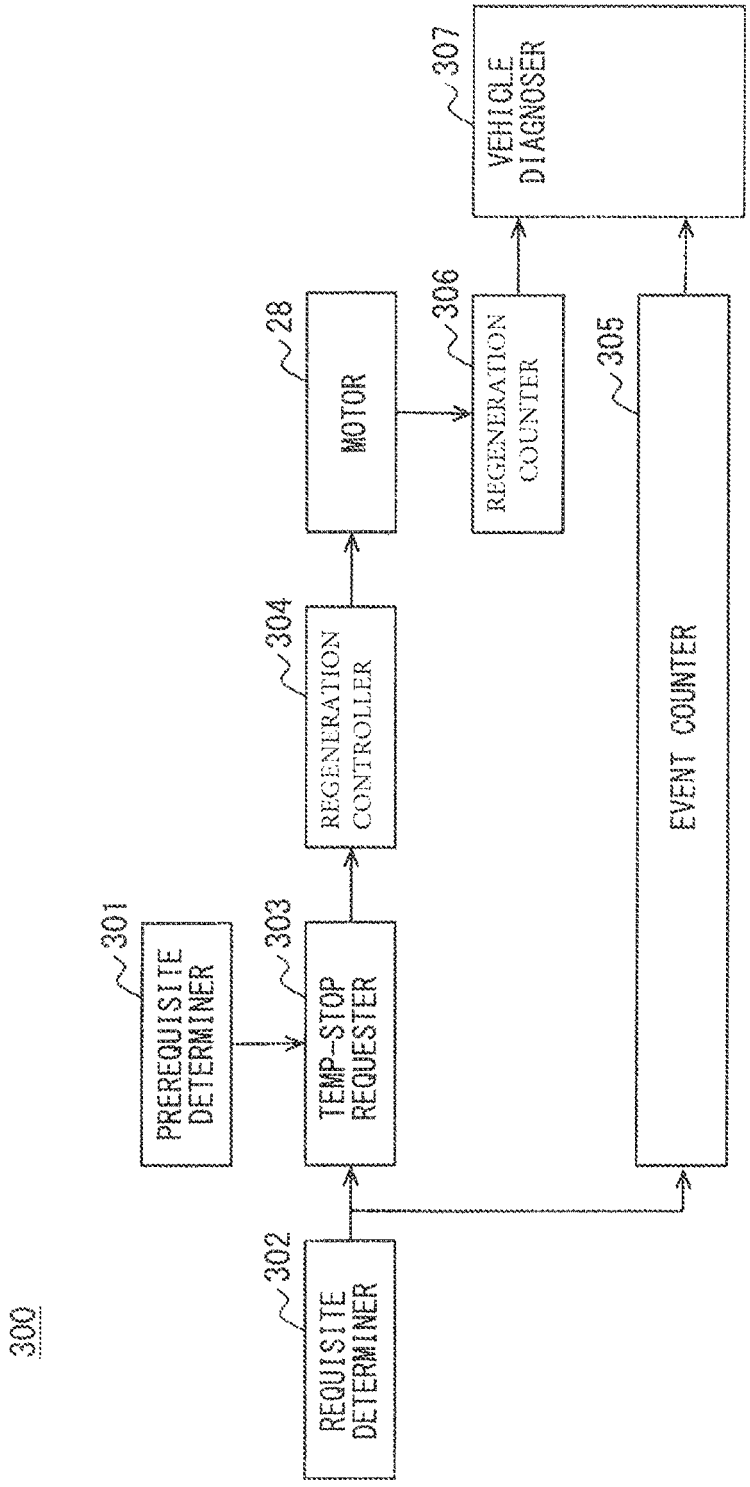
FIG. 30 is a functional block diagram of the vehicle diagnosis system of the vehicle in FIGS. 26 and 27 in a modification example.

Hereafter, one example of the above-mentioned operation is described in flowcharts shown in FIGS. 29 and 30. An initialization routine shown in FIG. 28 is started by a main CPU in the hybrid ECU 52 immediately after a start of the hybrid system by the start switch 42. After the start of this routine, in Step 3310, the routine resets a count request flag Fc first (Fc=0). Next, an already-counted flag Fd is reset in Step 3320 (Fd=0). Then, such routine is finished.

The procedure shown in FIG. 29 is performed at predetermined intervals after a start of the hybrid system by the start switch 42. When such a procedure (i.e., a series of processes) is started, whether predetermined clear conditions (e.g., input of a clear command from the external device C, etc.) are satisfied is determined in Step 3401. If the clear conditions are satisfied (Step 3401=YES), after the proceeding to Steps 3403 and 3405, such procedure will once be finished. On the other hand, if clear conditions are not satisfied (Step 3401=NO), the process proceeds to Step 3407.

In Step 3403, memory values of the event count value Creq and the operation count value Cgen are cleared (i.e., reset of the values: Creq=0 and Cgen=0). Further, a greenhouse gas increase determination flag Err is cleared (i.e., Err=0). That is, greenhouse gas increase determination conditions in the greenhouse gas increase determiner 307c are reset.

In Step 3405, the count request flag Fc is reset (i.e., Fc=0), and an accumulated value Is of an electric current flowing to the high-voltage battery 35 (i.e., a battery flow-in current accumulated value Is) is cleared (i.e., Is=0). Further, in Step 3405, the power regeneration request is canceled.

In Step 3407, whether the operation condition (i.e., requisite) is satisfied is determined. When the operation condition (i.e., requisite) is not satisfied (Step 3407=NO), after the process proceeds to above-mentioned Step 3405, such procedure is once finished. On the other hand, when the operation condition (i.e., requisite) is satisfied (Step 3407=YES), the process proceeds to Step 409.

In Step 3409, whether the prerequisite is satisfied or not is determined. More practically, whether both of the conditions (1) and (2) are satisfied is determined.

When the prerequisite is satisfied (Step 3409=YES), the process proceeds to Step 3411 and a power regeneration request is set. On the other hand, when the prerequisite is not satisfied (Step 3409=NO), the process proceeds to Step 3413 and a power regeneration request is canceled. Thus, after the process of Step 3411 or the process of 3413 is performed according to the determination result of Step 3409, the process proceeds to Step 3415.

In Step 3415, whether, among the two prerequisites (1) and (2), the prerequisite "(1) a travel speed ve of the vehicle V reaching to a preset value ve0 (i.e., ve0: a preset value) at least one time during a current trip of the vehicle V" is satisfied is determined. The determination process in Step 3415 is a determination of the "expected event," that is, "the prerequisite satisfaction expected state." When the prerequisite (1) is satisfied (Step 3415=YES), the process proceeds to Step 3417, and the count request flag Fc is set (i.e., Fc=1), and the process proceeds to Step 3419 thereafter. On the other hand, when it is determined that the predetermined time has not passed after the start (Step 3415=NO), the process of Step 3417 is skipped and the process proceeds to Step 3419 thereafter.

In Step 3419, whether the count request flag Fc is changed to the set state from the reset state by a current execution of the procedure is determined.

When the count request flag Fc has been changed to the set state from the reset state by the current execution of the procedure (Step 3419=YES), after proceeding to Step 3421 and the event count value Creq is counted up (i.e., incremented), the process proceeds to Step 3423. On the other hand, when the determination of Step 3419 is "NO", the process of Step 3421 is skipped and the process proceeds to Step 3423 thereafter.

In Step 3423, a determination using the battery flow-in current accumulated value Is and a preset threshold value Ith is performed. Such determination is a determination of whether an "edge" which indicates that a state Is<Ith is changed to another state Is≥Ith is detected. Further, in Step 3423, whether the already-counted flag Fd is in a reset state (i.e., Fd=0) is also determined.

When both of the above are affirmed (Step 3423=YES), after proceeding to Step 3425, the process proceeds to Step 3427.

In Step 3425, while the operation count value Cgen is counted up (i.e., incremented), the already-counted flag Fd is set (Fd=1). On the other hand, when at least one of the two is negatively determined (Step 3423=NO), the process of Step 3425 is skipped and the process proceeds to Step 3427.

In Steps 3427 and 3429, the greenhouse gas increase determination is performed based on the event count value Creq and the operation count value Cgen. Specifically, it is first determined in Step 3427 whether the value (i.e., a ratio) which is derived by dividing the operation count value Cgen by the event count value Creq is smaller than a predetermined threshold value K0. Then, after the process of Step 3429 is performed according to the determined result in Step 3427, the procedure is once finished.

When the value of Cgen divided by Creq is smaller than the threshold value K0 (Step 3627=YES), whether the abnormality about the power regeneration function in the mode by which a greenhouse gas reduction effect is reduced is caused is determined. Therefore, the process proceeds to Step 3429 in such case, and the greenhouse gas increase determination flag Err is set (Err=1).

On the other hand, when the value of Cgen divided by Creq is greater than the threshold value K0 (Step 3427=NO), the process of Step 3429 is skipped.

Thus, in the present embodiment, whether the abnormality about the power regeneration function in the mode by which a greenhouse gas reduction effect is reduced is caused is determined based on the operation count value Cgen and the event count value Creq. A determination of occurrence of such an abnormality may enable a quick fix of the abnormality as soon as possible by notifying a driver etc. about such an abnormality. Therefore, according to the present embodiment, the system 300 reduces, as much as possible, the environmental impact caused by the vehicle V having the engine 10.

Modification

Hereafter, representative modifications are described and exemplified.

In the description of modifications, the same/like numbers for the same/like parts are shared with the preceding embodiments, for the brevity of the description. Further, the same/like parts, unless otherwise described, or unless any technical difficulty prevents such combination, operate in the same manner and achieve the same/similar effects as the preceding embodiments.

Further, even though it should be understood without mentioning it, the modifications of the present disclosure are not limited to the following examples, but a combination between two or more modifications and/or embodiments, in part or in entirety, should also be allowed unless otherwise described, or unless any technical difficulty prevents such combination.

The present disclosure is not limited to the configuration of each of the embodiments mentioned above.

For example, the present disclosure is not limited to a hybrid vehicle which is mentioned above. That is, the present disclosure is widely applicable to various vehicles as long as regenerative power generation is enabled therein. Such vehicles may be, for example, an electric vehicle and a vehicle that has, as a source of its thrust power, an internal combustion engine only. Further, a vehicle using the motor 28 for power regeneration, instead of using the alternator 36 or instead of using the motor 28 in combination with the alternator 36, may also be a target of the present disclosure.

The prerequisite may also be the following conditions, which should normally be substantially satisfied after a preset time from the start of travel of the vehicle V (i.e., a preset state of the vehicle V).

(1) A travel speed ve of the vehicle V reaching to a preset value ve0 (i.e., ve0: a preset value) at least one time during a current trip of the vehicle V, (2) A specific component (e.g., the high voltage battery 35, etc.) not in a failure condition.

In addition to the above two, a following condition may be added. Specifically, (3) An SOC (State Of Charge) of the high-voltage battery 35 is in an estimable state.

Such a condition may be added.

The contents of the above-described condition (3) "an SOC (State Of Charge) of the high-voltage battery 35 is in an estimable state" may more practically be a condition that the high-voltage battery 35 has experienced a full charge state (i.e., a charging current<a preset threshold). That is, as is well known, the SOC is estimable, based on "a relationship between the charging current and SOC."

Now, when SOC is low, "the relation between the charging current and SOC" may vary drastically under the influence of the temperature etc., which does not enables an accurate estimation of SOC. Therefore, a standard procedure of estimating SOC is that, (i) a battery is once brought to a full charge state, and (ii) an SOC estimation value of such a full charge state is obtained, and (iii) such an SOC estimation value is updated according to the charging and discharging currents of the high voltage battery 35.

The prerequisite determiner 302 determines that "the prerequisite is satisfied based on the satisfaction of all of the above-described six conditions. The satisfaction of six conditions may further be changed to the satisfaction of two additional conditions (i.e., a total of eight conditions). Specifically, a condition (vii) a steep deceleration is requested (i.e., requested deceleration dc>dc0), and a condition (viii) SOC, or a remaining charge amount is low (i.e., SOC<SOC0 [SOC0: a preset value]) may be added.

The engine ECU 51 and the hybrid ECU 52 may have one body configuration. Further, in each of the various configurations of the above-mentioned embodiments, a parameter obtained by using a certain sensor may be replaced with other parameters derived from outputs of other sensors, or on-board estimation values derived from outputs of other sensors. More practically, a brake oil pressure Pbr may be replaceable with a negative pressure, for example.

The greenhouse gas increase determiner 307c may be disposed on a vehicle V side, or may be disposed on the external device C, or may be disposed in a server etc. which is connected to the external device C by the wired channel or the wireless channel so that the information obtained from the external device C is appropriately processed.

The present disclosure is not limited to the example of each of the above-mentioned embodiments in terms of the operation thereof.

For example, the parameter used for the determination of the prerequisite in the prerequisite determiner 301 may be selected from among the above-mentioned items, and may be additionally employed from the items other than the above. For example, as the "prerequisite," other conditions that should normally be satisfied after a preset time from the start of the hybrid system or the engine 10 (i.e., a state of the vehicle V) may also be used. The above-mentioned condition (1) may be omissible. Further, the process of Step 3415 may be omissible (i.e., the same omission applicable to Step 3615 described below). The parameter for the determination of the operation condition by the requisite determiner 302 may also be, just like the above, selectable from among the above-mentioned items, and other parameters other than the above may be additionally employable.

In the above embodiments, as the number of operations occurred to perform the power regeneration, the number of operations for performing the power regeneration by the regeneration controller 304 is counted. However, other configuration may also be usable. That is, for example, the number of occasions of having an over-threshold regenerated electric power (i.e., an actual number of regeneration operations) may be counted as such number, or the number of the power regeneration requests may be counted as such number. Specifically, the regeneration counter 306 may count the number of issued power regeneration requests issued by the regeneration requester 303 as the operation count value Cgen. Alternatively, the regeneration counter 306 may count the number of occasions of having the over-threshold regenerated electric power (i.e., an actual number of regeneration operations) as the operation count value Cgen.

In the above-mentioned embodiments, even if the number of times by which the expected event occurred in one trip is greater than one, the event count value Creq is counted up only by one (i.e., incremented). Similarly, even if the number of times by which the power regeneration operations occurred in one trip is greater than one, the operation count value Cgen is counted up only by one (i.e., incremented). However, the present disclosure is not limited to such mode.

FIG. 30 shows such a modification regarding the counting of the expected events. Specifically, a vehicle diagnosis system 300 in FIG. 301 has the prerequisite determiner 301, the requisite determiner 302, the regeneration requester 303, the regeneration controller 304, the event counter 305, the regeneration counter 306, and the vehicle diagnoser 307. The prerequisite determiner 301, the requisite determiner 302, the regeneration requester 303, and the regeneration controller 304 are the same as the ones in the above-mentioned embodiment.

In the present modification, the event counter 305 obtains the event count value Creq by counting every event, i.e., whenever the expected event happens. Further, the regeneration counter 306 counts every operation for performing the power regeneration as the operation count value Cgen.

The vehicle diagnoser 307 performs a greenhouse gas increase determination based on the event count value Creq obtained by the event counter 305 and the operation count value Cgen obtained by the regeneration counter 306. In other words, the vehicle diagnose 307 is equipped with, just like the fifth embodiment, a greenhouse gas increase detector (i.e., the greenhouse gas increase determiner 307c in FIG. 28).

Figure 31:
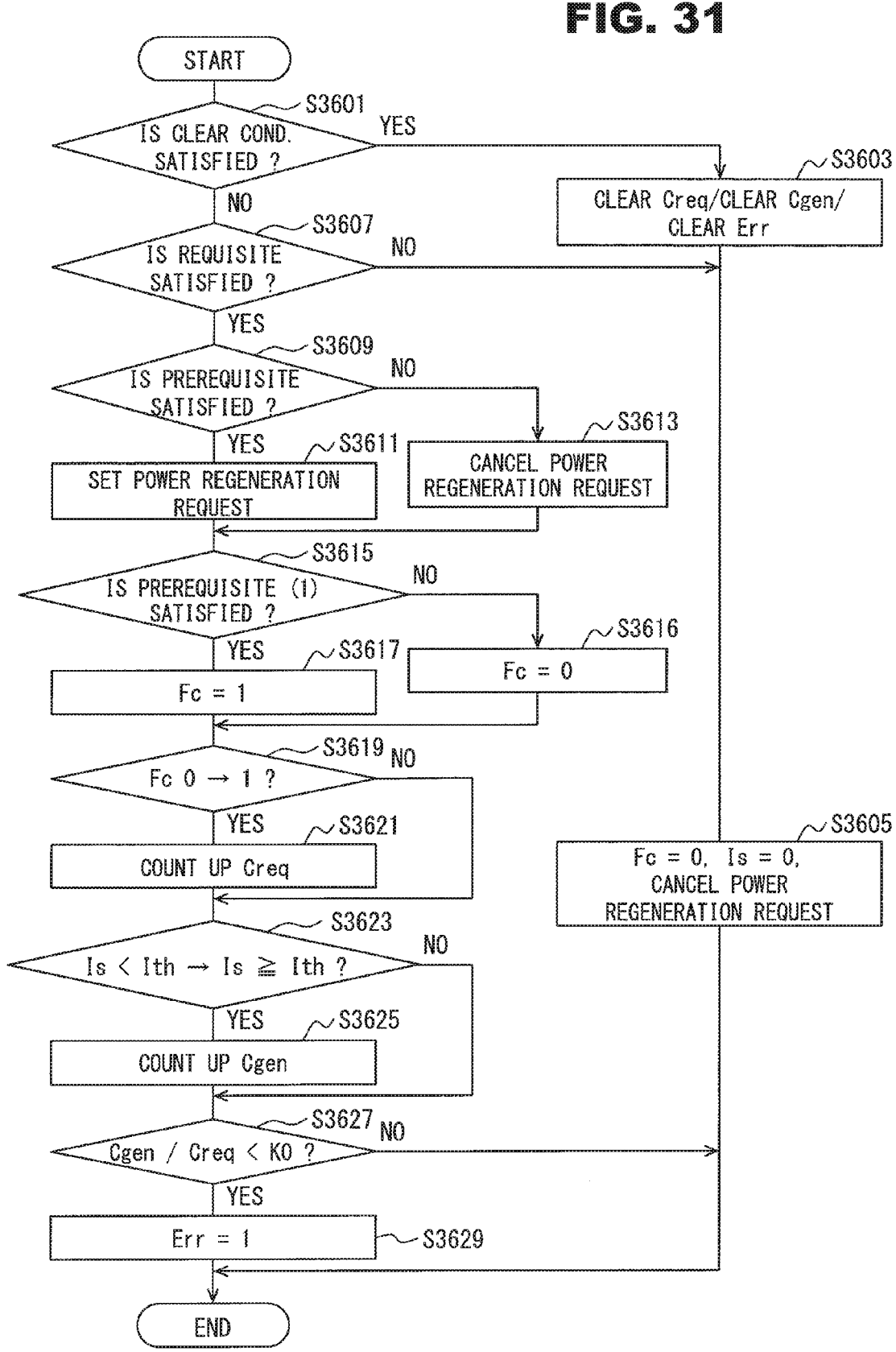
FIG. 31 is a flowchart of an operation of the vehicle diagnosis system in FIG. 32.

The procedure shown in FIG. 31 is a flowchart of such an operation according to the configuration of the modification. The procedure is performed at predetermined intervals after a start of the hybrid system by the start switch 42. This procedure is substantially the same as the one shown in FIG. 29. However, the initialization routine in FIG. 28 and the counted flag Fd in FIGS. 28 and 29 are not required.

When such a procedure (i.e., a series of processes) is started, whether predetermined clear conditions (e.g., input of a clear command from the external device C, etc.) are satisfied is determined in Step 3601. If the clear conditions are satisfied (Step 3401=YES), after the proceeding to Steps 3603 and 3605, such procedure will once be finished. On the other hand, if clear conditions are not satisfied (Step 3401=NO), the process proceeds to Step 3607 and after.

In Step 3603, memory values of the event count value Creq and the operation count value Cgen are cleared (i.e., reset of the values: Creq=0 and Cgen=0). Further, a greenhouse gas increase determination flag Err is cleared (i.e., Err=0). In Step 3605, the count request flag Fc is reset (i.e., Fc=0), and an accumulated value Is of an electric current flowing to the high-voltage battery 35 (i.e., a battery flow-in current accumulated value Is) is cleared (i.e., Is=0). Further, in Step 3605, the power regeneration request is canceled.

In Step 3607, whether the operation condition (i.e., requisite) is satisfied is determined. When the operation condition (i.e., requisite) is not satisfied (Step 3607=NO), after the process proceeds to above-mentioned Step 3605, such procedure is once finished. On the other hand, when the operation condition (i.e., requisite) is satisfied (Step 3607=YES), the process proceeds to Step 3609 and after.

In Step 3609, whether the prerequisite is satisfied or not is determined. When the prerequisite is satisfied (Step 3609=YES), the process proceeds to Step 3611 and a power regeneration request is set. On the other hand, when the prerequisite is not satisfied (Step 3609=NO), the process proceeds to Step 3613 and a power regeneration request is canceled. Thus, after the process of Step 3411 or the process of 3413 is performed according to the determination result of Step 3609, the process proceeds to Step 3615.

In Step 3615, whether, among the prerequisites, the prerequisite (1) is satisfied is determined. When the prerequisite (1) is satisfied (Step 3615=YES), the process proceeds to Step 3617, and the count request flag Fc is set (i.e., Fc=1), and the process proceeds to Step 3619 thereafter. On the other hand, when it is determined that the prerequisite (1) is not satisfied (Step 3615=NO), the process of Step 3617 is skipped and the process proceeds to Step 3619.

In Step 3619, whether the count request flag Fc is changed to the set state from the reset state by a current execution of the procedure is determined.

When the count request flag Fc has been changed to the set state from the reset state by the current execution of the procedure (Step 3619=YES), after proceeding to Step 3621 and the event count value Creq is counted up (i.e., incremented), the process proceeds to Step 3623. On the other hand, when the determination of Step 3619 is "NO", the process of Step 3621 is skipped and the process proceeds to Step 3623 thereafter.

In Step 3623, a determination using the battery flow-in current accumulated value Is and a preset threshold value Ith is performed with no other determination. Such determination is a determination of whether an "edge" which indicates that a state Is<Ith is changed to another state Is≥Ith is detected. When both of the above are affirmed (Step 3623=YES), after proceeding to Step 3625, the process proceeds to Step 3627. In Step 3625, while the operation count value Cgen is counted up (i.e., incremented). On the other hand, when no "edge" is detected (Step 3623=NO), the process of Step 625 is skipped and the process proceeds to Step 3627.

In Steps 3627 and 3629, the greenhouse gas increase determination is performed based on the event count value Creq and the operation count value Cgen. Specifically, it is first determined in Step 3627 whether the value (i.e., a ratio) which is derived by dividing the operation count value Cgen by the event count value Creq is smaller than a predetermined threshold value K0. Then, after the process of Step 3629 is performed according to the determined result in Step 3627, the procedure is once finished.

When the value of Cgen divided by Creq is smaller than the threshold value K0 (Step 3627=YES), whether the abnormality about the power regeneration function in the mode by which a greenhouse gas reduction effect is reduced is caused is determined. Therefore, the process proceeds to Step 3429 in such case, and the greenhouse gas increase determination flag Err is set (Err=1).

On the other hand, when the value of Cgen divided by Creq is greater than the threshold value K0 (Step 3627=NO), the process of Step 3629 is skipped.

Figure 33:
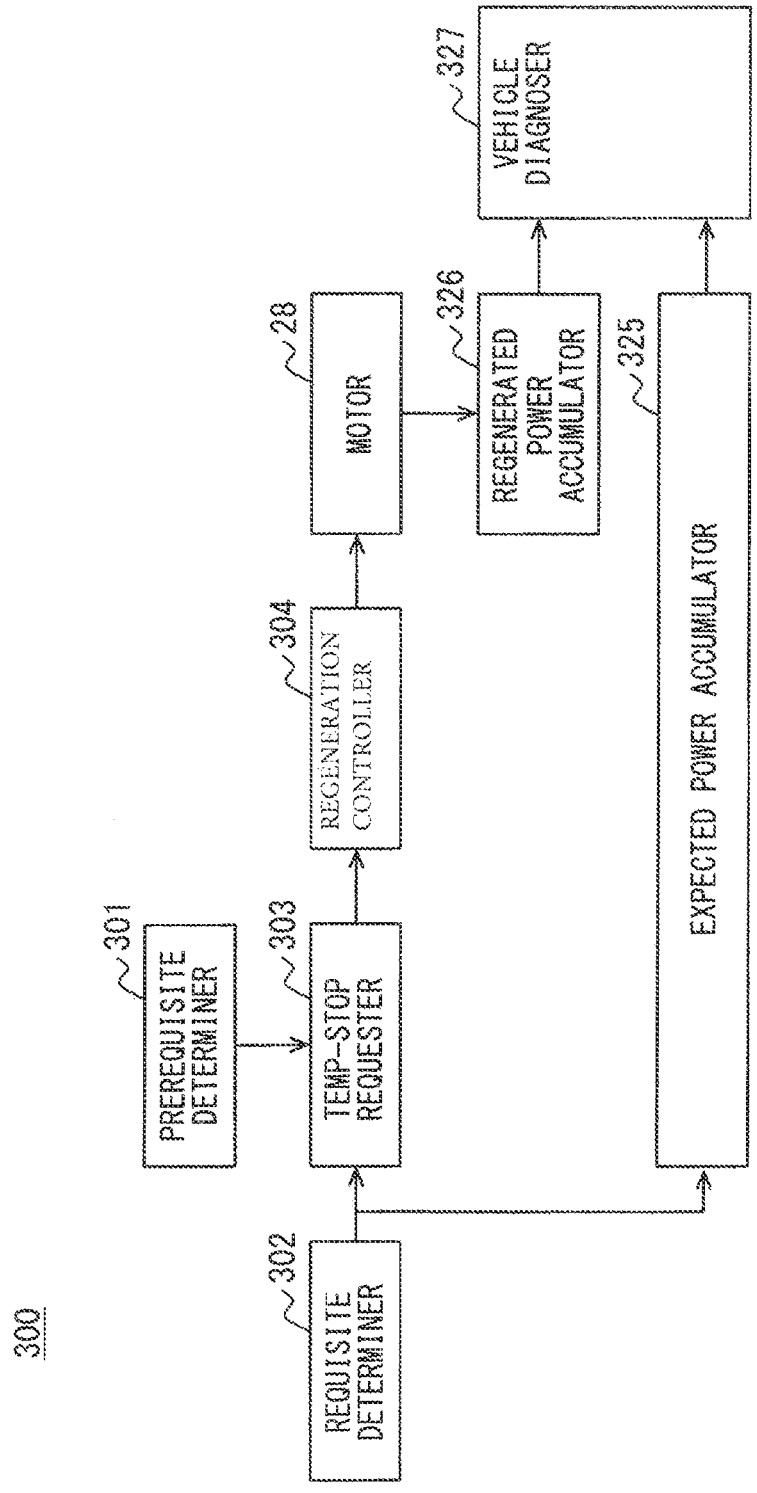
FIG. 33 is a functional block diagram of the vehicle diagnosis system of the vehicle in FIGS. 26 and 27 in yet another modification example.
Figure 34:
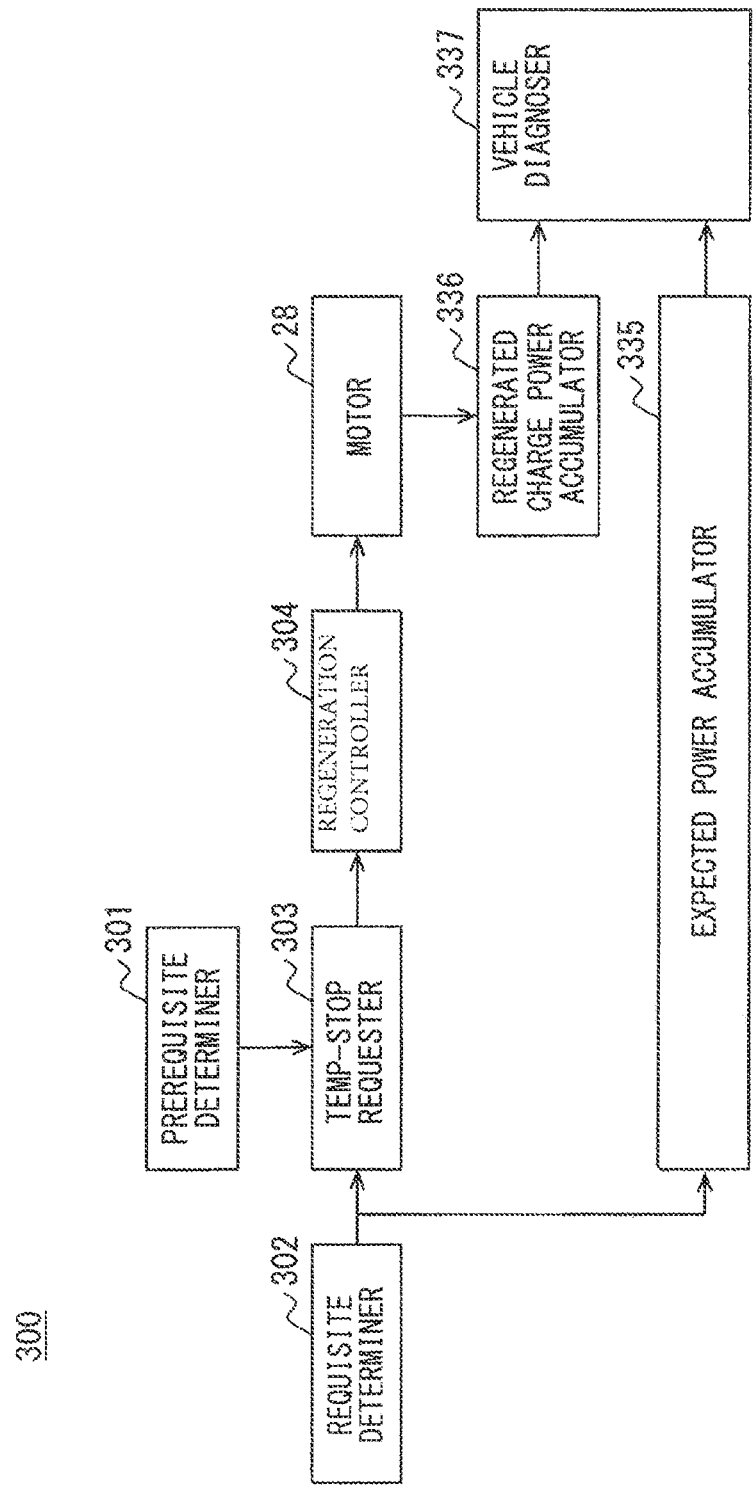
FIG. 34 is a functional block diagram of the vehicle diagnosis system of the vehicle in FIGS. 26 and 27 in still yet another modification example.
Figure 35:
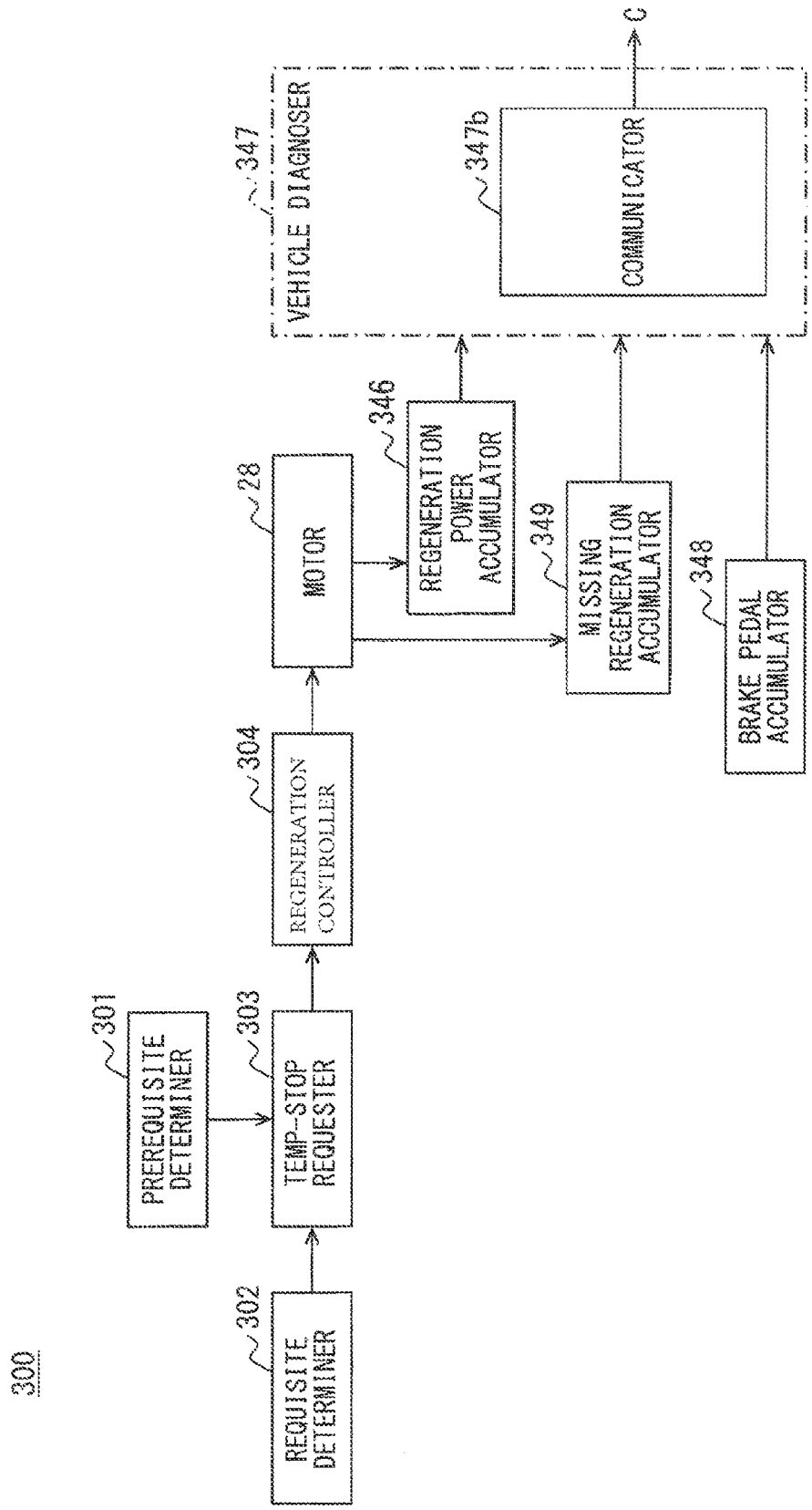
FIG. 35 is a functional block diagram of the vehicle diagnosis system of the vehicle in FIGS. 26 and 27 in still yet another modification example.

Even when the number of operations of power regeneration itself is normal, an expected amount of regenerated electric power may be not obtained if the power regeneration time is too short. Even when the number of operations of power regeneration itself is normal, the amount of regenerated electric power may decrease due to the wear and tear of the motor 28 and/or the alternator. Further, even when the number of operations of power regeneration itself is normal, the wear and tear of the high-voltage battery 35 may cause a capacity deterioration of the battery 35, i.e., an actual amount of storable/chargeable electric power. Therefore, in the above embodiments and modifications, the "number of times" may be replaced with "time" or with "an amount of electric power." The modifications regarding such replacement are shown in FIGS. 33 to 35.

Figure 32:
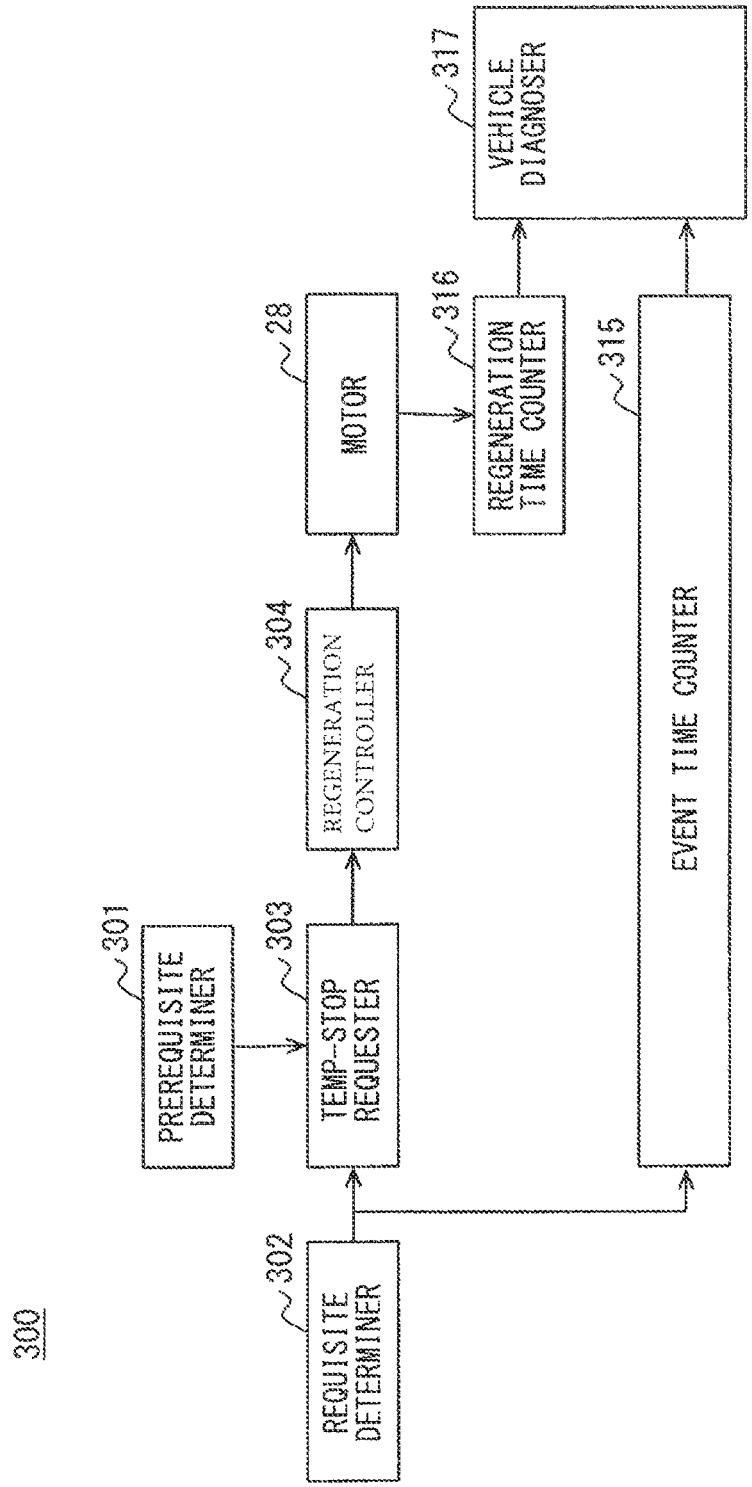
FIG. 32 is a functional block diagram of the vehicle diagnosis system of the vehicle in FIGS. 26 and 27 in another modification example.

In the modification shown in FIG. 32 the vehicle diagnosis system 300 has the prerequisite determiner 301, the requisite determiner 302, the regeneration requester 303, the regeneration controller 304, an event time counter 315, a regeneration time counter 316, and a vehicle diagnoser 317.

The event time counter 315 is configured to obtain an accumulated time of occurrence of the expected event (e.g., an accumulated time of occurrence of the expected events in the current trip) as the event count value Creq.

The regeneration time counter 316 is configured to obtain an accumulated time of occurrence of the power regeneration operations (e.g., an accumulated time of occurrence of the power regeneration operations in the current trip) as the operation count value Cgen.

The vehicle diagnose 317 is configured to perform a greenhouse gas increase determination based on the event count value Creq obtained by the event time counter 315 and the operation count value Cgen obtained by the regeneration time counter 316.

In the modification shown in FIG. 33, the vehicle diagnosis system 300 has the prerequisite determiner 301, the requisite determiner 302, the regeneration requester 303, the regeneration controller 304, an expected power accumulator 325, a regenerated power accumulator 326, and a vehicle diagnoser 327.

The expected power accumulator 325 is configured to obtain an expected amount of electric power that should be generated by the power regeneration, i.e., by the expected event, (i.e., the expected amount of the regeneration power accumulated from all occurrences of the expected events in the current trip) as the event count value Creq.

The regenerated power accumulator 326 is configured to obtain an actually regenerated amount of electric power from all power regeneration operations (in the current trip) as the operation count value Cgen.

The vehicle diagnoser 327 is configured to perform a greenhouse gas increase determination based on the event count value Creq obtained by the expected power accumulator 325 and the operation count value Cgen obtained by the regenerated power accumulator 326.

In the modification shown in FIG. 34, the vehicle diagnosis system 300 has the prerequisite determiner 301, the requisite determiner 302, the regeneration requester 303, the regeneration controller 304, an expected power accumulator 335, a regenerated charge power accumulator 336, and a vehicle diagnoser 337.

The expected power accumulator 335 is configured to obtain an expected amount of electric power that should be supplied from the motor 28 to the high-voltage battery 35 for regeneration charging of the battery 35 (i.e., the expected amount of the regeneration charge power accumulated from all occurrences of the expected events in the current trip) as the event count value Creq.

The regenerated charge power accumulator 336 is configured to obtain an actually charged amount of electric power which has been charged to the high-voltage battery 35 by the power regeneration as the operation count value Cgen.

The vehicle diagnoser 337 is configured to perform a greenhouse gas increase determination based on the event count value Creq obtained by the expected power accumulator 335 and the operation count value Cgen obtained by the regenerated charge power accumulator 336.

Further, the vehicle diagnoser 317 to 337 may have a communicator (i.e., see, for example, the communicator 307b in FIG. 26) just like the vehicle diagnoser 307 in the fourth embodiment.

The present disclosure is not necessarily limited to the operation in the each of the above-described embodiments and/or modifications.

For example, the event counter 305 in the above is configured to count the number of occurrences of an event in which the satisfaction of the operation condition, or the requisite, is determined by the requisite determiner 302 in the prerequisite satisfaction expected state. Regarding such a determination, the event counter 305 may count the number of occurrences of the event in which the satisfaction of the operation condition, or the requisite, is determined by the requisite determiner 302 in a prerequisite satisfied state.

In the above-described embodiment, the regeneration counter 306 is configured to count the number of regeneration operations performed by the regeneration controller 304. However, for example, the number of non-regenerations, which is a count of disabled/missing power regeneration in an event occurred state, may also be counted instead. Specifically, as shown in FIG. 26 by a broken line, a missing regeneration counter 309 may count the number of situations in which the regenerated electric power does not rise to or exceed a preset value in the event-happened state (i.e., after a preset time from an occurrence of the event).

Further, the "number" determination in the present modification may be replaced with "period of time" in other embodiments/modifications.

In the above-described embodiment, the event counter 305 is configured to count the number of satisfaction of the operation condition (i.e., the requisite) determined by the requisite determiner 302 in the prerequisite satisfaction expected state. Further, the regeneration counter 306 is configured to count the number of regeneration operations performed by the regeneration controller 304. However, for example, the event counter 305 may obtain an expectation value regarding a requested amount of electric power from the power regeneration when the satisfaction of the operation condition (i.e., the requisite) is determined by the requisite determiner 302. In such a case, an "operation count obtainer" that replaces the regeneration counter 306 is configured to obtain a request value that is requested by the regeneration requester 303 when the power regeneration is performed.

In the above-described embodiment, the event counter 305 is configured to count the number of satisfaction of the operation condition (i.e., the requisite) determined by the requisite determiner 302 in the prerequisite satisfaction expected state. Further, the regeneration counter 306 is configured to count the number of regeneration operations performed by the regeneration controller 304. However, for example, the event counter 305 may obtain a travel distance of the vehicle V during a period of time in which the satisfaction of the operation condition (i.e., the requisite) is determined by the requisite determiner 302. In such a case, an "operation count obtainer" that replaces the regeneration counter 306 is configured to obtain a travel distance of the vehicle V during a period of power regeneration time.

In a modification shown in FIG. 35, the configuration of FIG. 34 is partially modified. That is, in FIG. 34, the expected power accumulator 335 is provided and the expected amount of electric power is accumulated as the event count value Creq.

However, the expected power accumulator 335 may be omitted and a brake pedal accumulator 348 (i.e., a first accumulator) may be provided, which obtains the number of times when a brake pedal operation amount exceeds a preset amount based on the detection by the brake sensor 41r. The preset amount may be a threshold pedal pressure, travel distance, or the like.

Further, instead of having the regenerated charge power accumulator 336 that obtains the actually-charge power amount to charge the high-voltage battery 35 as the operation count value Cgen, a regeneration power accumulator 346 (i.e., a third accumulator) is provided. The regeneration power accumulator 346 accumulates the number of times/occurrences when the power regeneration operation is performed. More practically, the number of power regeneration control operations by the regeneration controller 304 is accumulatively counted by the regeneration power accumulator 346. Further, a missing regeneration accumulator 349 (i.e., a second accumulator) is newly provided, and the number of missing power regeneration operations in the requisite satisfied state, i.e., the number of situations in which the power regeneration is not performed even when the operation condition (i.e., the requisite) is satisfied.

The prerequisite determiner 301, the requisite determiner 302, the regeneration requester 303, and the regeneration controller 304 in FIG. 35 are the same as those in the above-mentioned embodiments.

Based on two out of three values that are obtained from the regeneration power accumulator 346, the brake pedal accumulator 348 and the missing regeneration accumulator 349, the vehicle diagnoser 347 can determine whether an abnormality regarding a power regeneration function in a mode by which the greenhouse gas reduction effect is canceled. In such a case, it is determined whether a quotient of the two values that are output to the vehicle diagnoser 347 is smaller than a preset threshold. When the quotient is smaller than the threshold, an abnormality of the power regeneration function is determined.

Further, the vehicle diagnoser 347 may have, just like the vehicle diagnoser 307 in the fourth embodiment, a communicator 347*b* (i.e., a communicator 307*b* in FIG. 26). Further, in the present modification and other modifications depending therefrom, the "number of times" determination may be replaced with the "time (i.e., duration)" determination.

In another partial modification of FIG. 35, the brake pedal accumulator 348 may be replaced with a kinetic energy accumulator. In such a case, the kinetic energy accumulator is configured to accumulate the kinetic energy possessed by the vehicle V at a time immediately before a preset amount of depression of the brake pedal.

Figure 36:
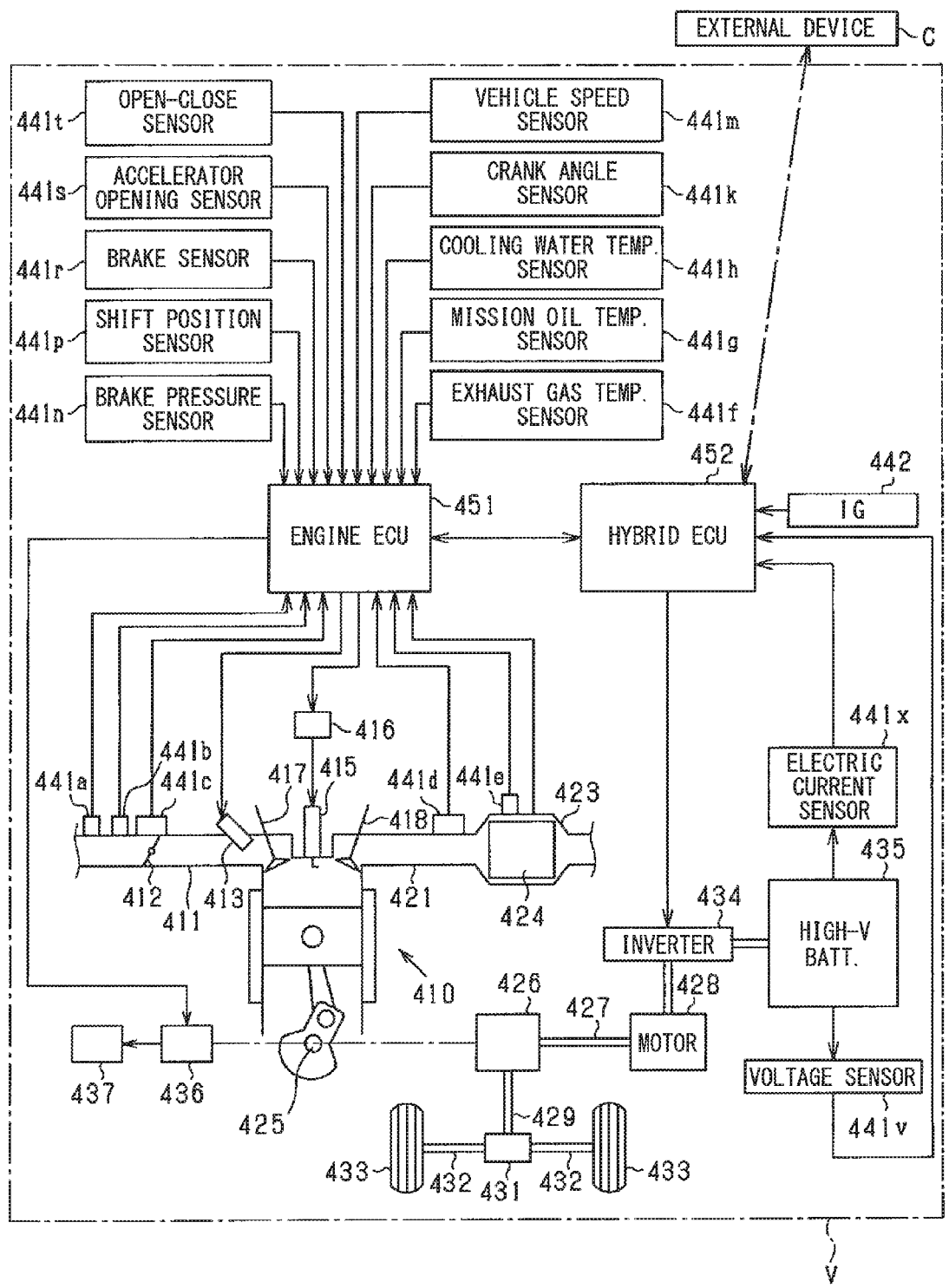
FIG. 36 is a block diagram of a vehicle diagnosis system implemented in a vehicle in the present disclosure.

Even in such a configuration, the operation is performed in the same manner as the configuration of FIG. 36, and whether the abnormality regarding the power regeneration function happening in a mode by which the greenhouse gas reduction effect is caused or not is determinable.

In yet another partial modification of FIG. 35, the brake pedal accumulator 348 may be replaced with a regeneration power amount estimator. In such a case, the regeneration power amount estimator is configured to calculate, or estimate, a total amount of electric power regenerated or charged by the power regeneration, based on an assumption that if the power regeneration is performed, during a brake pedal depression period, i.e., when the brake pedal is depressed by a preset amount or more.

Even in such a configuration, the operation is performed in the same manner as the configuration of FIG. 35, and whether the abnormality regarding the power regeneration function happening in a mode by which the greenhouse gas reduction effect is caused or not is determinable.

In still yet another partial modification of FIG. 35, the missing regeneration accumulator 349 may be replaced with a missing regeneration power accumulator. In such a case, the missing regeneration power accumulator is configured to accumulate the amount of electric power that is missed by the missing or disablement of power regeneration operations even when the (regeneration-causing) event has occurred.

Even in such a configuration, the operation is performed in the same manner as the configuration of FIG. 36, and whether the abnormality regarding the power regeneration function happening in a mode by which the greenhouse gas reduction effect is caused or not is determinable.

In still yet another partial modification of FIG. 35, the missing regeneration accumulator 349 may be replaced with a brake work accumulator. In such a case, the brake work accumulator is configured to accumulate the amount of negative work that is used for braking/decelerating the vehicle V.

Even in such a configuration, the operation is performed in the same manner as the configuration of FIG. 35, and whether the abnormality regarding the power regeneration function happening in a mode by which the greenhouse gas reduction effect is caused or not is determinable.

In still yet another partial modification of FIG. 35, the regeneration power accumulator 346 may be replaced with a regeneration power accumulator. In such a case, the regeneration power accumulator is configured to accumulate the amount of actually regenerated electric power in the same manner as the regenerated power accumulator 326 in FIG. 33.

Even in such a configuration, the operation is performed in the same manner as the configuration of FIG. 35, and whether the abnormality regarding the power regeneration function happening in a mode by which the greenhouse gas reduction effect is caused or not is determinable.

In still yet another partial modification of FIG. 35, the regeneration power accumulator 346 may be replaced with a generated power accumulator. In such a case, the generated power accumulator is configured to accumulate the total amount of actually generated electric power generated/charged by the motor 28 or the alternator during a brake pedal depression period, i.e., when the brake pedal is depressed by a preset amount.

Even in such a configuration, the operation is performed in the same manner as the configuration of FIG. 35, and whether the abnormality regarding the power regeneration function happening in a mode by which the greenhouse gas reduction effect is caused or not is determinable.

The regeneration power accumulator 346, the brake pedal accumulator 348 and the missing regeneration accumulator 349 described above may be arbitrarily combined.

In each of the above modifications of FIG. 35, the brake work accumulator may be configured to not only accumulate the amount of negative work of the brake which is used for braking the vehicle V, but may also be configured accumulate at least one of the negative works from the engine 10, the transmission 26, and the like, i.e., the friction and other losses of energy caused in the travel (i.e., a travel resistance) of the vehicle V. In such a configuration, the energy not collected by the regeneration is more accurately determined, and, as a result, an abnormality regarding the power regeneration function is more accurately performed.

In each of the above modifications of FIG. 35, the brake pedal accumulator 348 is configured to obtain the number of times of a preset amount of depression of the brake pedal based on the detection of the brake sensor 41*r*. The brake pedal accumulator 348 may also be configured to obtain the number of situations when the brake oil pressure Pbr detected by the brake sensor 41*r* exceeds a preset value. Alternatively, the brake pedal accumulator 348 may also be configured to obtain the number of occasions when a request value of braking caused by the depression of the brake pedal exceeds a preset value.

Even in such a configuration, the operation is performed in the same manner as the configuration of FIG. 35, and whether the abnormality regarding the power regeneration function happening in a mode by which the greenhouse gas reduction effect is caused or not is determinable.

The definition of a "trip" is not necessarily limited to a period from an OFF-to-ON switching of the start switch 42 to a next OFF-to-ON switching of the start switch 42.

For example, a "trip" may be a period between two ON-to-OFF switching timings of the start switch 42. That is, a "trip" may be variously defined according to a kind of the vehicle V, etc. and according to an intended use of a trip period.

More practically, when the vehicle V is an electric vehicle or a plug-in hybrid vehicle, a "trip" may be a period from a charge timing to a next charge timing, for example, respectively by using a charger. Alternatively, when the vehicle V is provided only with an internal-combustion engine as a source of thrust power, a "trip" may be a period from a start of the engine 10 to a complete stop of the engine 10, which does not include the above-mentioned temporal stop period.

Hereafter, one embodiment of the present disclosure is described, referring to the drawings. Since inserting a modification of the embodiment may hinder a reader of the embodiment, the modification of the embodiment is described at the end thereof <Entire Configuration of a Vehicle>

An external device C shown in FIG. 36 is disposed in data-communicable manner with a vehicle V, which is a so-called hybrid vehicle, via a communication channel that is either a wired communication or a wireless communication.

The vehicle V has an engine 410 (i.e., a multi-cylinder gasoline engine of a spark ignition type) installed therein. A throttle valve 412 of the electric drive type is disposed in an inlet pipe 411 of the engine 410. Near an intake port which is a connection section between the inlet pipe 411 and a cylinder, an injector 413 as a means to inject gasoline fuel is disposed. A spark plug 415 and an igniter 416 which applies high voltage for an ignition of the spark plug 415 are disposed on each cylinder as an ignition means of the engine 410. An intake valve 417 and an exhaust valve 418 are respectively disposed in the intake port and in the exhaust port.

A catalytic converter 423 as an exhaust emission purifier is disposed in an exhaust pipe 421 of the engine 410. The catalytic converter 423 has a three-way catalyst, for example, and it is configured so that the detrimental constituent (i.e., HC, CO, NOx) in the exhaust gas is purified when the exhaust gas passes therethrough.

A transmission 426 containing a power distribution device with a planetary gear mechanism is connected to a crankshaft 425 of the engine 410. A motor 428 which can operate as an electric motor and as a generator is connected to the transmission 426 via a gear shaft 427.

Further, to the transmission 426, a wheel (i.e., a driving wheel) 433 is connected via an output shaft 429, a differential gear 431, and a drive shaft 432. That is, the transmission 426 is configured to be capable of outputting an output power of the engine 410 and/or the motor 28 to the same drive shaft 432.

The motor 428 is connected to a high voltage battery 435 via an inverter 434. When the motor 428 operates as a generator, the inverter 434 is used for charging an electric power to the high voltage battery 435, after converting the electric power generated by the motor 428 from a direct current to an alternating current. On the other hand, when the motor 428 operates as an electric motor, the inverter 434 is used to convert the electric power outputted from the high voltage battery 435 from the direct current to the alternating current, and to output the converted electric power to the motor 428.

Further, the vehicle V has an alternator 436 installed therein. The alternator 436, which serves as a "generator" of the present disclosure, receives a rotational drive power from the crankshaft 425 to be operated as a generator. The alternator 436 is electrically connected to a low-voltage battery, which is charged by an electric power from the alternator 436.

Specifically, in a sixth embodiment, the alternator 436 operates as a generator when a certain condition is satisfied at a time of deceleration of the vehicle V, which is also used as a regeneration brake function. The generation of electric power by such a regeneration brake function is in the following designated as "power regeneration."

Two or more sensors which are illustrated in part below are disposed in the vehicle V. Specifically, the inlet pipe 411 has, disposed thereon, an air flow meter 441a, an intake air temperature sensor 441b, and a throttle position sensor 441c. The air flow meter 441a is disposed so that the output (of the meter 441a) corresponds to the mass flow rate (Ga) of the intake air which passes through the inlet pipe 411. The intake air temperature sensor 441b is disposed so that the output corresponds to the temperature (Tin) of the above-mentioned intake air. The throttle position sensor 441c is disposed at a position corresponding to the throttle valve 412 so that the output corresponds to a throttle opening TA which is an opening (i.e., a turning angle) of the throttle valve 412.

On an exhaust pipe 421, an A/F sensor 441d, a catalyst temperature sensor 441e, and an exhaust gas temperature sensor 441f are provided. The A/F sensor 441d is an oxygen density sensor which produces an output corresponding to the oxygen density in the exhaust gas, and is disposed at an upstream position of the catalytic converter 423 on the exhaust pipe 421. The catalytic converter 423 is equipped with a catalyst temperature sensor 441e so that the output corresponds to the temperature (Tc) of the catalytic converter 423. The exhaust gas temperature sensor 441f are provided so that the output corresponding to the temperature (Tex) of the exhaust gas which passes through the exhaust pipe 421.

The transmission 426 is equipped with a mission oil temperature sensor 441g. The mission oil temperature sensor 441g is disposed so that the output corresponds to the operating oil temperature inside the transmission 426 (Tm). Further, the engine 410 is equipped with a cooling water temperature sensor 441h, and a crank angle sensor 441k. The cooling water temperature sensor 441h is disposed so that the output corresponds to a cooling water temperature (Tw) of the engine 410. The crank angle sensor 441k is disposed on a crank case of the engine 410 so that an output signal therefrom includes a narrow width pulse at every 410 degree rotation of the crank shaft 425 and a broad width pulse at every 360 degree rotation of the crank shaft 425, which may be mainly used for a detection of an engine rotation number Ne.

The vehicle V is equipped with a vehicle speed sensor 441m, and a brake pressure sensor 441n. The vehicle speed sensor 441m is disposed so that the output corresponds to a travel speed (ve) of the vehicle V. The brake pressure sensor 441n is disposed so that the output corresponds to a brake oil pressure (Pbr) which is a pressure of a hydraulic fluid supplied to a brake caliper (not illustrated) from a brake actuator (not illustrated).

The vehicle V is equipped with a shift position sensor 441p, a brake sensor 441r, an accelerator opening sensor 441s and an open-close sensor 441t. The shift position sensor 441p is disposed so that the output corresponds to an operation state of the gearshift (not illustrated) disposed near the driver's seat of the vehicle V. The brake sensor 441r is disposed so that the output corresponds to an operation amount of a brake pedal (not illustrated). The accelerator opening sensor 441s is disposed so that the output corresponds to an accelerator opening Acc which is an operation amount of an accelerator (not illustrated). The open-close sensor 441t is disposed so that the output corresponds to an open-close state of a door of the vehicle V or of a hood of the vehicle V (not illustrated).

A voltage sensor 441v and an electric current sensor 441x are electrically connected to the high voltage battery 435. The voltage sensor 441v is disposed so that the output corresponds to a voltage Vb between the terminals of the high voltage battery 435. The electric current sensor 441x is disposed so that the output corresponds to charging and discharge currents Ib of the high voltage battery 435.

A start switch 442, which may also be called as an ignition switch, is provided in the vehicle V. The start switch 442 is a switch operated for a switch ON and a switch OFF of the vehicle V (i.e., a hybrid system), and is disposed near the driver's seat.

An engine ECU 451 and a hybrid ECU 452 are provided in the vehicle V. The engine ECU 451 and the hybrid ECU 452 are basically comprised of a microcomputer that has, as well-known, CPU, ROM, RAM, etc., respectively, and perform various controls about an operation of the vehicle V by executing various kinds of control programs memorized in the ROM.

Specifically, the engine ECU 451 is electrically connected to two or more above-mentioned sensors, except for the voltage sensor 441v and the electric current sensor 441x. The hybrid ECU 452 is electrically connected to the voltage sensor 441v, the electric current sensor 441x, and to the start switch 442. The engine ECU 451 and the hybrid ECU 452 are electrically connected with each other for an exchange of signals.

The engine ECU 451 receives, as an input signal, a signal outputted from the above-mentioned sensors and the hybrid ECU 452 which are electrically connected thereto, and controls a drive of each of the components (i.e., the injector 413, igniter 416 etc.) of the engine 410 as well as the alternator 36 based on such input signal. The hybrid ECU 452 receives an output signal of the above-mentioned sensors, except for the voltage sensor 441v and the electric current sensor 41x, via the engine ECU 451, and an output signal outputted from the voltage sensor 441v and the electric current sensor 441x, and, based on those received signals, performs an operation control of the motor 428, an operation control of the inverter 434, a charge and discharge control of the high voltage battery 435, etc.

Further, the engine ECU 451 and the hybrid ECU 452 perform, in cooperation with each other (i.e., through an exchange of a control signal, data, etc.), various controls such as a travel mode control, a temporal stop/restart control of the engine 410 etc. regarding the vehicle V (i.e., a hybrid system). That is, the vehicle V is provided with a temporal stop function of the engine 410 in a hybrid system (i.e., a function that temporarily stops the engine 410 when a prescribed condition is satisfied).

<System Configuration of a Vehicle Diagnosis System of the Sixth Embodiment>

Figure 37:
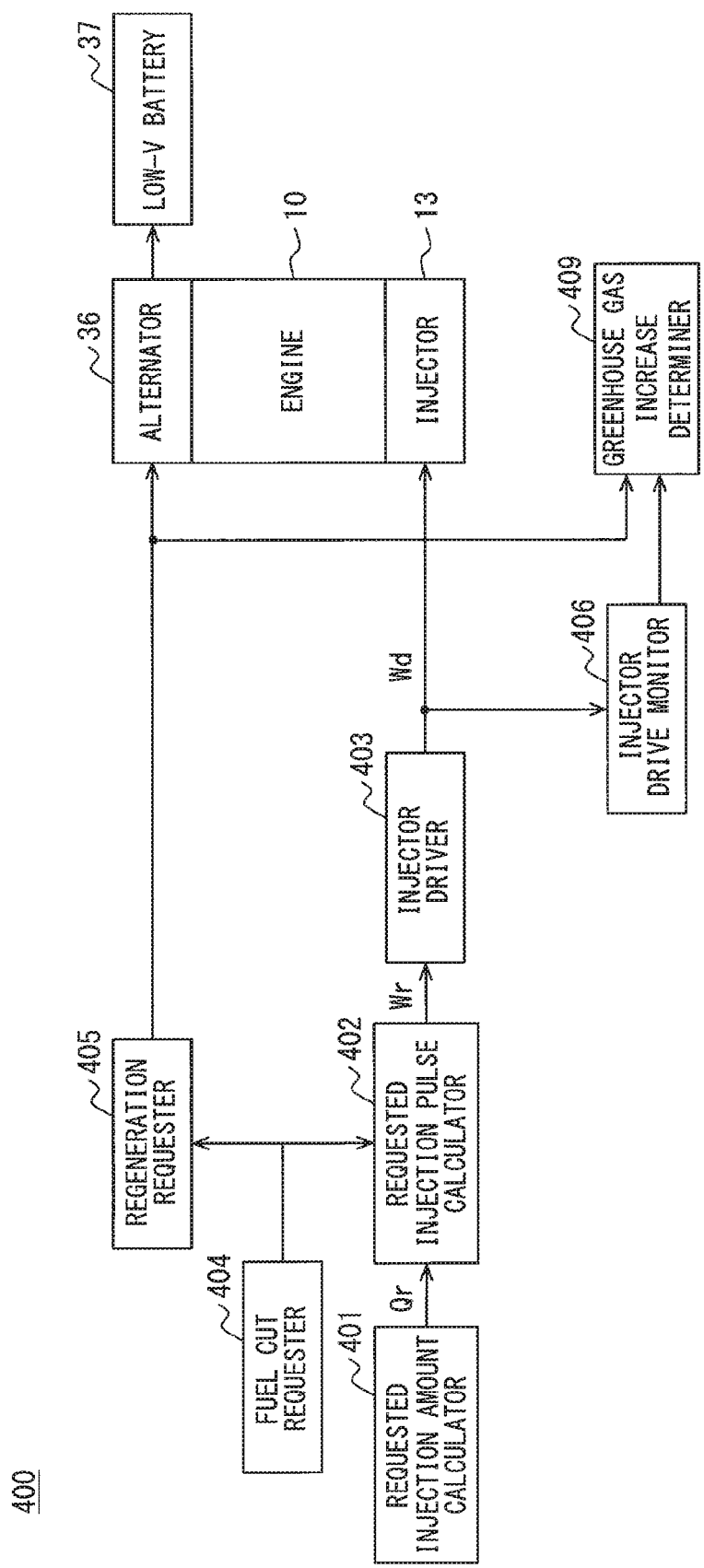
FIG. 37 is a schematic diagram of functional blocks of the vehicle diagnosis system implemented in the vehicle of FIG. 36.

With reference to FIG. 37, a vehicle diagnosis system 400 in the sixth embodiment of the present disclosure is described in terms of how it performs a process about diagnosis of the vehicle V of FIG. 36. Specifically, such a vehicle diagnosis system 400 has a requested injection amount calculator 401, a requested injection pulse calculator 402, an injector driver 403, a fuel cut requester 404, a regeneration requester 405, an injector drive monitor 406, and a greenhouse gas increase determiner 409. In the present embodiment, these components 401 to 409 are provided as a functional block, respectively, in the above-mentioned CPU that is disposed in the engine ECU 51.

The requested injection amount calculator 401 is configured to calculate a requested injection amount Qr based on an output of the above-mentioned sensors, i.e., an operational status of the vehicle V and various kinds of correction coefficients, and the like.

Here, the requested injection amount Qr is a value (i.e., a signal) corresponding to the fuel injection amount to be injected from the injector 13 at a current fuel injection timing, which may be calculated based on an intake air flow amount Ga, a throttle opening TA, etc. which are detected by the sensors.

The requested injection pulse calculator 402 is configured to calculate a requested injection pulse width Wr, based on the requested injection amount Qr calculated by the requested injection amount calculator 101.

Here, the requested fuel injection pulse width Wr is a value (i.e., a signal) corresponding to a pulse width of a valve-open ON signal which needs to be applied to the injector 13 in order to actually inject the fuel amount corresponding to the requested injection amount Qr from the injector 13.

In the present embodiment, the requested injection pulse calculator 402 sets the requested injection pulse width Wr to zero, when a fuel cut request occurs in the fuel cut requester 404 that is mentioned later.

The injector driver 403 is configured to output a pulse-shape drive signal Wd to the injector 13 based on the requested injection pulse width Wr calculated by the requested injection pulse calculator 402.

The above-described amount, width, signal, i.e., the requested injection amount Qr, the requested injection pulse width Wr, the drive signal Wd, as well as how to calculate such values are respectively well-known in the art. Therefore, the details of those matters are omitted from this specification.

The fuel cut requester 404 which may be a "fuel cut requester" of the present disclosure is configured to generate a fuel cut request based on the output of the above-mentioned sensors, i.e., the operational status of the vehicle V. The fuel cut request is an operation request (i.e., a signal) of a fuel cut. The fuel cut requester 404 generates the fuel cut request, when predetermined fuel cut conditions are satisfied. Here, in the present embodiment, the above-mentioned "fuel cut conditions" shall be satisfied, when all of the following conditions are satisfied.

(1) Ne>Ne0 (i.e., a specified value),
(2) Accelerator OFF [i.e., Acc<Acc0 (i.e., a specified value)],
(3) ve≥ve0 (i.e., a specified value).

The regeneration requester 405 corresponding to a "regeneration requester" of the present disclosure is configured to generate a regeneration request based on the operational status of the vehicle V, etc. The regeneration request is an operation request (i.e., a signal) of regenerative power generation. The regeneration requester 405 generates the regeneration request, when predetermined regeneration conditions are satisfied.

Here, in the present embodiment, the above-mentioned "regeneration conditions" shall be satisfied, when all of the following conditions are satisfied.

(A) Brake ON (i.e., an amount of brake pedal operation is equal to or greater than a predetermined amount),
(B) The transmission 26 in a fastened state (i.e., a state in which a transmission of a driving force between the motor 28 and the output shaft 29 is enabled),
(C) No output of the driving force for driving the vehicle V exists from the motor 28, and
(D) Fuel cut is being performed.

More practically, the regeneration requester 405 is configured to generate a regeneration request when the above-described conditions of (A)-(C) are fulfilled during a fuel cut.

The injector drive monitor 406 is configured to monitor the drive signal Wd outputted to the injector 13.

The greenhouse gas increase determiner 409 corresponding to a "detector" of the present disclosure is configured to detect that a regenerative power generation is performed in a manner/mode by which a greenhouse gas reduction effect is reduced.

Specifically, the greenhouse gas increase determiner 409 detects a drive state of the injector 13 based on the monitored result of the drive signal Wd by the injector drive monitor 406. When a fact "a fuel cut is not performed during a generation of a regeneration request" is detected based on the detection result (i.e., the drive state of the injector 13), the determiner 409 detects a fact "a regenerative power generation is performed in the mode by which a greenhouse gas reduction effect is reduced."

The determination of whether a regenerative power generation is performed in the mode by which a greenhouse gas reduction effect is reduced is abbreviated as a following phrase, i.e., "a greenhouse gas increase determination" in the following description.

<Operation of the Vehicle Diagnosis System in the Sixth Embodiment>

Figure 38:
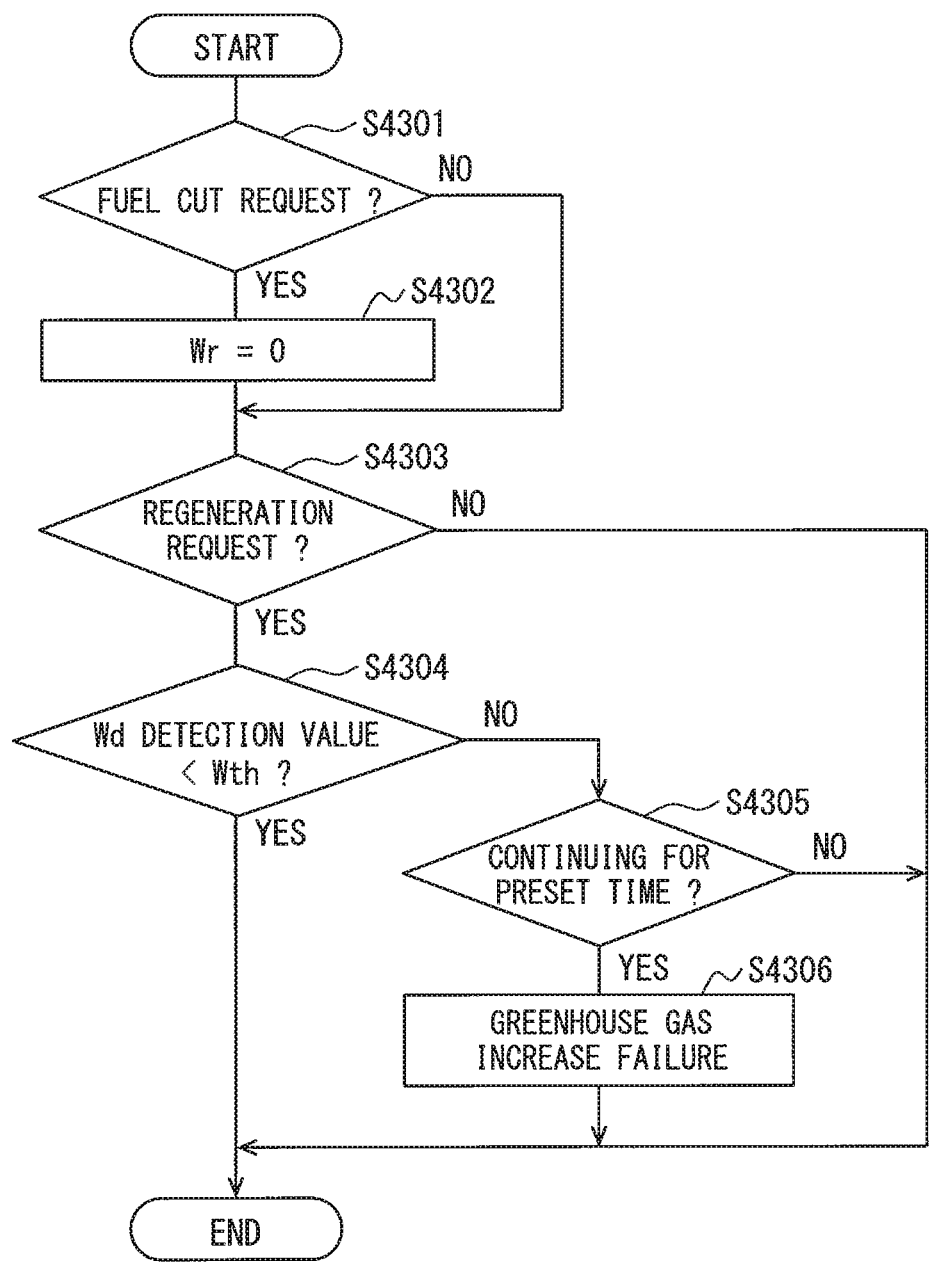
FIG. 38 is a flowchart of an operation of the vehicle diagnosis system in FIG. 37.

The operation and effect of the configuration of the present embodiment is described in the following. In the flowchart of FIG. 38 and others, "S" refers to a "step."

The engine ECU 51 and the hybrid ECU 52 control an operation of each part of the vehicle V (i.e., a hybrid system) based on the various states etc. of the vehicle V grasped by the output signal of the above-mentioned multiple sensors, exchanging various signals among the two (ECUs). Specifically, the hybrid ECU 52 obtains the various states of the vehicle V, etc., based on the input signals from the voltage sensor 41v, the electric current sensor 41x, the start switch 42 etc., and also based on the signal inputted by the signal exchanged with the engine ECU 51, etc., for example. Then, the hybrid ECU 52 sets up a travel mode (i.e., including a temporal stop/restart of the engine 10) of the vehicle V, taking the fuel mileage of the engine 10 into consideration and based on the various states etc. of the vehicle V.

The engine ECU 51 performs a drive control of the engine 10 according to the travel mode set up (i.e., determined) by the hybrid ECU 52. That is, for example, the engine ECU 51 performs various controls (i.e., a fuel injection control including a so-called fuel cut, an ignition control, etc.) of the engine 10 during a drive period of the engine 10 based on the drive state or the like of the vehicle V. The hybrid ECU 52 calculates a remaining amount of charge (SOC) of the high voltage battery 35 based on the charge and discharge currents detected by the electric current sensor 41x. Further, the hybrid ECU 52 controls the drive of the motor 28, the inverter 34 etc. based on the drive state of the vehicle V, a remaining amount of charge of the high voltage battery 35, or the like.

Hereafter, the power regeneration control is described in more detail.

First, the requested injection amount calculator 401 calculates the request injection amount Qr based on the operational status of the vehicle V, etc. The fuel cut requester 404 generates a fuel cut request based on the operational status of the vehicle V.

The requested injection pulse calculator 402 calculates the requested injection pulse width Wr based on the requested injection amount Qr calculated by the requested injection amount calculator 401. The injector driver 403 outputs the pulse-shape drive signal Wd to the injector 13 based on the requested injection pulse width Wr calculated by the requested injection pulse calculator 402.

Here, the requested injection pulse calculator 402 sets the requested injection pulse width Wr to zero, when the fuel cut request occurs in the fuel cut requester 404. In this case, an ON pulse width in the drive signal Wd usually outputted from the injector driver 403 is also set to zero. In such manner, a fuel cut is performed.

On the other hand, the regeneration requester 405 generates a regeneration request based on the operational status of the vehicle V, and the generation state of the fuel cut request in the fuel cut requester 404. That is, the regeneration requester 405 generates a regeneration request, when the fuel cut requester 404 generates a fuel cut request and the above-mentioned conditions of (A) to (C) are fulfilled. When a regeneration request is generated, the engine ECU 51 controls a power regeneration state of the alternator 36. Thereby, the alternator 36 outputs an electric power derived from the power regeneration.

Further, when, due to a certain abnormality (i.e., failure), the power regeneration is performed in a mode that reduces an original power regeneration effect (i.e., a reduction of emission of the greenhouse gas), the driving the vehicle V with the power regeneration function in such mode for a long time is not good, in terms of environmental load.

Specifically, in some cases, for example, a power regeneration, which should be performed during a fuel cut period, may have an erroneous fuel injection. The erroneously injected fuel may generate a torque, and such a torque may be consumed by a brake control that is not accompanied by the power regeneration, which may greatly deteriorate a fuel consumption rate. Therefore, at the time of having such an abnormality, a driver of such a vehicle should be quickly notified for such abnormality.

Therefore, in the present embodiment, the injector drive monitor 406 monitors the drive signal Wd outputted to the injector 13. Then, the greenhouse gas increase determiner 409 performs a greenhouse gas increase determination based on the monitored result of the drive signal Wd by the injector drive monitor 406.

Specifically, the greenhouse gas increase determiner 409 detects a fact "a fuel cut is not performed during a generation of a regeneration request", the determiner 409 detects a fact (i.e., a greenhouse gas increase failure) "a regenerative power generation is performed in the mode by which a greenhouse gas reduction effect is reduced." When such a detection result is notified to the driver, the abnormality in the vehicle V is quickly fixed as soon as possible. Therefore, the environmental load of such vehicle V is reduced as soon as possible.

Hereafter, one example of the above-mentioned operation is described with reference to a flowchart in FIG. 38. The procedure in FIG. 38 is performed at predetermined intervals after a start of the hybrid system by the start switch 42. When such a procedure is started, it is first determined whether a fuel cut request is generated in Step 4301.

When a fuel cut request is generated (Step 4301=YES), after the process advances to Step 4302 and the value of the requested injection pulse width Wr is set as "0", the process further advances to Step 4303.

On the other hand, when a fuel cut request is not generated (Step 4301=NO), the process of Step 4302 is skipped and the process advances to Step 4303.

It is then determined in Step 4303 whether a regeneration request is generated. When a regeneration request is not generated (Step 4303=NO), the processes after Step 4304 are skipped and this procedure is once finished. Therefore, hereafter, the description is continued based on an assumption that the regeneration request is generated (Step 4303=YES). That is, when the regeneration request is generated (Step 4303=YES), the process advances to Step 4304.

In Step 4304, it is determined whether the detection value of the drive signal Wd by the injector drive monitor 406 is smaller than a predetermined threshold value Wth. That is, in Step 4304, it is determined whether the pulse width of the drive signal Wd is substantially equal to "0".

When it is determined that Wd<Wth (Step 4304=YES), it indicates that the fuel cut is being performed during the power regeneration (i.e., a normal operation). Therefore, the process after Step 4305 is skipped in this case, and the procedure is once finished.

On the other hand, when it is determined that Wd Wth (Step 4304=NO), it indicates that a fuel injection has been performed during the power regeneration. Thus, in such case, the process advances to Step 4305 and after.

First, in Step 4305, it is determined whether a state in which a fuel injection is performed during the power generation is continuing for a preset time.

When a state in which a fuel injection is performed during the power generation is continuing for a preset time (Step 4305=YES), the process advances to Step 4306, and it is then determined whether a greenhouse gas increase failure "a regenerative power generation is performed in the mode by which a greenhouse gas reduction effect is reduced" is being caused. Then, the procedure is once finished.

On the other hand, when the determination of Step 4305 is "NO", the process of Step 4306 is skipped and the procedure is once finished.

Seventh Embodiment

Next, the configuration concerning another example of the present disclosure (i.e., another embodiment) is described. In the following description another example, the same numeral as the above-mentioned embodiment (i.e., the sixth embodiment) is basically assigned to the same component/function. Therefore, description of the same-numeral-assigned component/function of the above-mentioned embodiment basically applies to the present embodiment unless otherwise described or unless any technical restriction applies.

Figure 39:
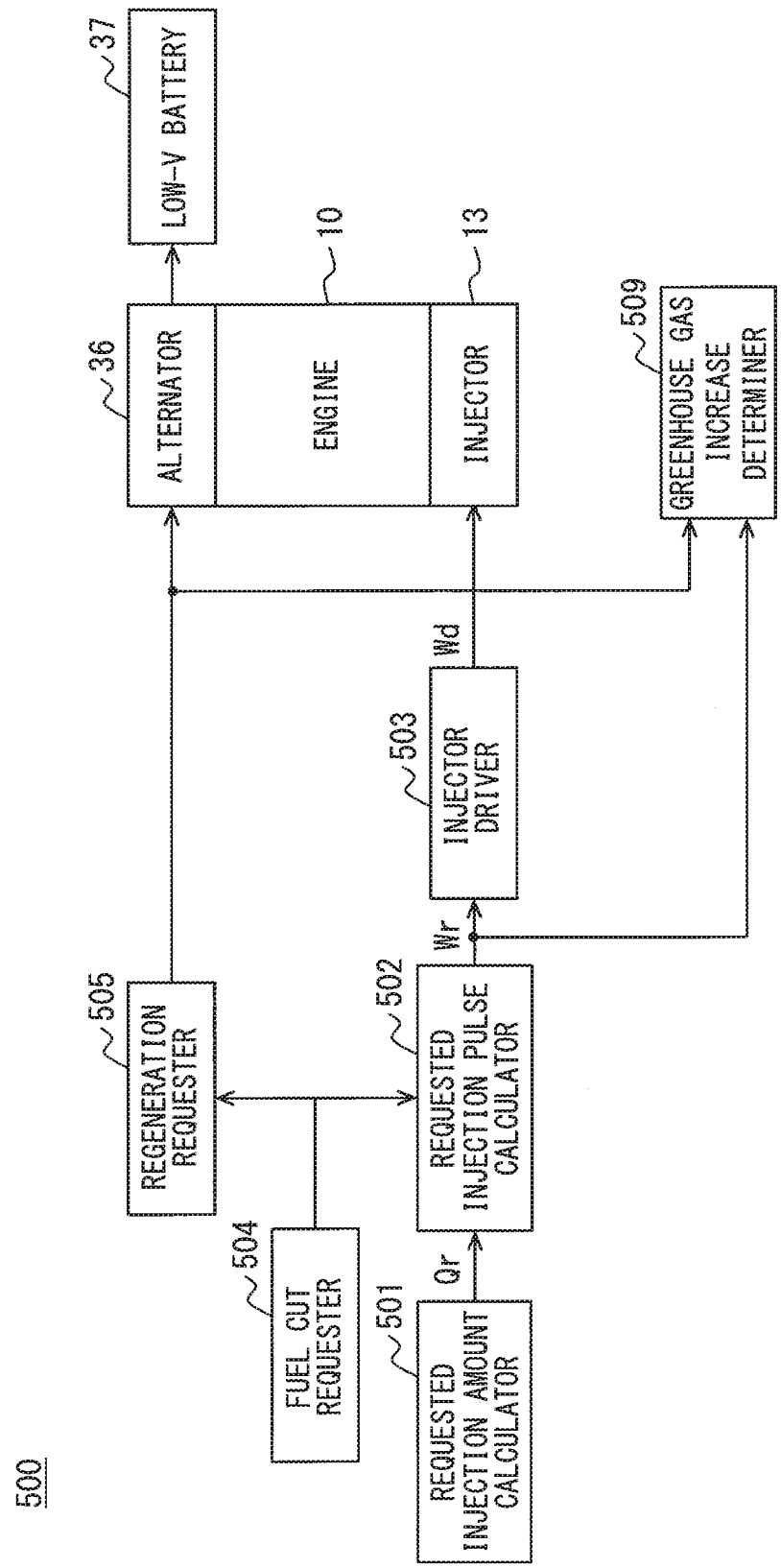
FIG. 39 is a schematic diagram of functional blocks of the vehicle diagnosis system implemented in the vehicle of FIG. 36.

As shown in FIG. 39, a vehicle diagnosis system 500 in the seventh embodiment of the present disclosure includes a requested injection amount calculator 501, a requested injection pulse calculator 502, an injector driver 503, a fuel cut requester 504, a power regeneration requester 505, and a greenhouse gas increase determiner 509.

The requested injection amount calculator 501, the requested injection pulse calculator 502, the injector driver 503, the fuel cut requester 504, and the power regeneration requester 505 are configured in the same manner as the requested injection amount calculator 401, the requested injection pulse calculator 402, the injector driver 403, the fuel cut requester 504, and the regeneration requester 405 in the above-mentioned sixth embodiment.

In the present embodiment, based on the requested injection pulse width Wr calculated by the requested injection pulse calculator 502, the greenhouse gas increase determiner 509 is configured to perform a greenhouse gas increase determination. That is, the greenhouse gas increase determiner 509 determines a greenhouse gas increase failure, when the requested injection pulse width Wr is not substantially equal to "0", even though a regeneration request is generated, that is, in case of Wr≥Wrth (i.e., a specified value). In such a configuration, the same operation and effect as the sixth embodiment are achieved.

Eighth Embodiment

Figure 40:
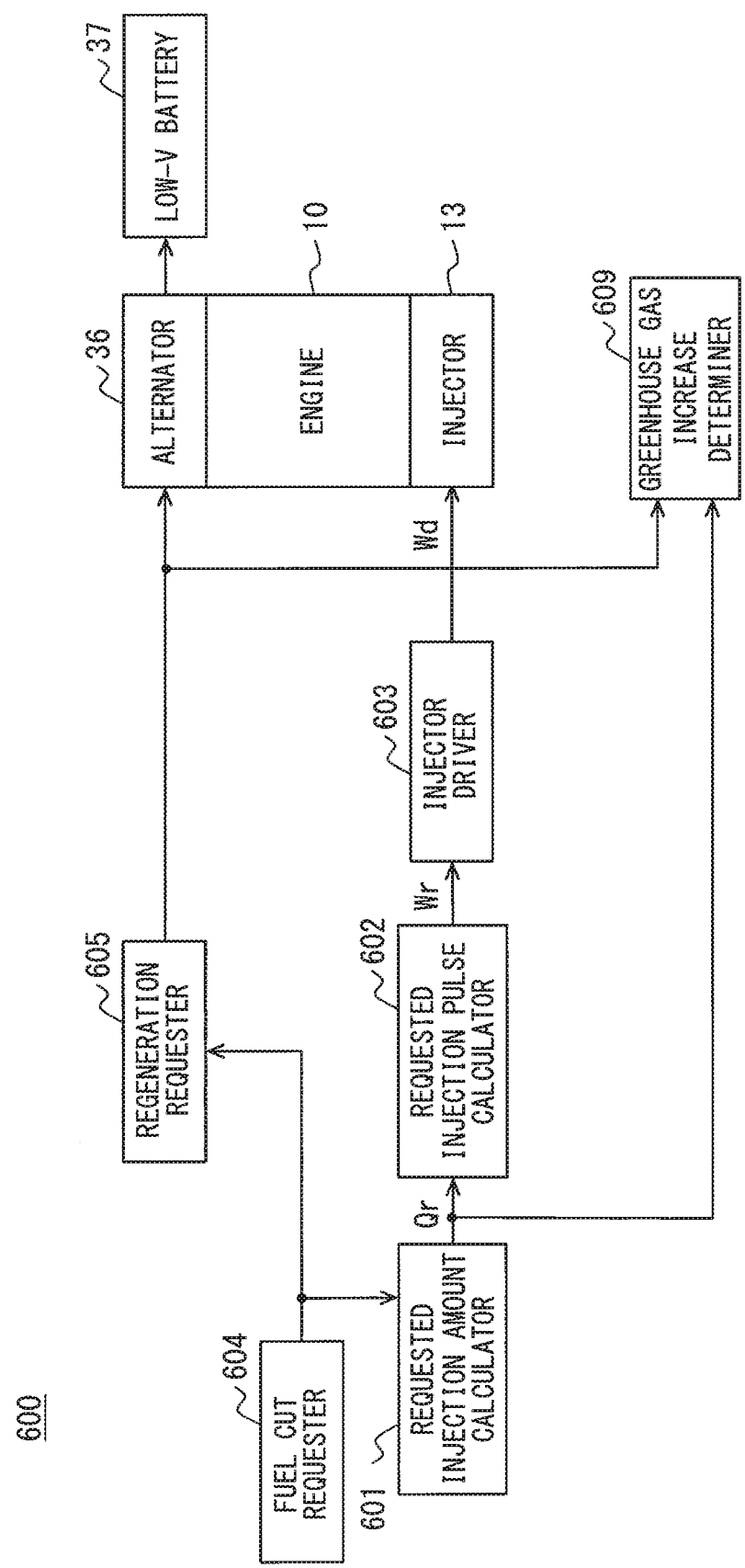
FIG. 40 is a schematic diagram of functional blocks of the vehicle diagnosis system implemented in the vehicle of FIG. 36.

As shown in FIG. 40, a vehicle diagnosis system 600 in the eighth embodiment of the present disclosure includes a requested injection amount calculator 601, a requested injection pulse calculator 602, an injector driver 603, a fuel cut requester 604, a power regeneration requester 605, and a greenhouse gas increase determiner 609.

The requested injection amount calculator 601, the requested injection pulse calculator 602, the injector driver 603, the fuel cut requester 604, and the power regeneration requester 605 are respectively configured in the same manner as the requested injection amount calculator 401, the requested injection pulse calculator 402, the injector driver 403, the fuel cut requester 404, and the regeneration requester 405 in the sixth embodiment.

In the present embodiment, based on the requested injection amount Qr calculated by the requested injection amount calculator 401, the greenhouse gas increase determiner 609 is configured to the increase determination in greenhouse gas may be performed. That is, the greenhouse gas increase determiner 609 determines the greenhouse gas increase failure, when the requested injection amount Qr is not substantially equal to "0", even though a regeneration request is generated [in case of Qr≥Qrth (i.e., a specified value)]. In such a configuration, the same operation and effect as the sixth embodiment are achieved.

Ninth Embodiment

Figure 41:
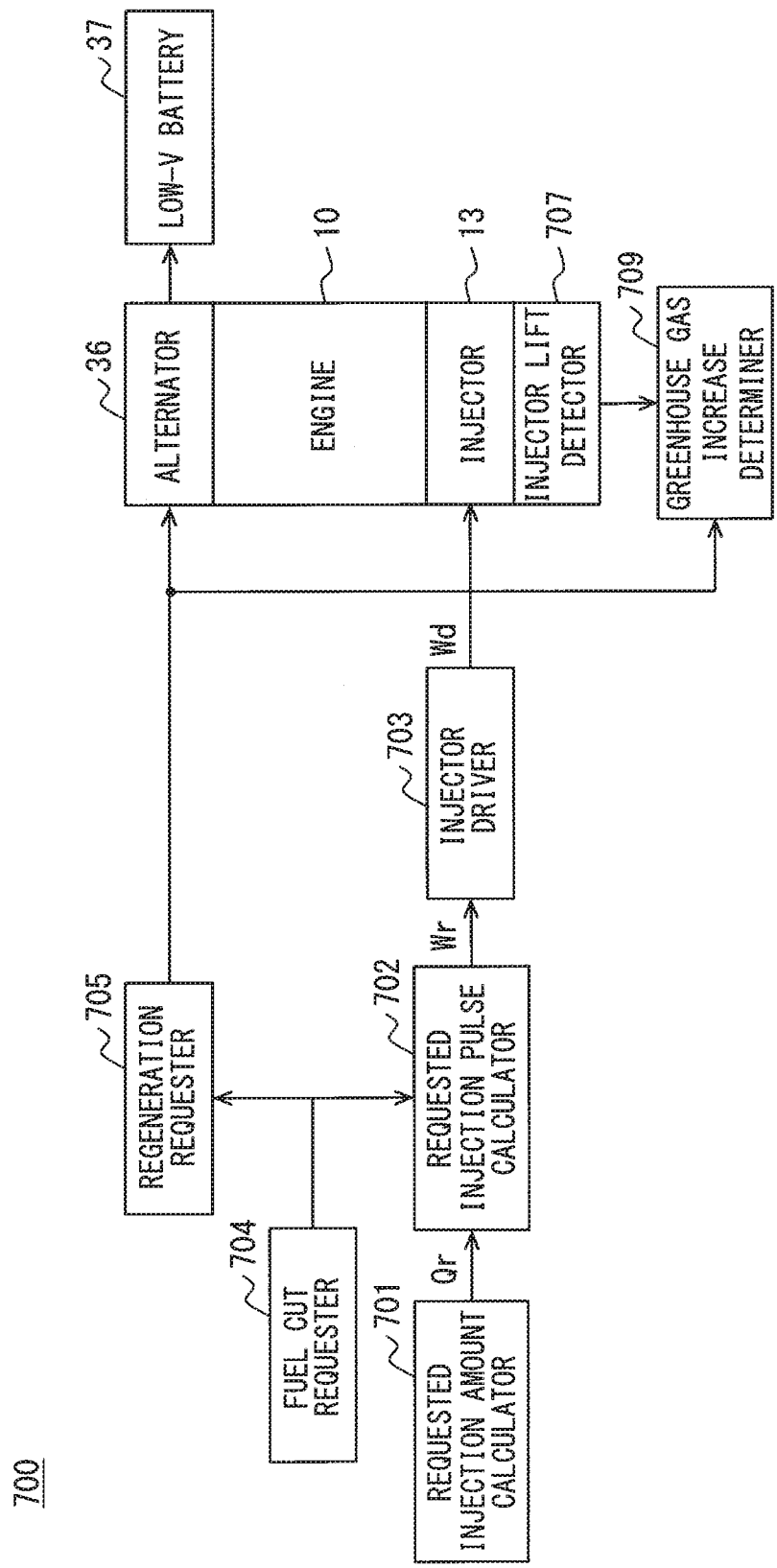
FIG. 41 is a schematic diagram of functional blocks of the vehicle diagnosis system implemented in the vehicle of FIG. 36.

As shown in FIG. 41, a vehicle diagnosis system 700 in the ninth embodiment of the present disclosure includes a requested injection amount calculator 701, a requested injection pulse calculator 702, an injector driver 703, a fuel cut requester 704, a power regeneration requester 705, an injector lift detector 707, and a greenhouse gas increase determiner 709.

The requested injection amount calculator 701, the requested injection pulse calculator 702, the injector driver 703, the fuel cut requester 704, and the power regeneration requester 705 are respectively configured in the same manner as the requested injection amount calculator 401, the requested injection pulse calculator 402, the injector driver 403, the fuel cut requester 404, and the regeneration requester 405 in the sixth embodiment.

In the present embodiment, the injector lift detector 707 is configured to detect an actual lift amount of the injector 13. Then, based on the lift amount detected by the injector lift detector 707, the greenhouse gas increase determiner 709 is configured to perform the greenhouse gas increase determination. That is, the greenhouse gas increase determiner 709 determines the greenhouse gas increase failure, when the actual lift amount of the injector 13 is equal to or greater than a specified value, even though a regeneration request is generated. In such a configuration, the same operation and effect as the sixth embodiment are achieved.

Tenth Embodiment

Figure 42:
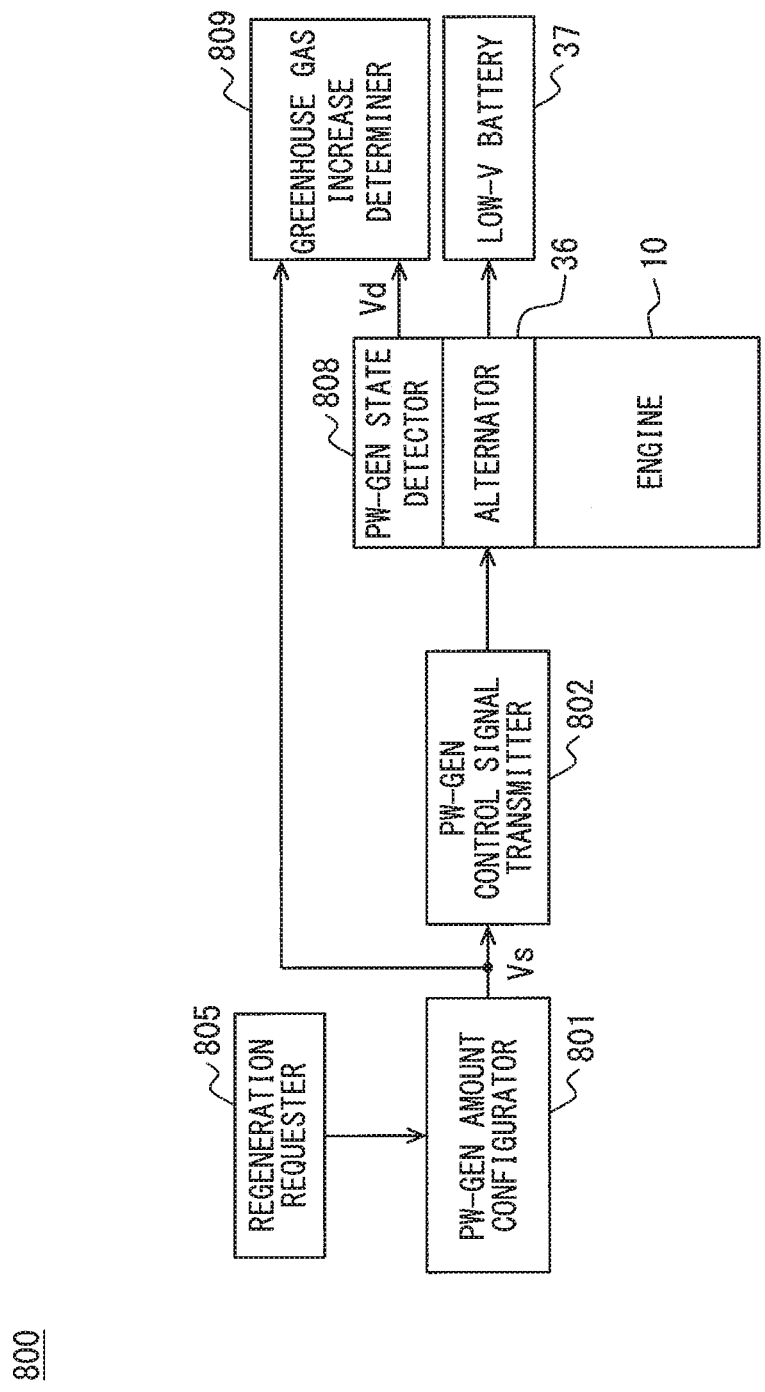
FIG. 42 is a schematic diagram of functional blocks of the vehicle diagnosis system implemented in the vehicle of FIG. 36.

As shown in FIG. 42, a vehicle diagnosis system 800 in the Tenth embodiment of the present disclosure includes a power generation amount configurator 801, a power generation control signal transmitter 802, a power regeneration requester 805, a power generation state detector 808, and a greenhouse gas increase determiner 809.

The power regeneration requester 805 is configured in the same manner as the regeneration requester 405 in each of the above-mentioned embodiments.

Based on the operational status of the vehicle V, the power generation amount configurator 801 corresponding to a "power generation amount set unit" of the present disclosure is configured to calculate a preset value Vs of a adjustment voltage of the alternator 36. The "adjustment voltage" is a voltage for adjusting a power generation amount by the alternator 36. In the present embodiment, the preset value Vs is a parameter corresponding to a target value of a power generation amount by the alternator 36.

The power generation control signal transmitter 802 is configured to control a power generation state by the alternator 36 (i.e., to output a voltage adjusted to the preset value Vs to the alternator 36) based on the preset value Vs of the adjustment voltage calculated by the power generation amount configurator 501.

The power generation state detector 808 corresponding to a "power generation amount obtainer" of the present disclosure is configured to generate an output that reflects an operating state of the alternator 36.

Specifically in the present embodiment, the power generation state detector 808 detects the adjustment voltage of the alternator 36. In the present embodiment, a detection value Vd of the adjustment voltage by the power generation state detector 808 is a parameter corresponding to an actual value of a power generation amount by the alternator 36.

The greenhouse gas increase determiner 809 is configured to perform the greenhouse gas increase determination based on the preset value Vs of the adjustment voltage by the power generation amount configurator 801 and the detection value Vd of the adjustment voltage by the power generation state detector 808. That is, the greenhouse gas increase determiner 809 determines the greenhouse gas increase failure, when a requested reduction of power generation is not performed in a requested manner, in spite of a request for reduction of the power generation by the alternator 36.

The operation and effect in the present embodiment are described below. In the vehicle V provided with the power regeneration function, the operation of the alternator 36 may be controlled in the following manner. That is, a power generation operation is performed in a concentrated manner (e.g., frequently/intensely) typically in a situation when the vehicle V decelerates for creating an opportunity of power regeneration. In other situations, on the other hand, by reducing a power generation by using the alternator 36, a torque of the alternator 36 is reduced. Thereby, a greenhouse gas reduction effect is fully achieved (i.e., a fuel consumption improvement effect is exerted).

However, when, due to an unknown abnormality, a power generation reduction control does not function in other situations other than the deceleration-regeneration situation, the fuel consumption amount for power generation may increase and a greenhouse gas reduction effect is reduced. Therefore, by detecting such an abnormality by the greenhouse gas increase determiner 809, such an abnormality is quickly fixed as soon as possible.

Hereafter, a system operation of the configuration in the present embodiment is described with reference to a flowchart of FIG. 43.

Figure 43:
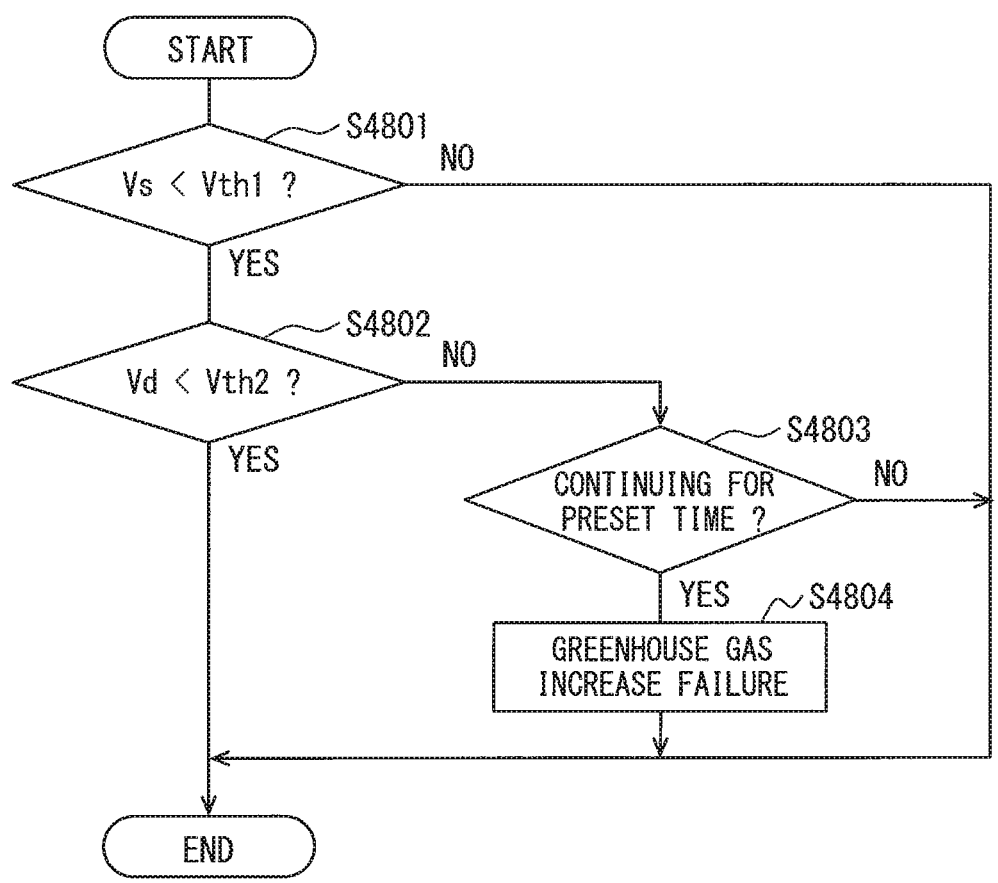
FIG. 43 is a flowchart of an operation of the vehicle diagnosis system in FIG. 42.

The procedure shown in FIG. 43 is performed at predetermined intervals after a start of the hybrid system by the start switch 42. When this procedure is started, it is first determined in Step 4801 whether the preset value Vs of the adjustment voltage is lower than a specified value Vth1. The specified value Vth1 is a value corresponding to a condition for reducing the power generation by the alternator 36.

When it is determined that Vs Vth1 (Step 4801=NO), the processes after Step 4802 are skipped and this procedure is once finished.

On the other hand, when it is determined that Vs<Vth1 (Step 4801=YES), the process advances to Step 4802.

In Step 4802, it is determined whether the detection value Vd of the adjustment voltage is lower than a specified value Vth2.

When it is determined that Vd<Vth2 (Step 4802=YES), the process after Step 4803 is skipped and this procedure is once finished.

On the other hand, when it is determined that Vd≥Vth2 (Step 4802=NO), the process advances to Step 4803.

In Step 4803, it is determined whether a state of Vs<Vth1 (Step 4801=YES) and Vd≥Vth2 (Step 4802=NO) is continuing for a preset time.

When such a state is continuing for a preset time (Step 4803=YES), the process advances to Step 4804, and the greenhouse gas increase failure is determined. Then, this procedure is once finished.

On the other hand, when the determination of Step 4803 is "NO", the process of Step 4804 is skipped and this procedure is once finished.

Eleventh Embodiment

Figure 44:
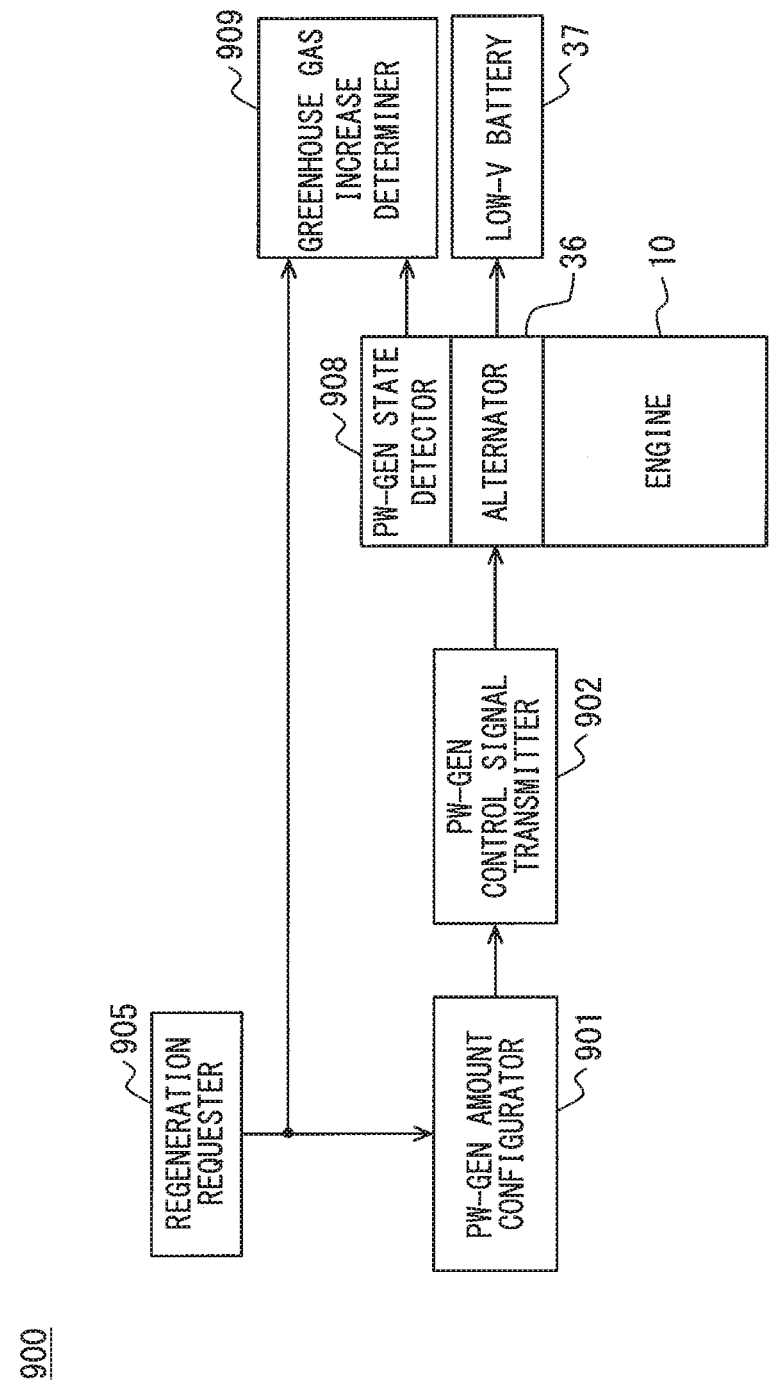
FIG. 44 is a schematic diagram of functional blocks of the vehicle diagnosis system implemented in the vehicle of FIG. 36.

As shown in FIG. 44, a vehicle diagnosis system 900 in the eleventh embodiment of the present disclosure includes a power generation amount configurator 901, a power generation control signal transmitter 902, a power regeneration requester 905, a power generation state detector 908, and a greenhouse gas increase determiner 909

The power generation amount configurator 901, the power generation control signal transmitter 902, and the power regeneration requester 905 are respectively configured in the same manner as the power generation amount configurator 801, the power generation control signal transmitter 802, and the power regeneration requester 805 in the tenth embodiment.

In the present embodiment, the power generation state detector 908 is configured to detect an actual power generation amount by the alternator 36 based on the output current from the alternator 36. Then, the greenhouse gas increase determiner 909 is configured to perform the greenhouse gas increase determination based on (i) a generation state of the regeneration request in the power regeneration requester 905 and (ii) the actual power generation amount by the alternator 36 detected by the power generation state detector 608.

According to the configuration of the present embodiment, the greenhouse gas increase determiner 909 determines the greenhouse gas increase failure, when a requested reduction of power generation is not performed in a requested manner, in spite of a request for reduction of the power generation by the alternator 36. Thereby, an abnormality that cancels/reduces a greenhouse gas reduction effect is quickly fixed as soon as possible.

Twelfth Embodiment

In the description of the twelfth embodiment of the present disclosure, the same numeral as the above-mentioned embodiment (i.e., the first embodiment) is basically assigned to the same component/function. Therefore, description of the same-numeral-assigned component/function of the above-mentioned embodiment basically applies to the present embodiment unless otherwise described or unless any technical restriction applies.

In the sixth embodiment, as shown in FIG. 37, the regeneration requester 105 generates the regeneration request, when the fuel cut requester 104 generates a fuel cut request and predetermined conditions are satisfied.

However, a regeneration request may be generated by the regeneration requester 105, regardless of whether a fuel cut request is generated by the fuel cut requester 104.

Figure 45:
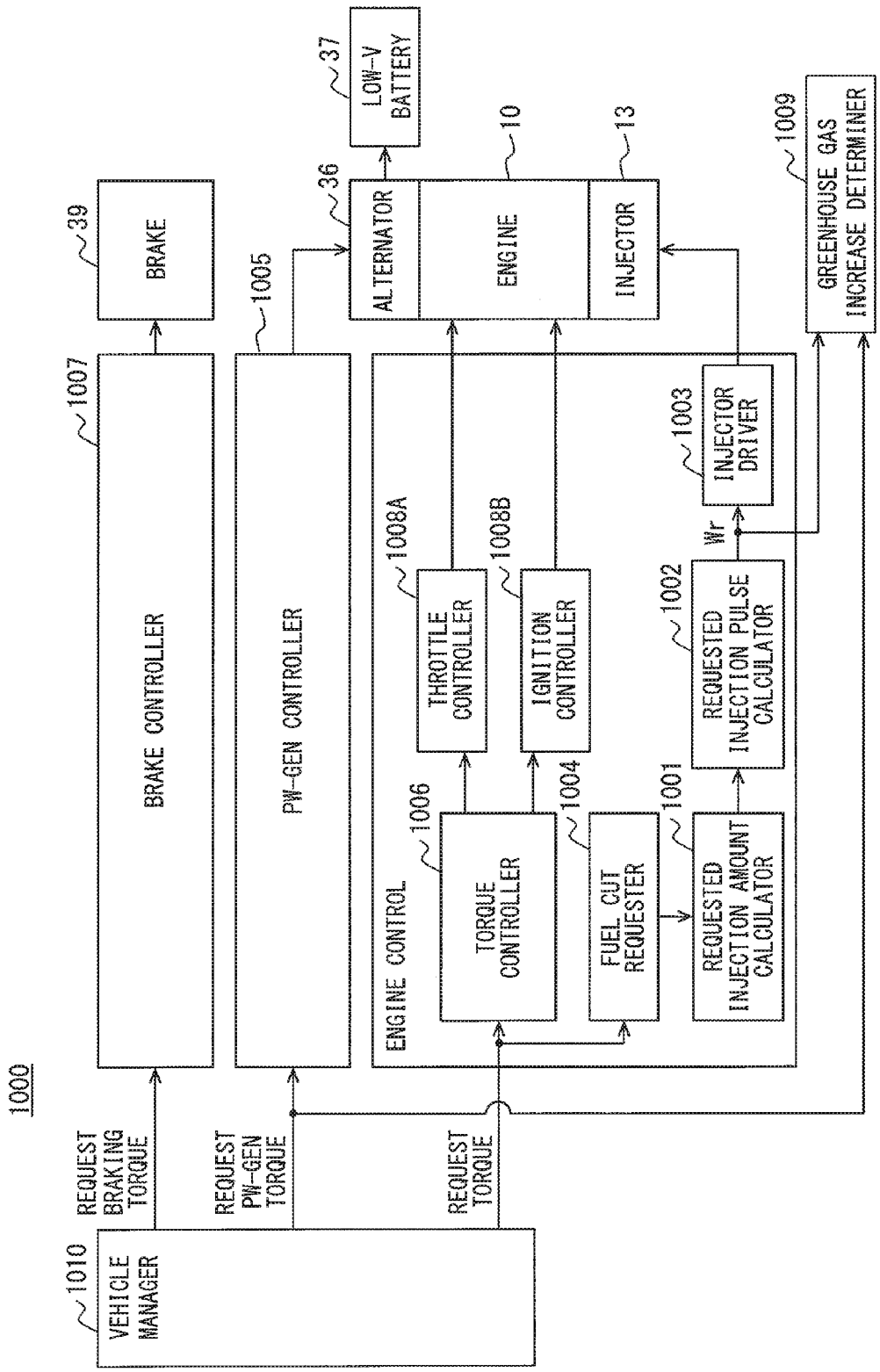
FIG. 45 is a schematic diagram of functional blocks of the vehicle diagnosis system implemented in the vehicle of FIG. 36.

A vehicle diagnosis system 1000 in the twelfth embodiment of the present disclosure includes, as shown in FIG. 45, a vehicle manager 4710 and a requested injection amount calculator 4701, a requested injection pulse calculator 4702 and an injector driver 4703, a fuel cut requester 4704, a power generation controller 4705 (i.e., corresponding to a regeneration request generator), a torque controller 4706, a brake controller 4707, a throttle controller 4708A, an ignition controller 4708B, and a greenhouse gas increase determiner 4709. In the present embodiment, these components are respectively provided as a functional block of the above-mentioned CPU that is disposed in the engine ECU 51.

Among these, the requested injection amount calculator 4701, the requested injection pulse calculator 4702, and the injector driver 4703 are configured in the same manner as the requested injection amount calculator 401, the requested injection pulse calculator 402, and the injector driver 403 in the sixth embodiment.

The vehicle manager 4710 outputs, based on the present operational status, a request value of each of the following controls, i.e., an engine control, a brake control, and a power generation control, which are a brake-portion request braking torque, a request power generation amount, and a request (engine) torque, respectively.

When predetermined regeneration conditions are satisfied, a regeneration request state is in effect, for an increase of a requested power generation amount. The regeneration conditions do not include a condition (D) Fuel cut is being performed in the sixth embodiment. That is, in other words, when three conditions (A) to (C) among all regeneration conditions are satisfied, the regeneration request state is caused. Conditions (A) to (C) are listed in the following again.

(A) Brake ON (i.e., an amount of brake pedal operation is equal to or greater than a predetermined amount), (B) The transmission 26 in a fastened state (i.e., a state in which a transmission of a driving force between the motor 28 and the output shaft 29 is enabled), and (C) No output of the driving force for driving the vehicle V exists from the motor 28.

The power generation controller 4705 performs a power generation control so that a request power generation amount is output.

The brake controller 4707 controls a brake 39 so that the brake-portion request braking torque is output.

The torque controller 4706 controls the throttle controller 4708A and the ignition controller 4708B, respectively, according to the request torque inputted by the vehicle manager 4710, for a control of the output of the engine 10. More practically, according to the request torque, a throttle opening TA is controlled by the throttle controller 4708A, and an ignition timing of the spark plug 15 is controlled by the ignition controller 4708B, for the control of the output of the engine 10.

The operation, action, and effect in the configuration of the twelfth embodiment of the present disclosure are described in the following.

When the above-mentioned regeneration conditions (A) to (C) are satisfied to have the regeneration request state, a target deceleration is calculated based on a brake pedal depression amount, and a required braking torque for realizing such a target deceleration is calculated (such a torque is designated as a "request braking torque" hereafter).

The request braking torque is distributed, i.e., divided, into a brake-portion request braking torque that is realized by the brake 39 and a regeneration-portion request braking torque. The regeneration-portion request braking torque is then converted into a power generation amount that is required for realizing such a torque (such a torque is designated as a "regeneration-time power regeneration amount" hereafter).

When the regeneration-time power regeneration amount is calculated, the above-mentioned request power generation amount is switched to the regeneration-time power regeneration amount, to have a value that is greater than a normally-used value. The power generation controller 4705 increases a power generation amount according to such increase in the request power generation amount. The brake controller 4707 controls the brake 39 so that the brake-portion request braking torque is realized.

Thus, while regeneration conditions are satisfied and power regeneration is performed, which is usually an accelerator OFF state, the vehicle manager 4710 outputs an accelerator-OFF equivalent request torque to the torque controller 4706. When the accelerator-OFF equivalent request torque is output and a condition Ne>Ne0 (i.e., a specified value) is satisfied, the fuel cut requester 4704 outputs a fuel cut request.

In the present embodiment, the greenhouse gas increase determiner 4709 determines, at the time of Ne>Ne0, based on (i) the requested injection pulse width Wr calculated by the requested injection pulse calculator 4702 and (ii) whether there is a regeneration request generated by the vehicle manager 4710, the greenhouse gas increase determination.

That is, the greenhouse gas increase determiner 4709 determines the greenhouse gas increase failure, when the requested injection pulse width Wr is not substantially equal to "0" [i.e., in case of Wr≥Wrth (i.e., a specified value)] in spite of (i) a generation of a regeneration request and (ii) Ne>Ne0. In such a configuration, the same operation and effect as the seventh embodiment are achieved.

Modification

Hereafter, some of the typical modifications are described.

In the description of the following modifications, the same numeral as the above-mentioned embodiment (i.e., the sixth embodiment) is basically assigned to the same component/function. Therefore, description of the same-numeral-assigned component/function of the above-mentioned embodiment basically applies to the present embodiment unless otherwise described or unless any technical restriction applies.

Further, it may be needless to say, the scope of the present disclosure is not limited to the modification described below. In addition, the above-described embodiments may be in part or as a whole combined when technical restriction does not hinder such a combination.

The present disclosure is not limited to the configuration of each of the embodiments mentioned above.

For example, the present disclosure is not limited to a hybrid vehicle which is mentioned above. That is, the present disclosure is widely applicable to various vehicles as long as regenerative power generation is enabled therein. Such vehicles may be, for example, an electric vehicle and a vehicle that has, as a source of its thrust power, an internal combustion engine only.

Further, a vehicle using the motor 28 for power regeneration, instead of using the alternator 36 or in combination with the alternator 36, may also be a target of the present disclosure.

Although each of the above-mentioned vehicle diagnosis system is described as realized by a CPU in the engine ECU 51, it is not limited to a CPU in the engine ECU 51. For example, a CPU may be disposed in the hybrid ECU 52.

The engine ECU 51 and the hybrid ECU 52 may be combined to have one, integrated body.

In the configuration of each of the embodiments mentioned above, the parameter obtained by using a certain sensor may be replaced with other parameter(s) derived from an output of other sensor(s), or with an on-board estimation value(s) derived therefrom.

The present disclosure is not limited to the example of each of the embodiments of operation mentioned above.

For example, the regeneration requester 405 may generate a regeneration request, when all of the following conditions are satisfied.

(i) Ne>Ne0 (i.e., a specified value), (ii) Accelerator-OFF [i.e., Acc<Acc0 (i.e., a specified value)], (iii) ve≥ve0 (i.e., a specified value), (iv) Brake-ON (i.e., a brake pedal depression amount equal to or greater than a predetermined amount), (v) The transmission 26 in a fastened state (i.e., a state in which a transmission of a driving force between the motor 28 and the output shaft 29 is enabled), and (vi) No output of the driving force for driving the vehicle V exists from the motor 28.

That is, the regeneration requester 405 may determine, on its own, the common/similar conditions (i) to (iii) as the fuel cut conditions, individually from the determination by the fuel cut requester 404.

The parameter used for determining whether a fuel cut request or a regeneration request is generated may be changed from or added to the above-described parameters.

The power generation state detectors 808, 908 may be configured to detect or obtain an excitation current of a generator, such as the alternator 36 or the like. Alternatively, the power generation state detectors 808, 908 may be configured to detect or obtain the parameter about the charging power to charge the low-voltage battery 37.

In addition, other modifications not mentioned in the above may also be included within the scope of the present disclosure, as long as the core of the present disclosure is not changed or lost. Further, the description of each of the elements regarding the summary of the present disclosure, even in a functional statement and even through achievable effects, corresponds to each of the concrete examples of the configuration in the embodiments and/or the modifications thereof, or to the equivalents thereof.

Further, although the present disclosure has been fully described in connection with preferred embodiment thereof with reference to the accompanying drawings, it is to be noted that various changes and modifications become apparent to those skilled in the art, and such changes, modifications, and summarized schemes are to be understood as being within the scope of the present disclosure as defined by appended claims.

What is claimed is:

1. A vehicle diagnosis system for performing a diagnosis for a vehicle having a temporal engine stop function that temporarily stops an engine of the vehicle in a certain condition satisfied state, the vehicle diagnosis system comprising:
    a sensor detecting a parameter associated with the vehicle;
    a controller, including a computer processor and memory, the controller being configured at least to:
        determine an occurrence of a specific abnormality of the vehicle based on the detected parameter, the specific abnormality being an abnormality that cancels a greenhouse gas reduction effect by the temporal engine stop function, wherein
            the specific abnormality is an abnormality that hinders or delays (i) a satisfaction of a condition of a temporal stop of the engine or (ii) a determination of satisfaction of the condition of the temporal stop of the engine; and
            the specific abnormality includes an abnormality that hinders or delays (i) a reaching of a remaining charge amount of a battery installed in the vehicle to a standard amount as the satisfaction of the condition or (ii) a detection of the reaching of the remaining charge amount to the standard amount as the determination of the satisfaction of the condition and which is determined when the remaining charge amount has not reached the standard amount after a preset time even though charging to the battery is performed; and
        provide an output, via a communicator of the vehicle, to a device, that is external from the vehicle, based on the determined occurrence of the specific abnormality.

2. The vehicle diagnosis system of claim 1, wherein
the specific abnormality includes an abnormality that hinders or delays (i) a reaching of an engine cooling water temperature to a standard temperature as the satisfaction of the condition or (ii) a detection of the reaching of the engine cooling water temperature to the standard temperature as the determination of the satisfaction of the condition.

3. The vehicle diagnosis system of claim 1, wherein
the specific abnormality includes an abnormality that hinders or delays (i) a reaching of a sensor temperature of a sensor that is disposed in an exhaust passage of the engine to a standard temperature as the satisfaction of the condition or (ii) a detection of the reaching of the sensor temperature to the standard temperature as the determination of the satisfaction of the condition.

4. The vehicle diagnosis system of claim 1, wherein
the specific abnormality includes an abnormality that hinders or delays (i) a reaching of an inter-terminal voltage of a battery disposed in the vehicle to a standard voltage as the satisfaction of the condition or (ii) a detection of the reaching of the inter-terminal voltage to the standard voltage as the determination of the satisfaction of the condition.

5. The vehicle diagnosis system of claim 1, wherein
the specific abnormality includes an abnormality that hinders or delays (i) a reaching of an oil temperature of a transmission disposed in the vehicle to a standard temperature as the satisfaction of the condition or (ii) a detection of the reaching of the oil temperature to the standard temperature as the determination of the satisfaction of the condition.

6. A vehicle diagnosis method for performing a diagnosis for a vehicle having a temporal engine stop function that temporarily stops an engine of the vehicle in a certain condition satisfied state, the vehicle diagnosis method comprising:
    detecting, using a sensor, a parameter associated with the vehicle;
    determining, using a controller including a computer processor and memory, an occurrence of abnormality of the vehicle based on the detected parameter, which includes determining whether a specific abnormality is occurring, and whether the specific abnormality is an abnormality that cancels a greenhouse gas reduction effect by the temporal engine stop function; wherein the specific abnormality is an abnormality that hinders or delays (i) a satisfaction of a condition of a temporal stop of the engine or (ii) a determination of satisfaction of the condition of the temporal stop of the engine; and the specific abnormality includes an abnormality that hinders or delays (i) a reaching of a remaining charge amount of a battery installed in the vehicle to a standard amount as the satisfaction of the condition or (ii) a detection of the reaching of the remaining charge amount to the standard amount as the determination of the satisfaction of the condition and which is determined when the remaining charge amount has not reached the standard amount after a preset time even though charging to the battery is performed; and providing an output, via a communicator of the vehicle, to a device, that is external from the vehicle, based on the determined occurrence of the specific abnormality.

* * * * *